(12) United States Patent
Studebaker et al.

(10) Patent No.: US 8,661,755 B2
(45) Date of Patent: Mar. 4, 2014

(54) COMPOSITE WALL SYSTEM

(75) Inventors: Glenn Wayne Studebaker, Norfolk, NE (US); David Lee Samuelson, Madison, NE (US); Lionel Edward Dayton, Norfolk, NE (US)

(73) Assignee: Nucor Corporation, Charlotte, NC (US)

(*) Notice: Subject to any disclaimer, the term of this patent is extended or adjusted under 35 U.S.C. 154(b) by 250 days.

(21) Appl. No.: 12/709,160

(22) Filed: Feb. 19, 2010

(65) Prior Publication Data

US 2010/0218443 A1 Sep. 2, 2010

Related U.S. Application Data

(63) Continuation-in-part of application No. 12/019,372, filed on Jan. 24, 2008.

(51) Int. Cl.
*E04B 1/18* (2006.01)
*E04H 1/00* (2006.01)

(52) U.S. Cl.
USPC .............................. 52/414; 52/236.6; 52/657

(58) Field of Classification Search
USPC .............................. 52/167.3, 236.6, 414, 657
See application file for complete search history.

(56) References Cited

U.S. PATENT DOCUMENTS

| | | |
|---|---|---|
| 2,684,134 A | 7/1954 | Ruppel |
| 2,703,003 A | 3/1955 | Ruppel |
| 3,307,304 A | 3/1967 | Klausner |
| 3,363,379 A | 1/1968 | Curran |
| 3,392,499 A | 7/1968 | McManus |
| 3,397,497 A | 8/1968 | Shea et al. |
| 3,457,818 A | 7/1969 | McManus |
| 3,527,007 A | 9/1970 | McManus |
| 3,600,868 A * | 8/1971 | Wilson et al. .................. 52/334 |
| 3,624,980 A | 12/1971 | McManus |
| 3,683,580 A | 8/1972 | McManus |
| 3,728,835 A | 4/1973 | McManus |

(Continued)

FOREIGN PATENT DOCUMENTS

| | | |
|---|---|---|
| CA | 981567 | 1/1976 |
| CA | 2407253 A1 | 4/2004 |

(Continued)

OTHER PUBLICATIONS

Canadian Office Action for Application No. 2,650,688 dated Jul. 9, 2010.

(Continued)

*Primary Examiner* — Brian Glessner
*Assistant Examiner* — Joseph J Sadlon
(74) *Attorney, Agent, or Firm* — Moore & Van Allen PLLC; Jeffrey R. Gray

(57) ABSTRACT

A building structure comprising a support structure having upper portion extending to adjacent a floor structure above the support structure and adapted to receive stand-off fasteners there along, a plurality of stand-off fasteners each having a lower portion and an upper portion, where the lower portion of the stand-off fasteners comprises a self-drilling end portion and an adjacent thread-forming portion and, when installed into the upper portion of the support structure, at least a portion of the upper portion of each stand-off fastener extends significantly above the upper portion of the support structure, a cementitious wall structure formed above the upper portion of the wall structure with the upper portions of the stand-off fasteners encapsulated in the cementitious wall structure.

91 Claims, 51 Drawing Sheets

(56) References Cited

U.S. PATENT DOCUMENTS

| | | | |
|---|---|---|---|
| 3,800,490 A * | 4/1974 | Conte | 52/250 |
| 3,818,083 A * | 6/1974 | Butts et al. | 264/31 |
| 3,902,350 A | 9/1975 | McManus | |
| 3,979,868 A | 9/1976 | Butts et al. | |
| 4,003,179 A | 1/1977 | Gilb | |
| 4,056,908 A | 11/1977 | McManus | |
| 4,189,883 A | 2/1980 | McManus | |
| 4,259,822 A | 4/1981 | McManus | |
| 4,285,173 A | 8/1981 | Grearson et al. | |
| 4,295,310 A | 10/1981 | McManus | |
| 4,333,280 A | 6/1982 | Morton | |
| 4,432,178 A | 2/1984 | Taft | |
| 4,454,695 A | 6/1984 | Person | |
| 4,457,115 A * | 7/1984 | Grearson et al. | 52/73 |
| 4,507,901 A | 4/1985 | Carroll | |
| 4,527,372 A | 7/1985 | Ryan | |
| 4,566,240 A | 1/1986 | Schilger | |
| 4,592,184 A | 6/1986 | Person et al. | |
| 4,593,507 A | 6/1986 | Hartman | |
| 4,597,233 A | 7/1986 | Rongoe | |
| 4,619,090 A | 10/1986 | McManus | |
| 4,653,237 A | 3/1987 | Taft | |
| 4,700,519 A | 10/1987 | Person et al. | |
| 4,726,159 A | 2/1988 | Stohs | |
| 4,741,138 A * | 5/1988 | Rongoe, Jr. | 52/334 |
| 4,802,786 A | 2/1989 | Yauger et al. | |
| 4,845,908 A | 7/1989 | Stohs | |
| 4,918,897 A * | 4/1990 | Luedtke | 52/742.14 |
| 5,048,257 A * | 9/1991 | Luedtke | 52/747.1 |
| 5,054,755 A | 10/1991 | Hawkes | |
| 5,383,320 A | 1/1995 | Sorton | |
| 5,544,464 A | 8/1996 | Dutil | |
| 5,605,423 A * | 2/1997 | Janusz | 411/387.6 |
| 5,657,596 A | 8/1997 | Powers, III | |
| 5,699,644 A | 12/1997 | Smith | |
| 5,755,542 A | 5/1998 | Janusz et al. | |
| 5,761,873 A | 6/1998 | Slater | |
| 5,782,047 A * | 7/1998 | De Quesada | 52/236.6 |
| 5,836,131 A | 11/1998 | Viola et al. | |
| 5,867,964 A | 2/1999 | Perrin | |
| 5,941,035 A * | 8/1999 | Purse | 52/263 |
| 6,064,755 A | 5/2000 | Some | |
| 6,185,898 B1 * | 2/2001 | Pratt | 52/657 |
| 6,230,467 B1 | 5/2001 | Leek | |
| 6,260,320 B1 | 7/2001 | Di Lorenzo | |
| 6,357,191 B1 | 3/2002 | Ault et al. | |
| 6,497,401 B2 * | 12/2002 | Flaherty | 261/109 |
| 6,585,141 B2 | 7/2003 | Goss et al. | |
| 6,622,569 B2 | 9/2003 | Mallick et al. | |
| 6,629,678 B1 * | 10/2003 | Kirschner | 248/228.6 |
| 6,668,510 B2 | 12/2003 | McManus | |
| 6,698,148 B1 | 3/2004 | Manna et al. | |
| 6,761,005 B1 | 7/2004 | Daudet et al. | |
| 6,837,013 B2 | 1/2005 | Foderberg et al. | |
| 6,993,881 B1 | 2/2006 | Ruble et al. | |
| 7,013,613 B1 | 3/2006 | Boellner et al. | |
| 7,017,314 B2 | 3/2006 | Pace | |
| 7,389,620 B1 | 6/2008 | McManus | |
| 7,603,815 B2 * | 10/2009 | Kawai et al. | 52/79.1 |
| 7,779,590 B2 | 8/2010 | Hsu et al. | |
| 7,992,352 B2 * | 8/2011 | Bonds et al. | 52/79.1 |
| 8,112,968 B1 * | 2/2012 | Mueller | 52/800.12 |
| 8,234,827 B1 * | 8/2012 | Schroeder et al. | 52/334 |
| 2002/0046514 A1 * | 4/2002 | Leung | 52/167.3 |
| 2006/0236815 A1 | 10/2006 | Beecherl et al. | |

FOREIGN PATENT DOCUMENTS

| | | | |
|---|---|---|---|
| WO | 2004031507 A1 | | 4/2004 |
| WO | WO 2004031507 A1 * | | 4/2004 |
| WO | 2008116269 A1 | | 10/2008 |

OTHER PUBLICATIONS

Douglas F. Lauer, "Ultimate Strength Analysis of Partially Composite and Fully Composite Open-Web Steel Joists", Thesis Paper, Virginia Polytechnic Institute and State University, Blacksburg, VA, Oct. 1994.

Mujagic et al., "Drilled Standoff Screws for Shear Connection in Light Composite Steel-Concrete Trusses", Journal of Constructional Steel Research, vol. 63, pp. 1404-1414, 2007.

Canadian Office Action issued in CA 2,751,659 dated Nov. 29, 2012.

Mexican Office Action issued in MX/a/2009/00094 dated Jun. 28, 2013.

* cited by examiner

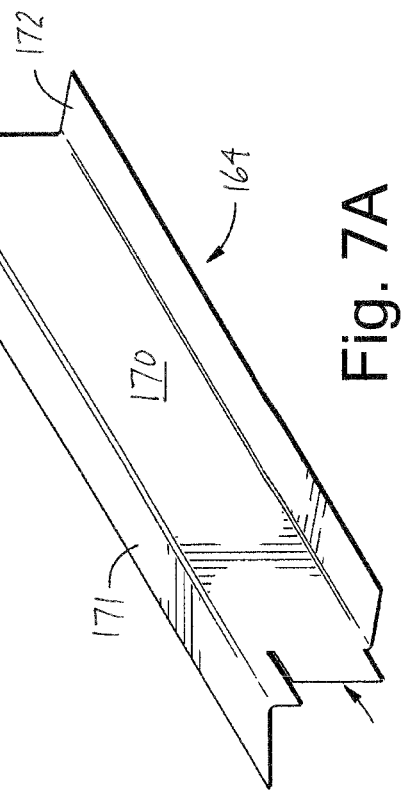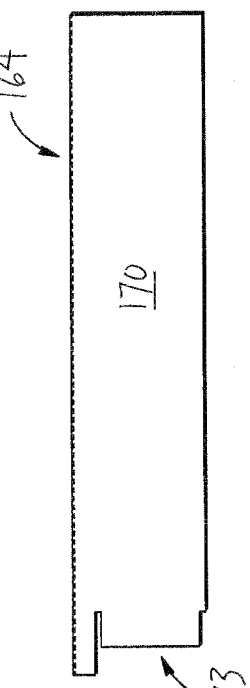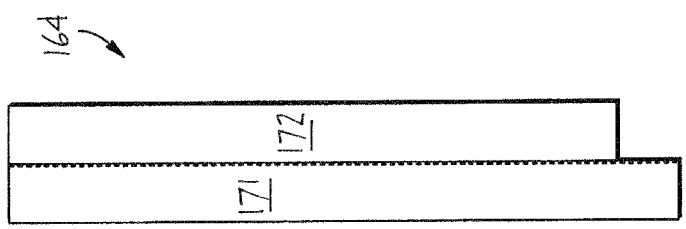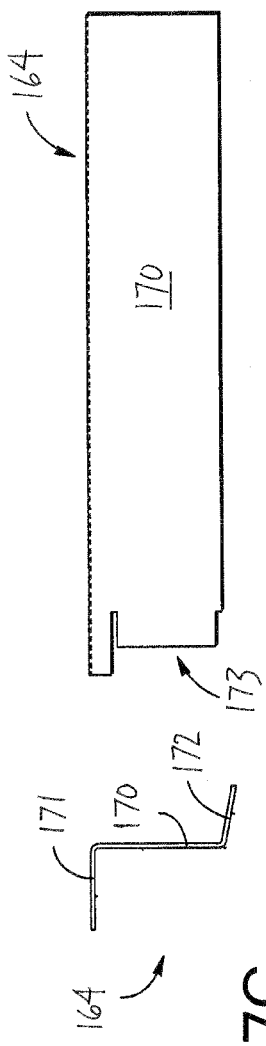

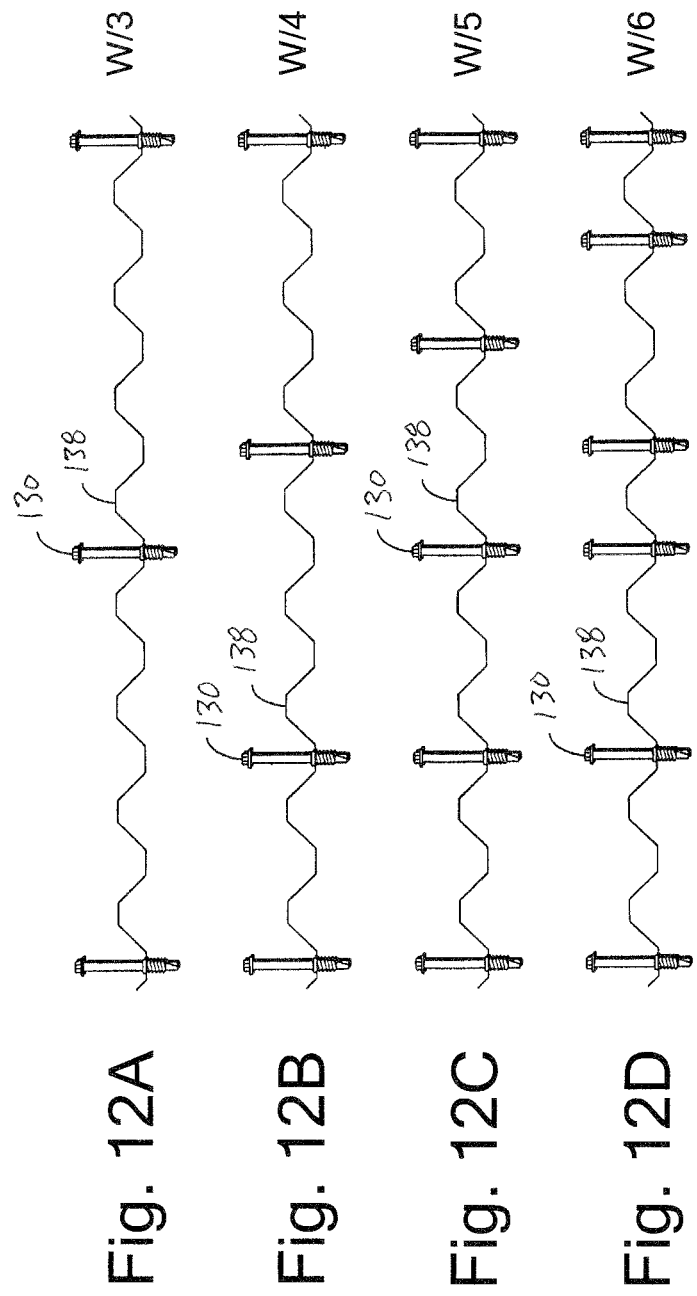

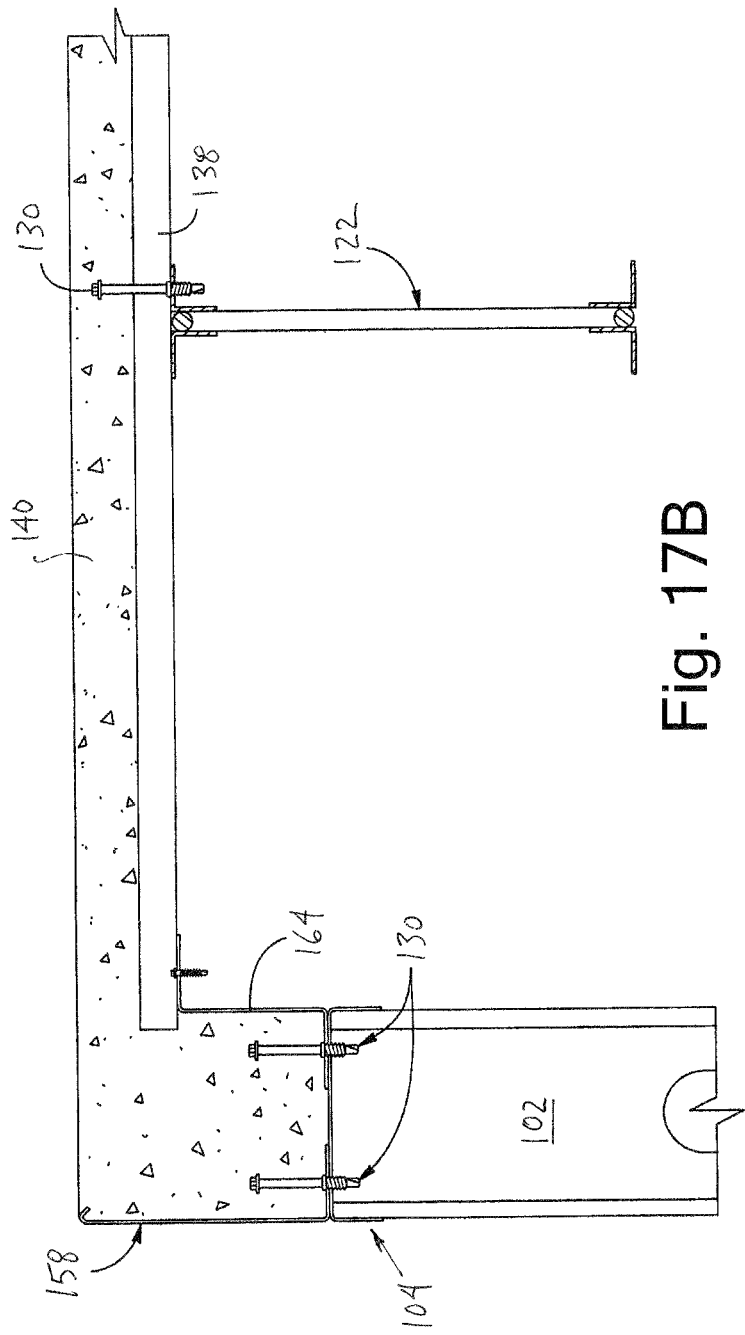

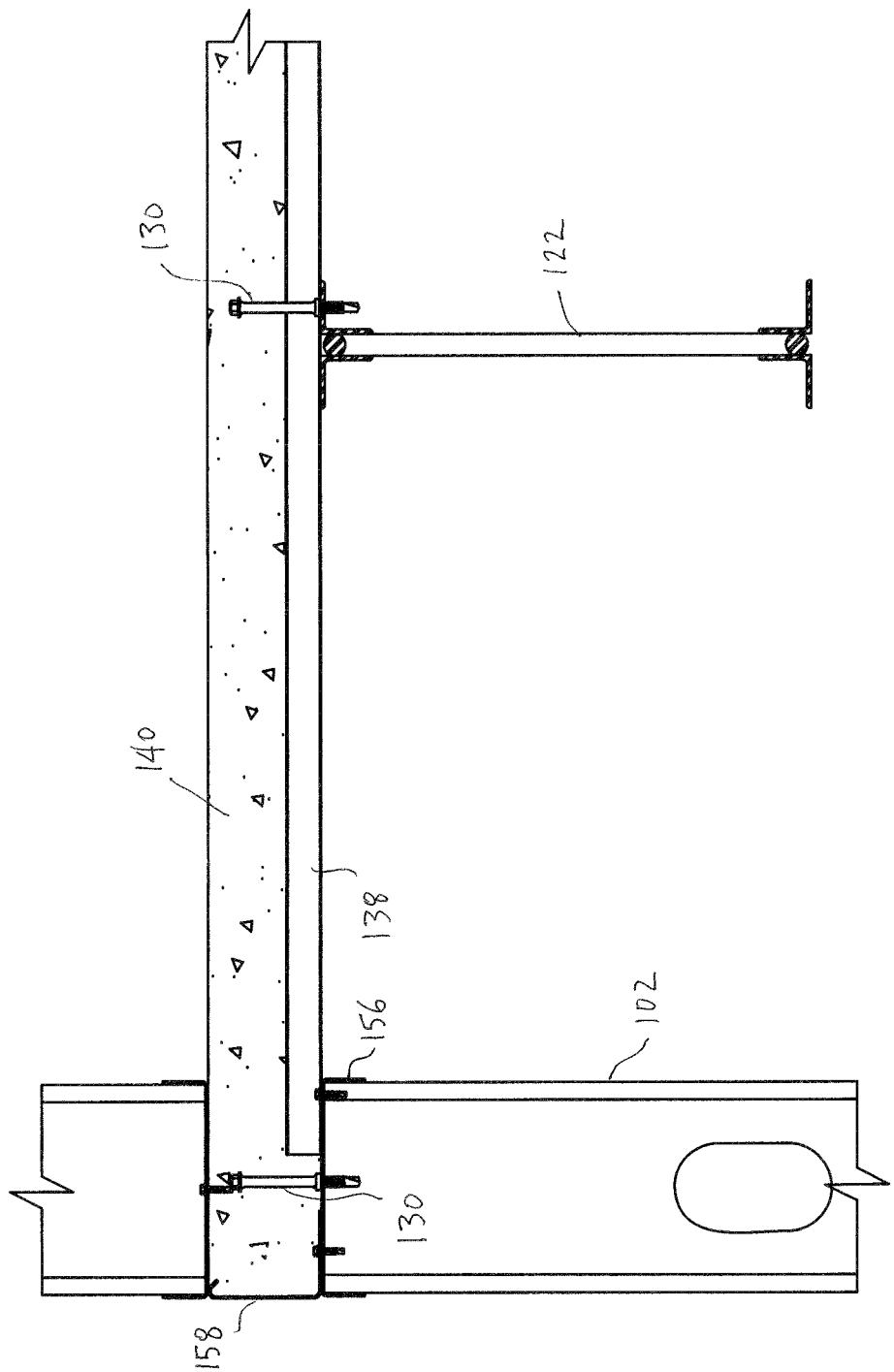

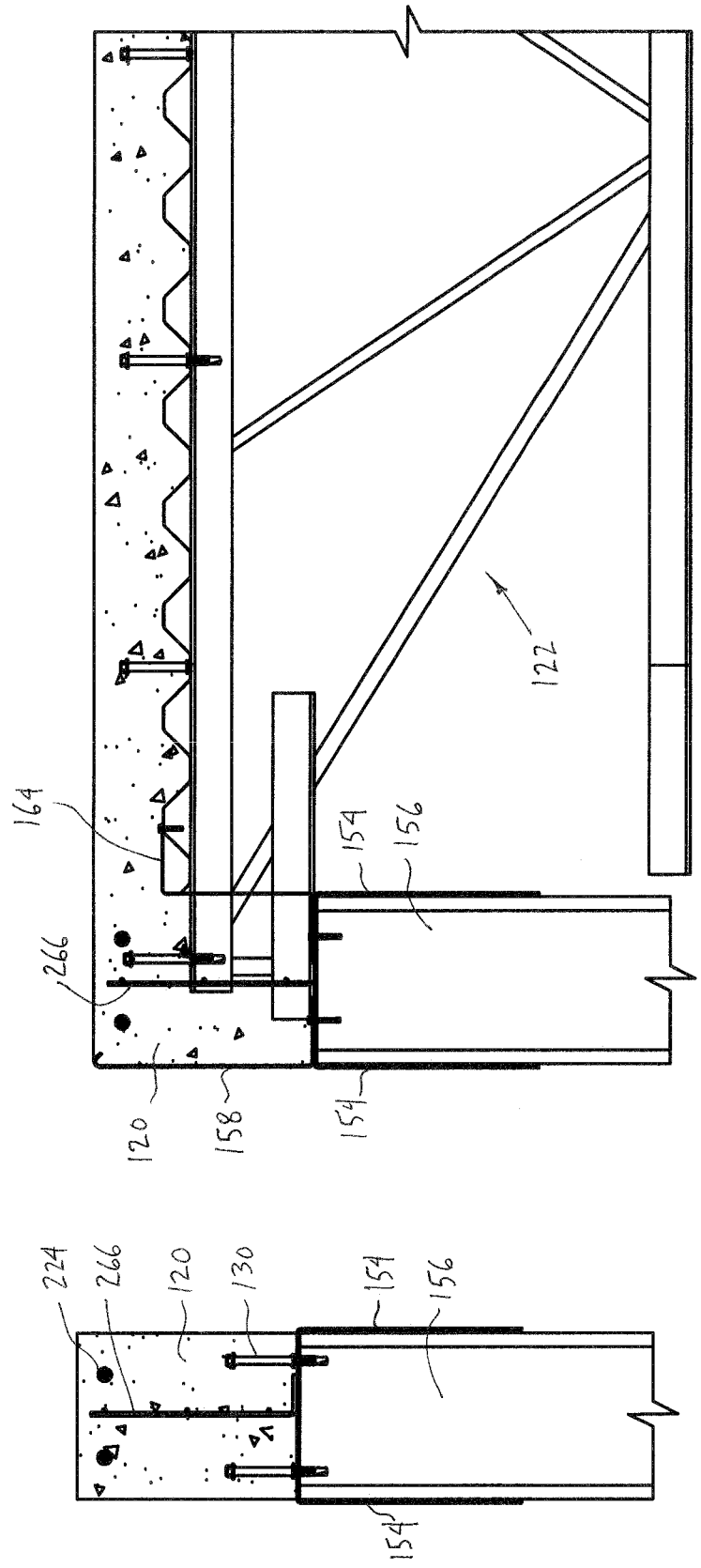

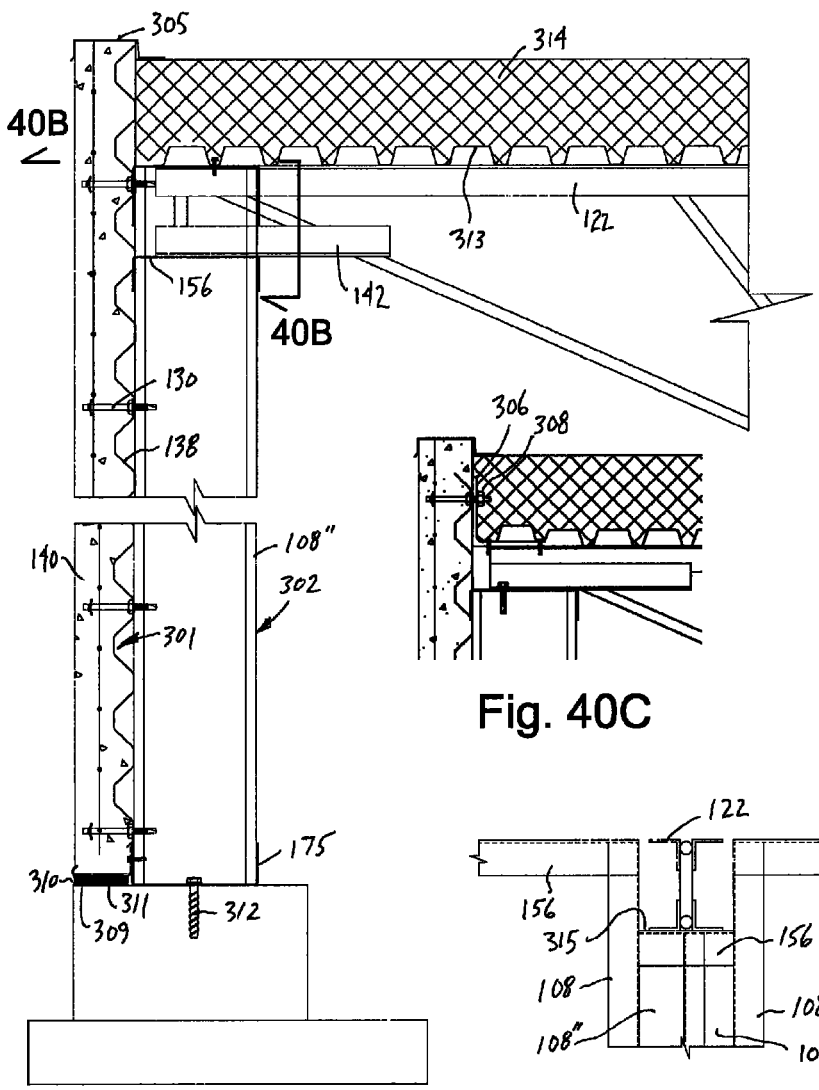

COMPOSITE WALL SYSTEM

RELATED APPLICATIONS

This application is a continuation in part of U.S. patent application Ser. No. 12/019,372, filed Jan. 24, 2008, and incorporated herein by reference.

BACKGROUND

Large scale, multi-story buildings are typically constructed of steel and concrete. Floors in such buildings may be composite floor constructs assembled by spanning, spaced-apart wide flange beams and/or steel joists between structural supports and installing metal decking, typically corrugated metal decking, over such beams and/or joists. The decking forms a lateral surface onto which a cementitious slab can be placed and cured. Generally, the underside of the beams or lower chords of the joists form the framework from which ceilings may be supported. Flooring system designs must also be mindful of fire safety, acoustics, and vibration considerations.

Such composite floor systems have been designed in the past to address one or more of these issues individually. These prior designs have included some systems that integrated the joist and deck assembly with the cementitious slab to provide a composite floor system. In the past, composite floor construction was typically achieved by using welded shear studs or partial extension of the joist upper chord above the form or metal deck into the cementitious slab. In one prior design, this integral structure was assembled by providing self-drilling studs with a threaded portion to be in threaded engagement with the deck and underlying joists. A length of each stud extended above the metal decking and was encased in the concrete slab, and resisted and transmitted horizontal shear forces which develop between the cementitious slab and the supporting joist structure. See U.S. Pat. No. 5,605,423. These composite floor systems were an improvement, but still had draw backs in that the floor system were time consuming and difficult to install. There was still a need for a composite floor system that was rapidly and safely installed with fewer building errors to provide a floor system with improved erectability and economy for the same or greater load bearing capacity.

In addition, these composite floor systems typically involved providing a steel beam laterally at the joinder of the composite floor system to a support wall or other support structure. One approach in the past has involved forming a channel at the upper portion of the wall structure adjacent the composite floor system and filling the channel with cementitious material integral with the slab of the cementitious slab of the composite floor system. See U.S. Pat. No. 5,941,035. This system reduced the need for a lateral steel beam in the wall structure, but did require a force-distribution plate to be positioned under the channel over the upper portion of the wall structure to distribute load along the upper portion of the wall structure. Also, powder driven fasteners, SPIKE® Powers fasteners or masonry fasteners were usually driven into the concrete channel from below as well as from above to tie the cementitious channel into the wall structure above and below for lateral loading. The wall studs in the wall structure above were positioned and spaced generally the same as the wall studs in the wall structure below, with SIMPSON® ties or similar devices connecting the upper wall structure with the lower wall structure for vertical loading.

Needed has been a wall structure that eliminates the need for steel beams in the wall structure, reduces if not eliminates, the need for powder driven fasteners, SPIKE® Powers fasteners or masonry fasteners installed particularly from below, and allows the positioning and spacing studs in wall structure above to be selected free of the positioning and spacing of wall studs in the wall structure below.

BRIEF SUMMARY OF THE INVENTION

Disclosed is a building structure comprising:

a support structure having upper portion extending to adjacent a floor structure above the support structure and adapted to receive stand-off fasteners there along, a plurality of stand-off fasteners each having a lower portion and an upper portion, where the lower portion of the stand-off fasteners comprises a self-drilling end portion and an adjacent thread-forming portion and, when installed into the upper portion of the support structure, at least a portion of the upper portion of each stand-off fastener extends significantly above the upper portion of the support structure, a cementitious wall structure formed above the upper portion of the support structure with the upper portions of the stand-off fasteners encapsulated in the cementitious wall structure.

The building structure may include the formed cementitious wall structure extending between vertical supports of the building structure. Alternatively or in addition, the cementitious wall structure may be formed integral with a cementitious slab of a floor structure of the building structure. The floor structure of the building structure may comprise a plurality of laterally extending steel joist and a corrugated metal decking supported by the steel joist on which the cementitious slab of the floor structure is placed.

The upper portion of the support structure may comprise a metallic structure, and the lower portion of the stand-off fasteners comprising a metal thread adapted to install into the metallic structure. Alternatively, the upper portion of the support structure may comprise a masonry structure, and the lower portion of the stand-off fasteners comprising a masonry thread adapted to install into the masonry structure. In yet another alternative, the upper portion of the support structure may comprise a wood structure, and the lower portion of the stand-off fasteners comprising a wood thread adapted to install into the wood structure.

The lower portion of the stand-off fasteners in the present building structure may have a generally greater hardness than that of the upper portion of the stand-off fasteners. Alternatively or in addition, at least a portion of the lower portion of each stand-off fastener may be heat treated to a higher degree of hardness relative to the remainder of the stand-off fasteners. The building structure may include at least one closure positioned above the upper portion of the support structure to provide a form for the cementitious wall structure above the support structure, and at least some of the stand-off fasteners fasten at least one of the closures to the upper portion of the support structure.

The building structure may include floor joists, each floor joist comprising a joist shoe positioned at least at one end portion, and the upper portion of the support structure supports said end portion of the floor joist at the joist shoe, and stand-off fasteners fasten the joist shoe to the upper portion of the support structure and have upper portions of said stand-off fasteners encapsulated in the cementitious wall structure.

Reinforcing bar may be encapsulated within the cementitious wall structure. Additionally, the upper portion of at least one of the stand-off fasteners may be connected to the reinforcing bar.

The building structure may have metal decking adapted to support at least portions of the cementitious wall structure and be supported by the upper portion of the support structure, a plurality of joists in spaced apart array adapted to support at least portions of the metal decking and the cementitious wall structure, and a plurality of stand-off fasteners adapted to fasten the metal decking to the joists by installing the lower portions of the stand-off fasteners through the decking and into the joists, and with the upper portions of the stand-off fasteners extending above the decking and encapsulated in a cementitious slab of the floor structure integral with the cementitious wall structure.

In one alternative, the support structure may include an opening in a wall and the cementitious wall structure may form a header spanning the opening in the wall. Reinforcing bar may be encapsulated within the cementitious wall structure forming the header.

Alternatively, the building structure may comprise:

a support structure having upper portion extending to adjacent a floor structure above the support structure and adapted to receive stand-off fasteners there along, a plurality of stand-off fasteners each having a lower portion and an upper portion, where the lower portion has a self-drilling end portion and adjacent a thread-forming portion with a nominal diameter between 80 and 98% of major diameter of a threaded portion adjacent the thread-forming portion, the self-drilling end portion adapted to form a fastener opening in an upper portion of the support structure, the thread-forming portion adapted to form threads in said fastener opening in an upper portion of the support structure, and the threaded portion having a drive torque less than the thread-forming torque of the thread-forming portion and adapted to thread the fastener and clamp the fastener with a clamping portion against the upper portion of the support structure, a cementitious wall structure formed above the upper portion of the support structure with the upper portions of the stand-off fasteners encapsulated in the cementitious wall structure. Alternatively, the fluted lead portion has a nominal diameter between about 80 and 95% of the major diameter.

The lower portion of each fastener may have a threaded portion adjacent the clamping part with a through hardness of between about HRB 70 and HRC 40. Alternatively or in addition, the threaded portion provides the fastener with a drive torque at least 20% less than a thread-forming torque. Each fastener may have a thread-forming portion at least HRC 50 hardness adapted to enable the fastener to form threads in upper portions of the support structure, and the self-drilling end portion having at least HRC 50 hardness.

In yet another alternative, a building structure is disclosed comprising a support structure having upper portion extending to adjacent a floor structure above the support structure and adapted to receive stand-off studs there along, a plurality of stand-off studs each having a lower portion and an upper portion, the lower portion of the stand-off studs connecting to the upper portion of the support structure, and at least a portion of the upper portion of each stand-off stud extending significantly above the upper portion of the support structure, a cementitious wall structure formed above the upper portion of the support structure with the upper portions of the stand-off studs encapsulated in the cementitious wall structure.

Each of the stand-off studs may comprise a lower portion and an upper portion, where the lower portion comprises a self-drilling end portion and an adjacent thread-forming portion and, when installed into the upper portion of the support structure, at least a portion of the upper portion of each stand-off stud extends significantly above the upper portion of the support structure. Alternatively, each of the stand-off studs may comprise a lower portion and an upper portion, where the lower portion comprises a weld stud and, when installed to the upper portion of the support structure, at least a portion of the upper portion of each stand-off stud extends significantly above the upper portion of the support structure.

Also disclosed is an at least a two story building structure comprising support structures on successive floor levels each having upper portion extending to an adjacent upper floor structure above the support structure and adapted to receive stand-off fasteners there along, at said successive floor levels, having a plurality of stand-off fasteners each having a lower portion and an upper portion, where the lower portion of the stand-off fasteners comprises a self-drilling end portion and an adjacent thread-forming portion, and where, when installed, at least a portion of the upper portion of each stand-off fastener extends significantly above the upper portion of a support structure, at said successive floor levels, a cementitious wall structure formed above the upper portion of each support structure extending between vertical supports of the building structure with the upper portions of the stand-off fasteners encapsulated in a cementitious wall structure, and diagonal members fastened between the vertical supports at one floor and the opposite end of the cementitious wall structure adjacent the floor structure of the next successive higher level of the building structure.

The at least two story building structure may include lateral transfer frames encapsulated in the cementitious wall structure adjacent the vertical supports at least at the lower floor level of the building structure, each said lateral transfer frames comprising a lower plate adapted to be fastened to the upper portion of a support structure below the frame, an upper plate adapted to be fastened to the support structure above the cementitious wall structure, and rigid transfer spacers adapted to transfer lateral load between the upper plate and the lower plate. The lateral transfer frames are adapted to transfer lateral load from the diagonal members to the diagonal members of the next successive lower level. The diagonal members may be selected from a group consisting of straps, hollow structural section members, angle members, C-channel members, studs, sheet material, and I-beams.

Each cementitious wall structure may be formed integral with a cementitious slab of a floor structure of the building structure. Each floor structure of the building structure may include a plurality of laterally extending floor joist and a corrugated metal decking supported by the floor joist on which the cementitious slab of the floor structure is placed.

Each upper portion of the support structure of the at least two story building structure may have a metallic structure, and the lower portion of the stand-off fasteners comprising a metal thread adapted to install into the metallic structure. Alternatively, the upper portion of the support structure may comprise a masonry structure, and the lower portion of the stand-off fasteners comprising a masonry thread adapted to install into the masonry structure. In yet another alternative, the upper portion of the support structure may comprise a wood structure, and the lower portion of the stand-off fasteners comprising a wood thread adapted to install into the wood structure.

The lower portion of the stand-off fasteners in the present building structure may have a generally greater hardness than that of the upper portion of the stand-off fasteners. Alternatively or in addition, at least a portion of the lower portion of each stand-off fastener may be heat treated to a higher degree of hardness relative to the remainder of the stand-off fasteners.

The building structure may include at least one closure positioned above the upper portion of the support structure to provide a form for the cementitious wall structure above the support structure, and at least some of the stand-off fasteners fasten at least one of the closures to the upper portion of the support structure.

The building structure may include floor joists, each floor joist comprising a joist shoe positioned at least at one end portion, and the upper portion of the support structure supports said end portion of the floor joist at the joist shoe, and stand-off fasteners fasten the joist shoe to the upper portion of the support structure and have upper portions of said stand-off fasteners encapsulated in the cementitious wall structure.

Reinforcing bar may be encapsulated within the cementitious wall structure. Additionally, the upper portion of at least one of the stand-off fasteners may be connected to the reinforcing bar.

The building structure may have metal decking adapted to support at least portions of the cementitious wall structure and be supported by the upper portion of the support structure, a plurality of joists in spaced apart array adapted to support at least portions of the metal decking and the cementitious wall structure, and a plurality of stand-off fasteners adapted to fasten the metal decking to the joists by installing the lower portions of the stand-off fasteners through the decking and into the joists, and with the upper portions of the stand-off fasteners extending above the decking and encapsulated in a cementitious slab of the floor structure integral with the cementitious wall structure.

Also disclosed is a method of forming a building structure with a cementitious wall structure comprising the following steps:

providing a support structure with an upper portion extending to adjacent a floor structure above the support structure, installing a plurality of stand-off fasteners each having a lower portion and an upper portion, where the lower portion of the stand-off fasteners comprises a self-drilling end portion and an adjacent thread-forming portion, into the upper portion of the support structure with the upper portion of each stand-off fastener extends significantly above the upper portion of the support structure, placing a cementitious wall structure above the upper portion of the support structure with the upper portions of the stand-off fasteners encapsulated in the cementitious wall structure.

The method of forming a building structure may further include steps of:

positioning a plurality of floor joists in spaced apart array with one end portion of the each of the joists is supported at least in part by the support structure, positioning metal decking supported by the floor joist and at least partially by the support structure, installing a plurality of stand-off fasteners each having a lower portion and an upper portion, where the lower portion of the stand-off fasteners comprises a self-drilling end portion and an adjacent thread-forming portion, through the metal decking and into the floor joist with the upper portion of each stand-off fastener extends significantly above the upper portion of the metal decking, placing a cementitious slab of the floor structure above the upper portion of the metal decking with the upper portions of the stand-off fasteners encapsulated in the cementitious wall structure and with the cementitious slab of the floor structure integral with the cementitious wall structure.

The method may be used when the upper portions of the support structures have a metallic structure, and the lower portion of the stand-off fasteners comprising a metal thread adapted to install into the metallic structure. Alternatively, the upper portion of the support structure may comprise a masonry structure, and the lower portion of the stand-off fasteners comprising a masonry thread adapted to install into the masonry structure. In yet another alternative, the upper portion of the support structure may comprise a wood structure, and the lower portion of the stand-off fasteners comprising a wood thread adapted to install into the wood structure.

The method of forming a building structure with a cementitious wall may utilize stand-off fasteners where the lower portion of the stand-off fasteners has a generally greater hardness than that of the upper portion of the stand-off fasteners. Alternatively or in addition, at least a portion of the lower portion of each stand-off fastener may be heat treated to a higher degree of hardness relative to the remainder of the stand-off fasteners.

The method of forming a building structure with a cementitious wall structure may include positioning at least one closure above the upper portion of the support structure to provide a form for the cementitious wall structure above the support structure, and installing at least some of the stand-off fasteners through at least one of the closures and into the upper portion of the support structure.

The present method may further comprise the steps of positioning a joist shoe at least at one end portion of some of the floor joist, with the upper portion of the support structure supporting said end portion of the floor joist at the joist shoe, and installing stand-off fasteners into the joist shoe with upper portions of said stand-off fasteners encapsulated in the cementitious structure of the floor structure.

The method may include reinforcing bar encapsulated within the cementitious wall structure. Additionally, the upper portion of at least one of the stand-off fasteners may be connected to the reinforcing bar.

The support structure may comprise an opening in the wall, and the step of placing a cementitious wall structure may further comprise placing the cementitious wall structure to form a header spanning the opening in the wall.

Alternatively, the method of forming a building structure with a cementitious wall structure building structure may comprise:

assembling a support structure having upper portion extending to adjacent a floor structure above the support structure and adapted to receive stand-off fasteners there along, installing a plurality of stand-off fasteners each having a lower portion and an upper portion, where the lower portion has a self-drilling end portion and adjacent a thread-forming portion with a nominal diameter between 80 and 98% of major diameter of a threaded portion adjacent the thread-forming portion, the self-drilling end portion adapted to form a fastener opening in an upper portion of the support structure, the thread-forming portion adapted to form threads in said fastener opening in an upper portion of the support structure, and the threaded portion having a drive torque less than the thread-forming torque of the thread-forming portion and adapted to thread the fastener and clamp the fastener with a clamping portion against the upper portion of the support structure, placing a cementitious wall structure formed above the upper portion of the support structure with the upper portions of the stand-off fasteners encapsulated in the cementitious wall structure. Alternatively, the fluted lead portion has a nominal diameter between about 80 and 95% of the major diameter.

The method of forming a building structure with a cementitious wall building structure may utilize stand-off fasteners where the lower portion of each fastener may have a threaded portion adjacent the clamping part with a through hardness of between about HRB 70 and HRC 40. Alternatively or in addition, the threaded portion provides the fastener with a drive torque at least 20% less than a thread-forming torque. Each fastener may have a thread-forming portion at least HRC 50 hardness adapted to enable the fastener to form threads in upper portions of the support structure, and the self-drilling end portion having at least HRC 50 hardness.

In yet another alternative, a method of forming a building structure with a cementitious wall structure may comprise the steps of:

providing a support structure with an upper portion extending to adjacent a floor structure above the support structure, installing a plurality of stand-off studs each having a lower portion and an upper portion, where the lower portion of the stand-off studs connecting to the upper portion of the support structure, and at least a portion of the upper portion of each stand-off stud extending significantly above the upper portion of the support structure, placing a cementitious wall structure above the upper portion of the support structure with the upper portions of the stand-off studs encapsulated in the cementitious wall structure.

The step of installing a plurality of stand-off studs may comprise installing stand-off studs comprising a lower portion and an upper portion, where the lower portion comprises a self-drilling end portion and an adjacent thread-forming portion and, when installed into the upper portion of the support structure, at least a portion of the upper portion of each stand-off stud extends significantly above the upper portion of the support structure. Alternatively, the step of installing a plurality of stand-off studs may comprise installing stand-off studs comprising a lower portion and an upper portion, where the lower portion comprises a weld stud and, when installed to the upper portion of the support structure, at least a portion of the upper portion of each stand-off stud extends significantly above the upper portion of the support structure.

Also disclosed is a method of forming at least a two story building structure with a cementitious wall structure comprising the steps of:

assembling support structures on successive floor levels each having upper portion extending to an adjacent upper floor structure above the support structure and adapted to receive stand-off fasteners there along, installing at said successive floor levels a plurality of stand-off fasteners each having a lower portion and an upper portion, where the lower portion of the stand-off fasteners comprises a self-drilling end portion and an adjacent thread-forming portion, and when installed, at least a portion of the upper portion of each stand-off fastener extends significantly above the upper portion of a support structure, placing at said successive floor levels, a cementitious wall structure formed above the upper portion of each support structure extending between vertical supports of the building structure with the upper portions of the stand-off fasteners encapsulated in a cementitious wall structure, and assembling diagonal members fastened between the vertical supports at one floor and the opposite end of the cementitious wall structure adjacent the floor structure of the next successive higher level of the building structure.

The method of forming at least a two story building structure with a cementitious wall structure may include the further step of positioning lateral transfer frames encapsulated in the cementitious wall structure adjacent the vertical supports at least at the lower floor level of the building structure, each said lateral transfer frames comprising a lower plate adapted to be fastened to the upper portion of a support structure below the frame, an upper plate adapted to be fastened to the support structure above the cementitious wall structure, and rigid transfer spacers adapted to transfer lateral load between the upper plate and the lower plate. Additionally, the step of positioning lateral transfer frames may comprise positioning lateral transfer frames adapted to transfer lateral load from the diagonal members to the diagonal members of the next successive lower level.

The step of selecting diagonal members may further include selecting diagonal members from a group consisting of straps, hollow structural section members, angle members, C-channel members, studs, sheet material, and I-beams.

The method may include forming each cementitious wall structure integral with a cementitious slab of a floor structure of the building structure. Alternatively or additionally, each floor structure of the building structure may comprise a plurality of laterally extending floor joists and a corrugated metal decking supported by the floor joists on which the cementitious slab of the floor structure is placed.

The method may be used when the upper portions of the support structures have a metallic structure, and the lower portion of the stand-off fasteners comprising a metal thread adapted to install into the metallic structure. Alternatively, the upper portion of the support structure may comprise a masonry structure, and the lower portion of the stand-off fasteners comprising a masonry thread adapted to install into the masonry structure. In yet another alternative, the upper portion of the support structure may comprise a wood structure, and the lower portion of the stand-off fasteners comprising a wood thread adapted to install into the wood structure.

The method of forming at least a two story building structure with a cementitious wall structure may utilize stand-off fasteners where the lower portion of the stand-off fasteners has a generally greater hardness than that of the upper portion of the stand-off fasteners. Alternatively or in addition, at least a portion of the lower portion of each stand-off fastener may be heat treated to a higher degree of hardness relative to the remainder of the stand-off fasteners.

The method of forming at least a two story building structure with a cementitious wall structure may include positioning at least one closure above the upper portion of the support structure to provide a form for the cementitious wall structure above the support structure, and installing at least some of the stand-off fasteners through at least one of the closures and into the upper portion of the support structure.

The present method may further comprise the steps of positioning a joist shoe at least at one end portion of some of the floor joist, with the upper portion of the support structure supporting said end portion of the floor joist at the joist shoe, and installing stand-off fasteners into the joist shoe with upper portions of said stand-off fasteners encapsulated in the cementitious structure of the floor structure.

The method may include reinforcing bar encapsulated within the cementitious wall structure. Additionally, the upper portion of at least one of the stand-off fasteners may be connected to the reinforcing bar.

The method of forming at least a two story building structure with a cementitious wall structure may further include steps of positioning metal decking to support at least portions of the cementitious wall structure and be supported by the upper portion of the support structure, positioning a plurality of joists in spaced apart array to support at least portions of the metal decking and the cementitious wall structure, and installing a plurality of stand-off fasteners with the lower portions of the stand-off fasteners through the decking and into the joists, with the upper portions of the stand-off fasteners extending above the decking and encapsulated in a cementitious floor slab integral with the cementitious wall structure.

BRIEF DESCRIPTION OF THE DRAWINGS

Figure 1:
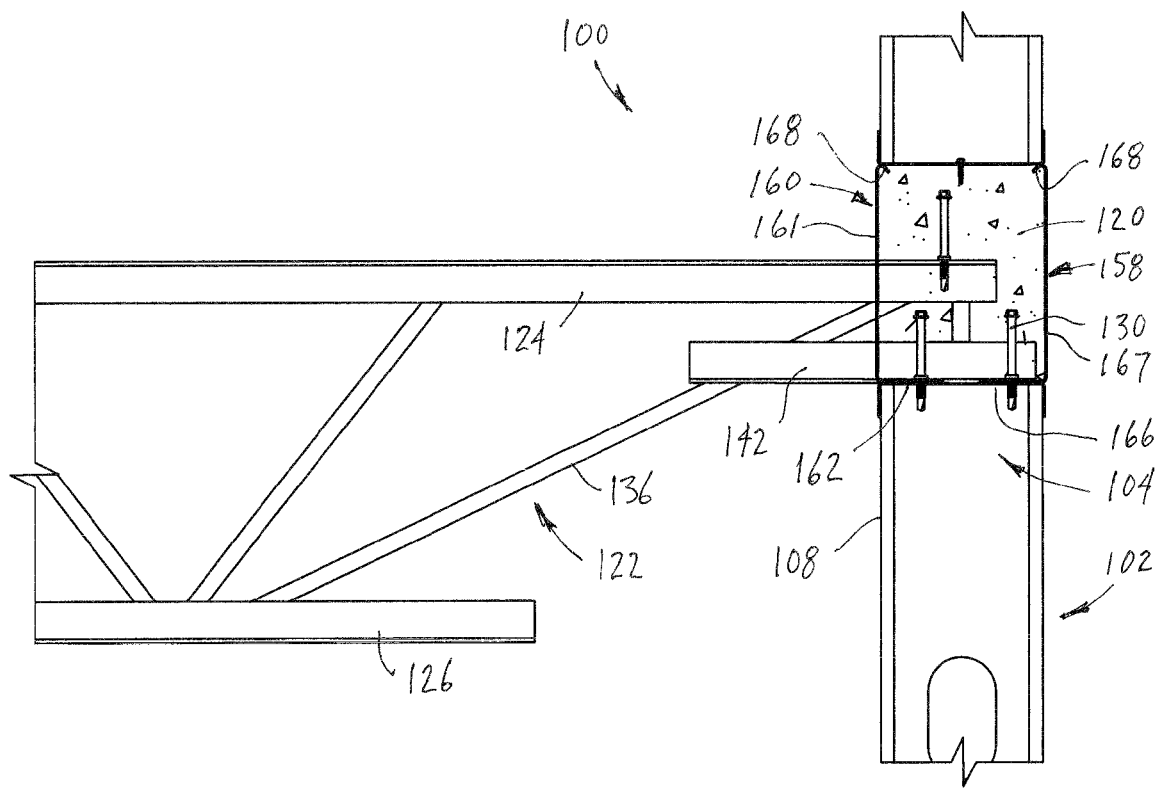
Figure 2:
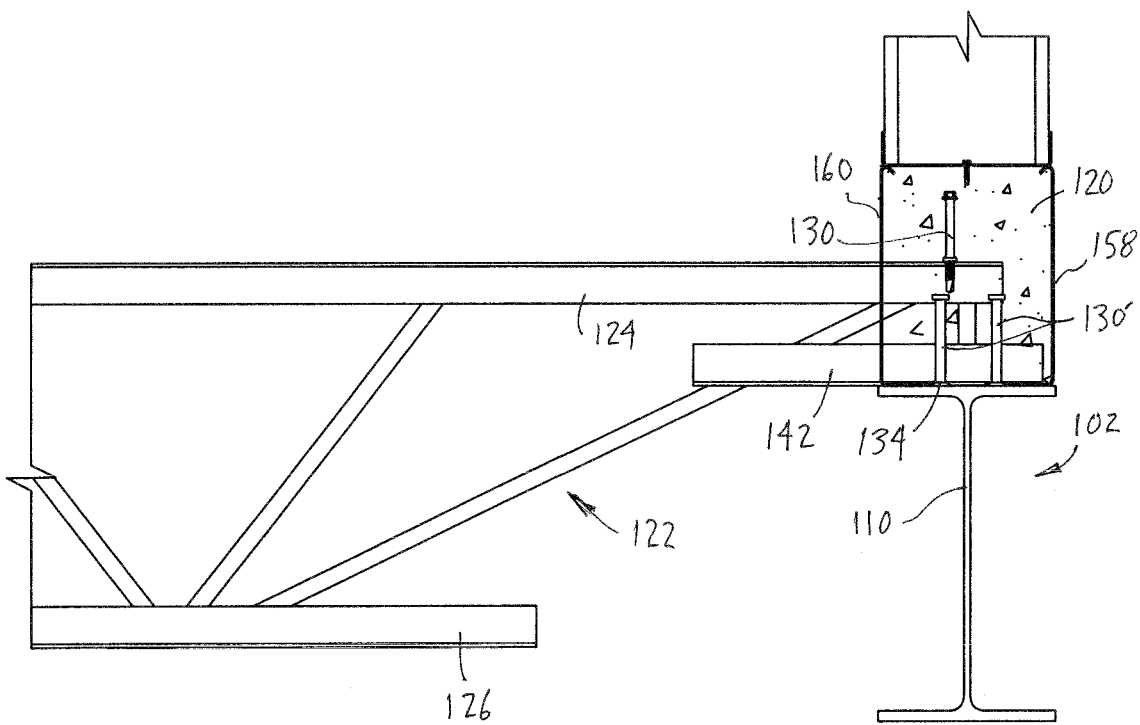
Figure 3:
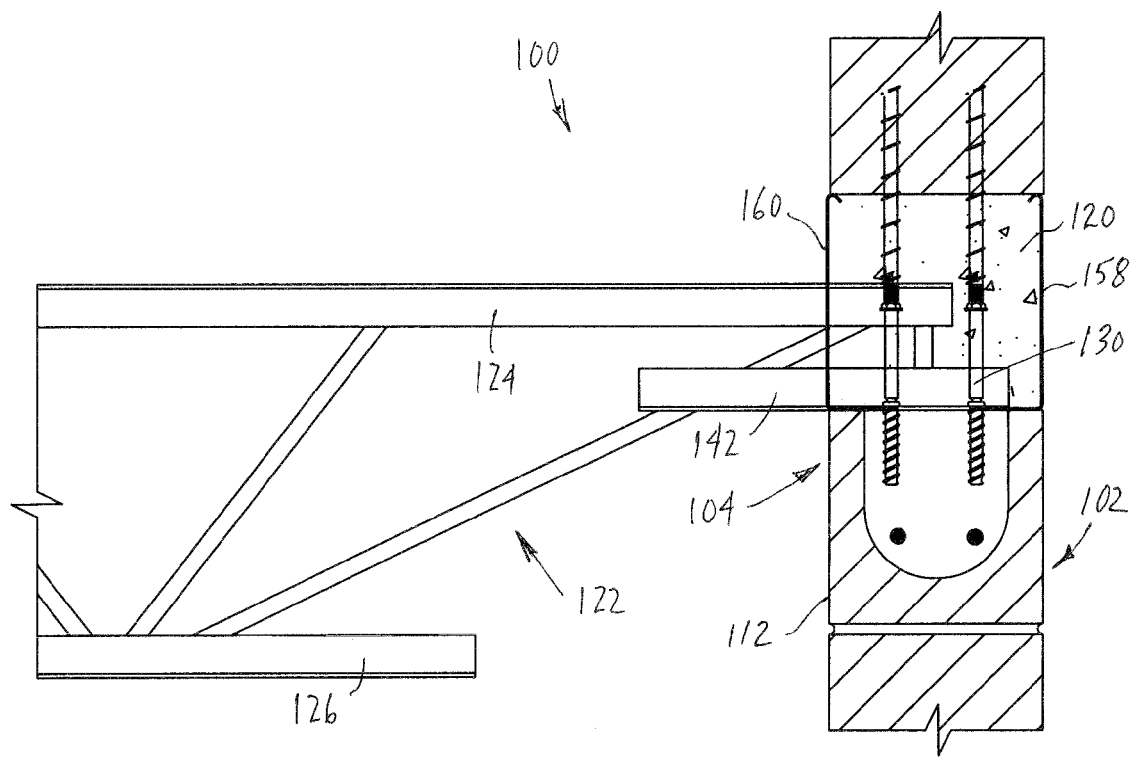
Figure 4:
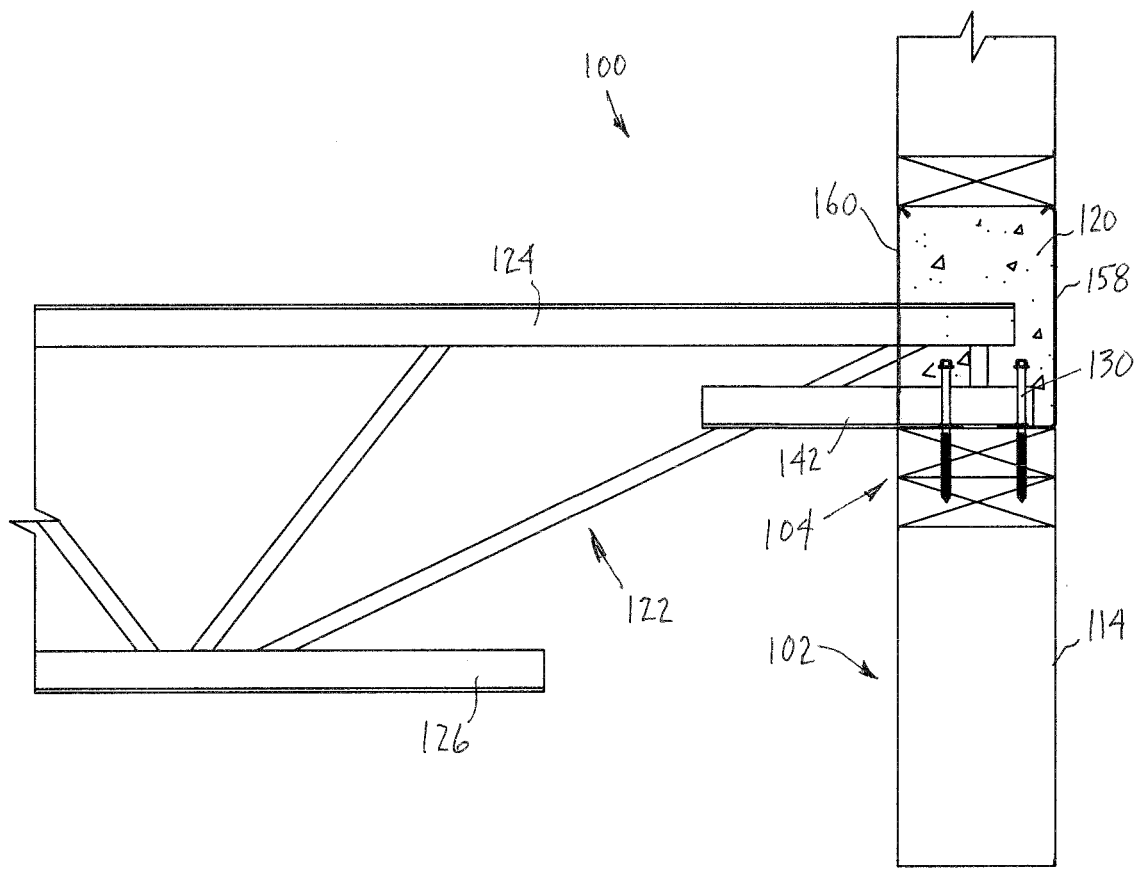
Figure 5:
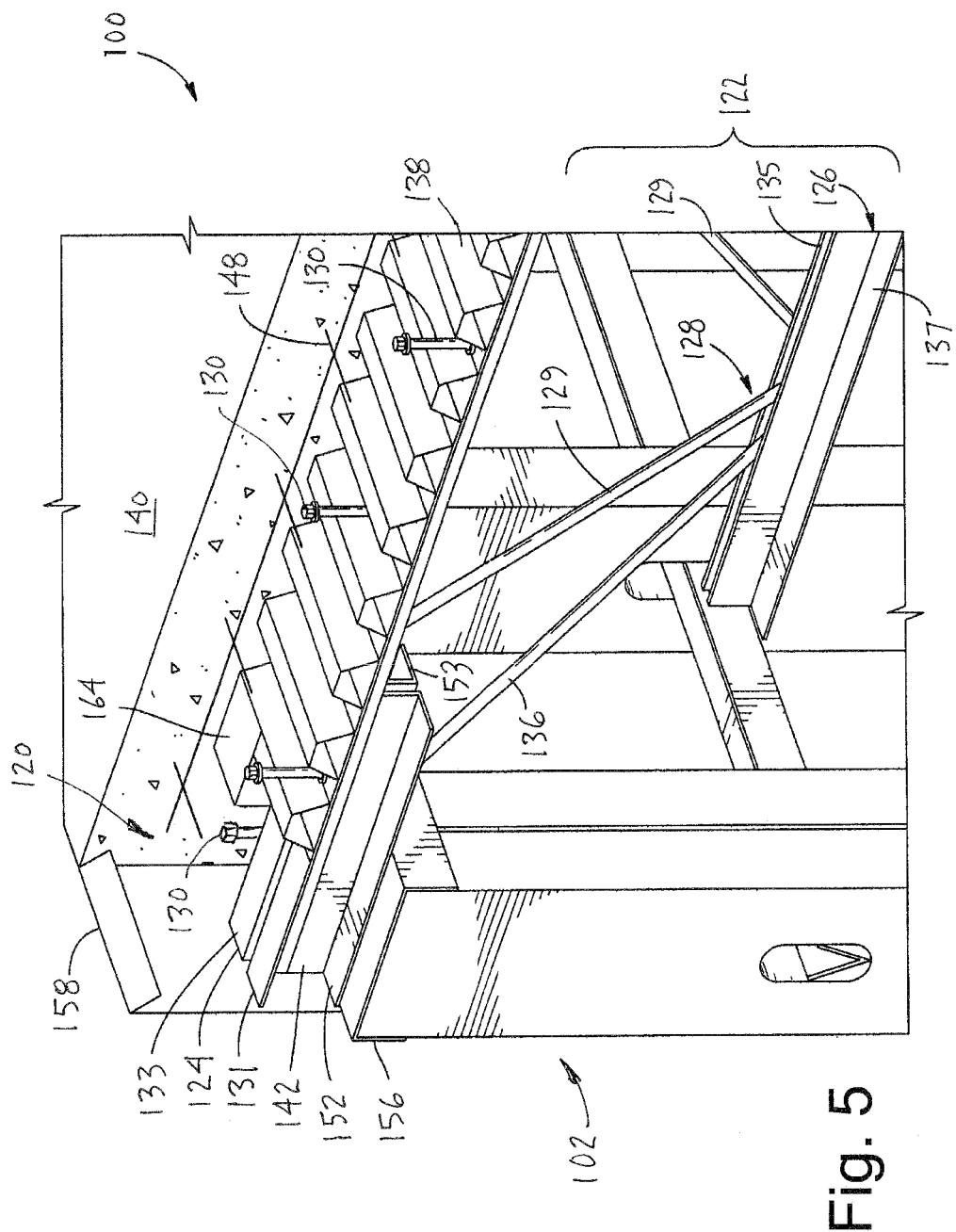
Figure 6A:
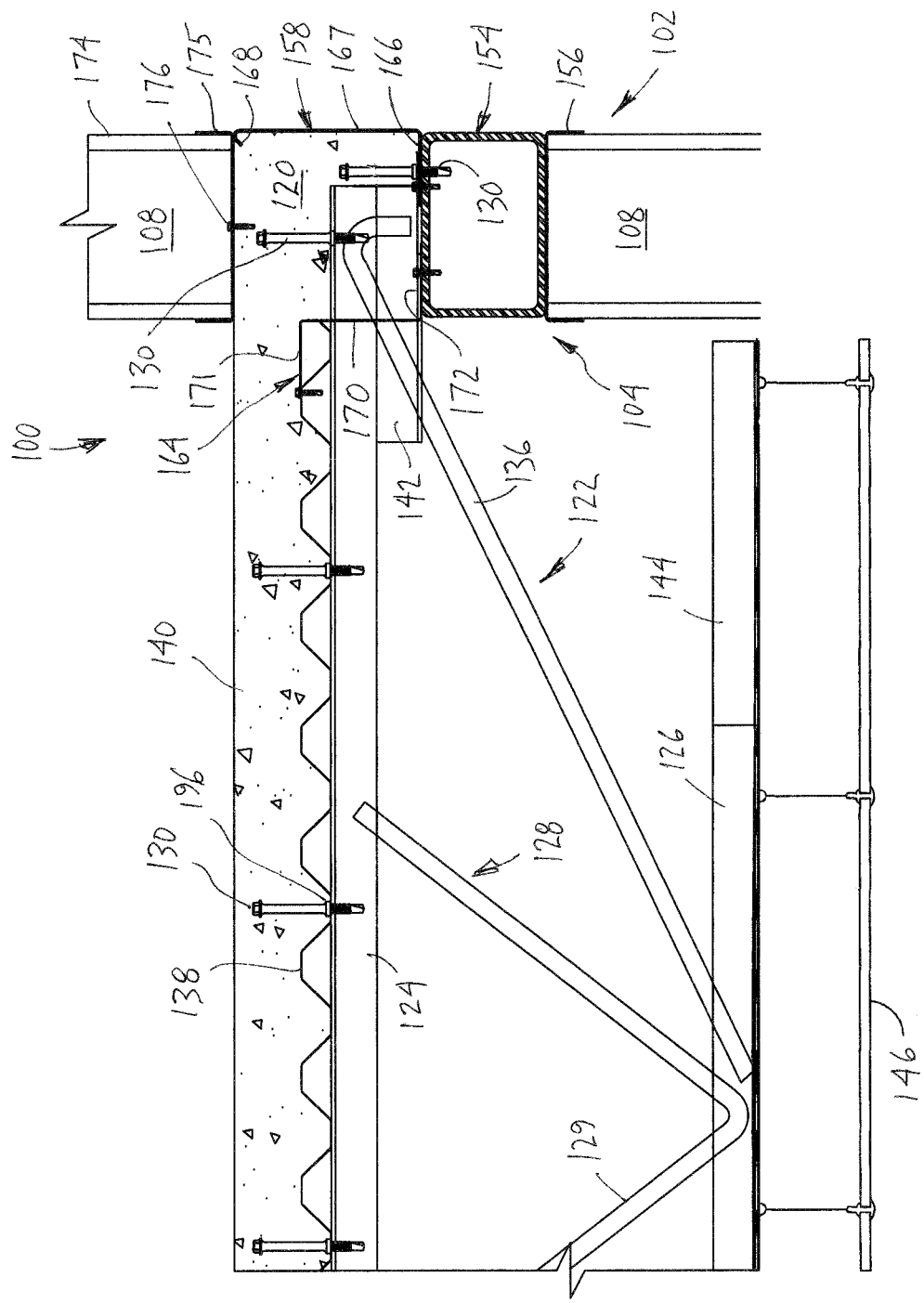
Figure 6B:
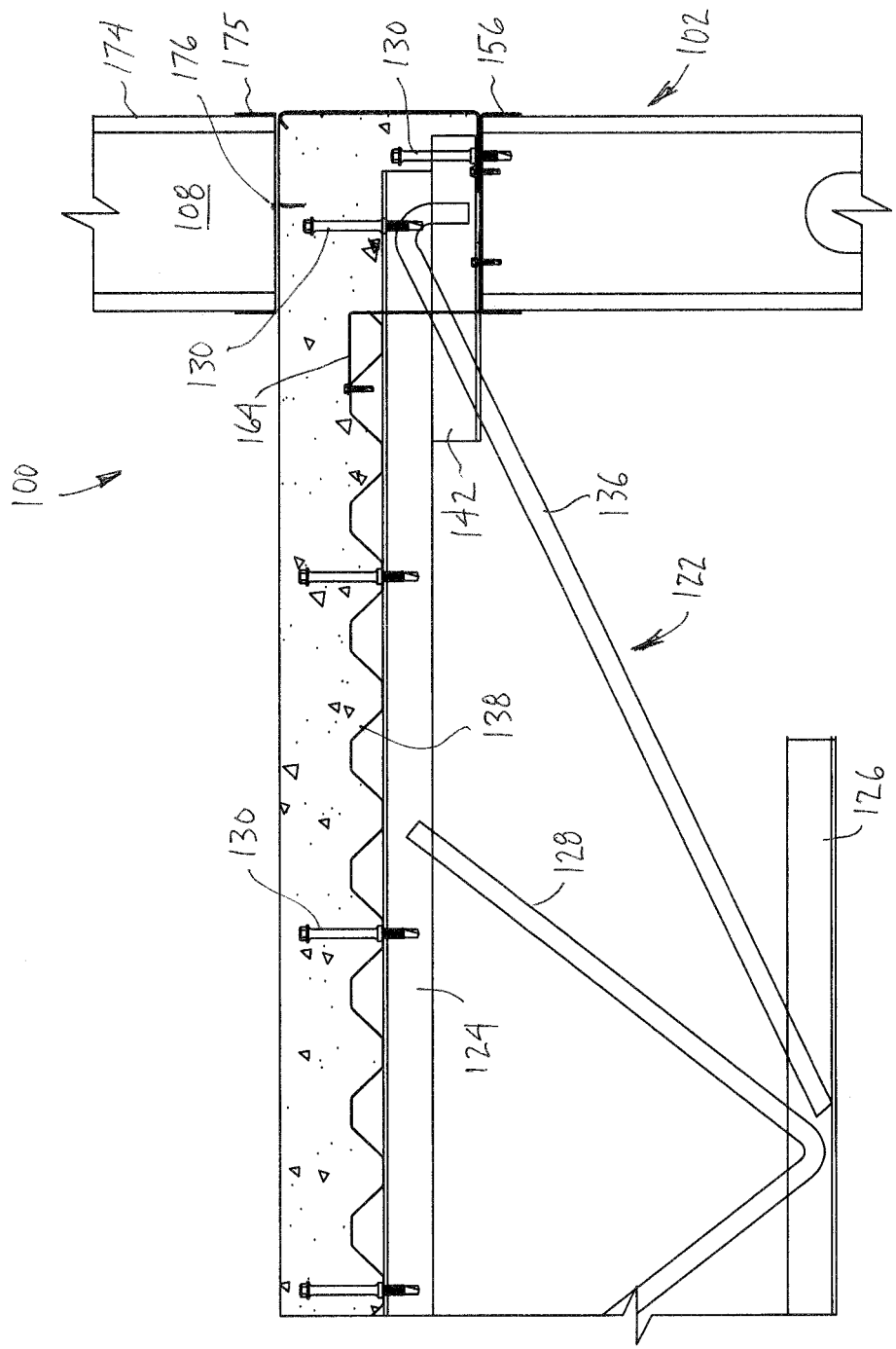
Figures 8A, 8B:
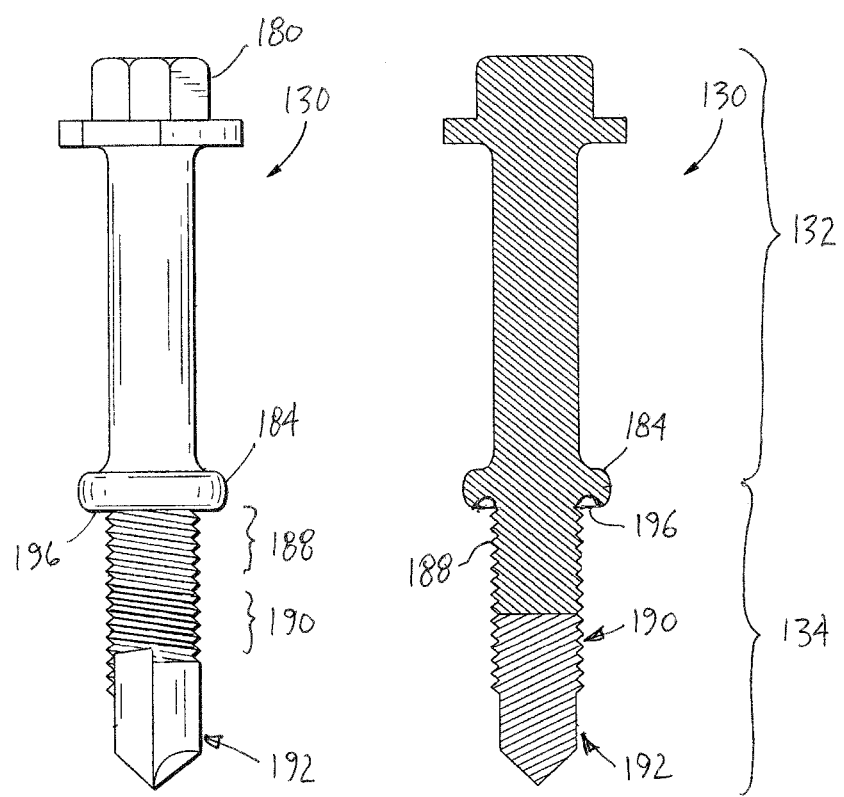
Figures 8C, 8D, 8E:
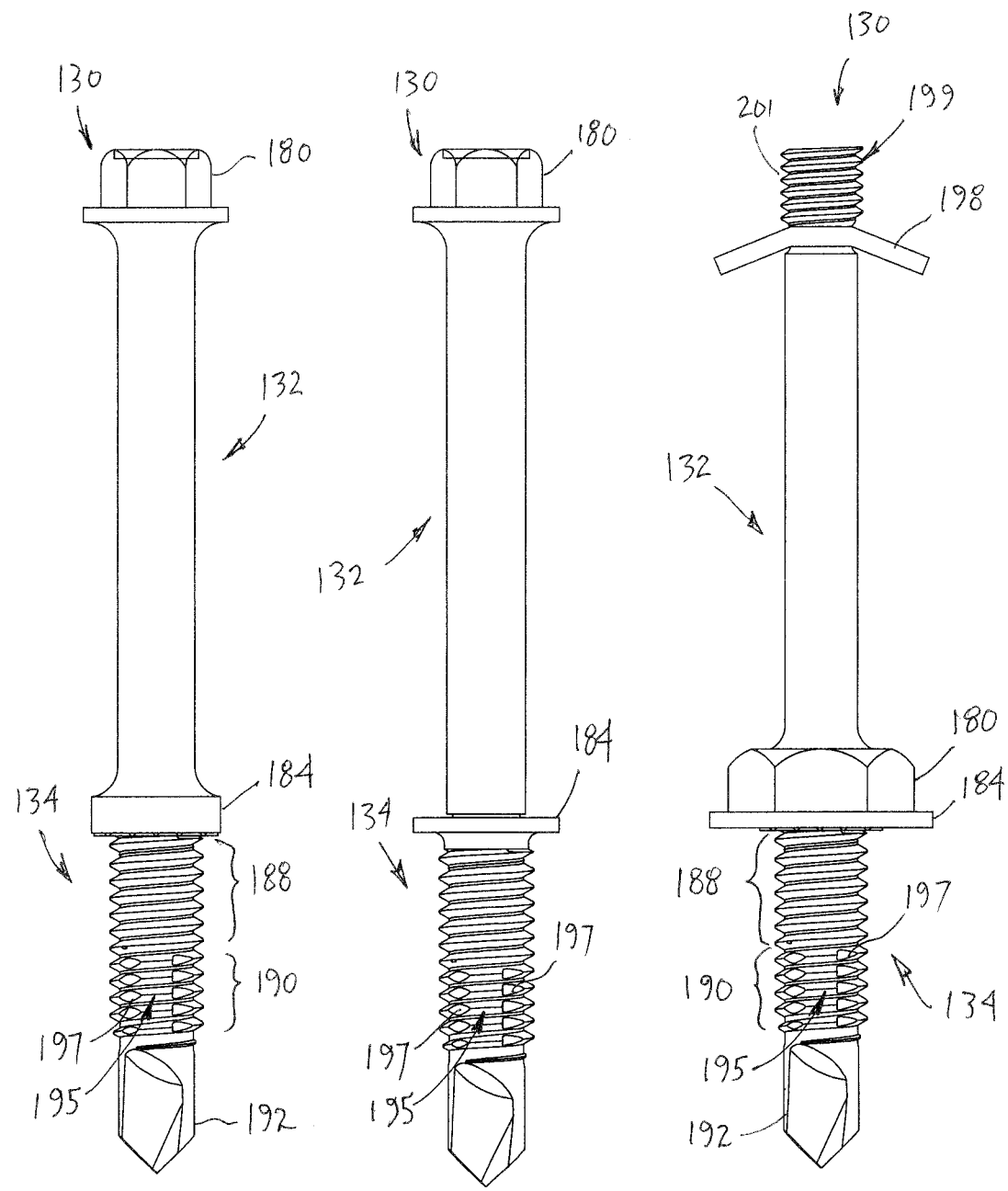
Figure 8F:
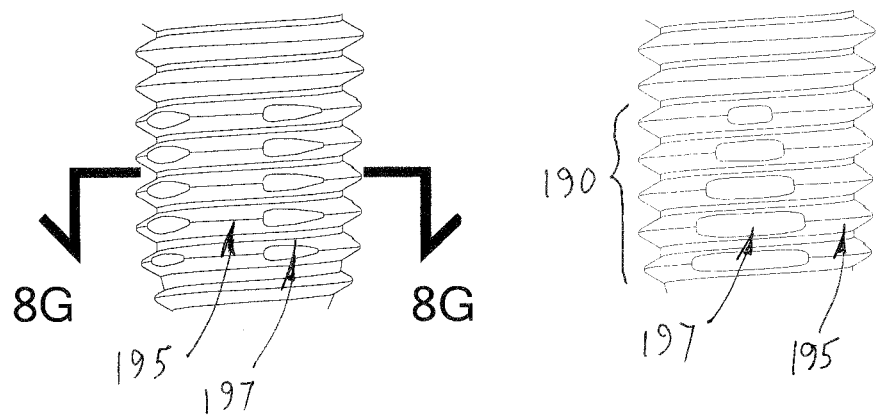
Figure 8G:
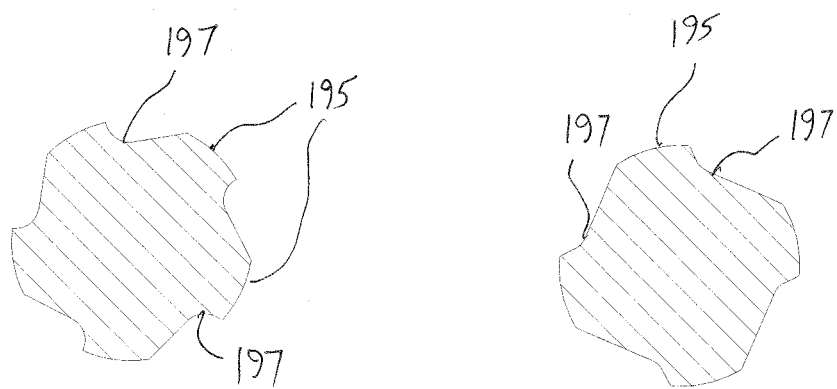
Figure 8H:
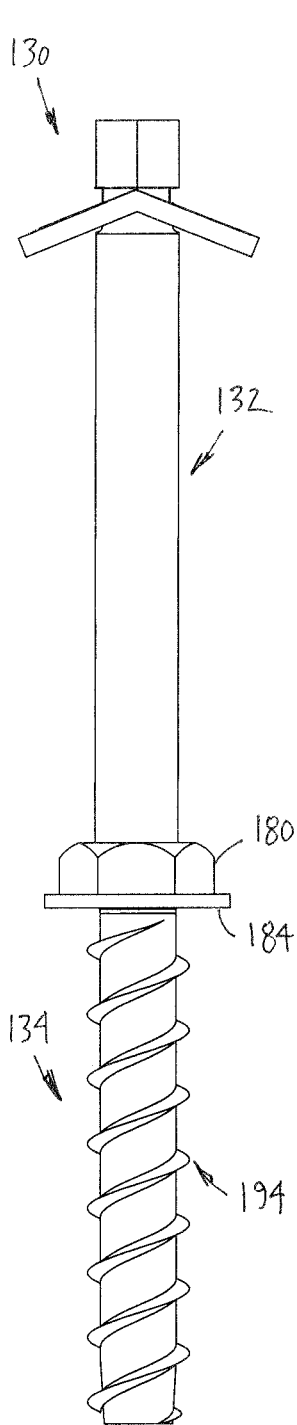
Figure 8I:
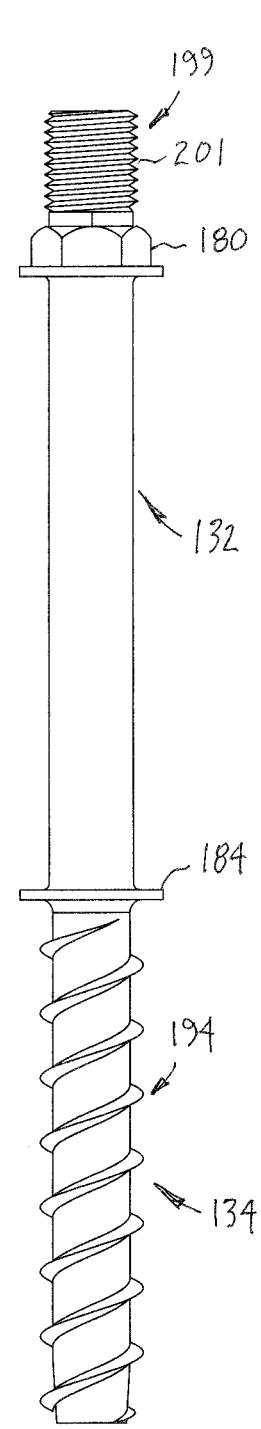
Figure 8J:
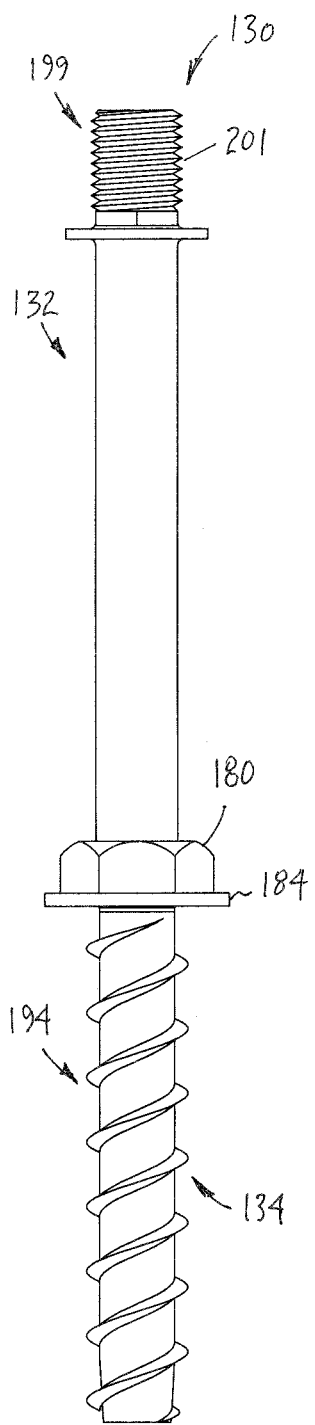
Figure 9:
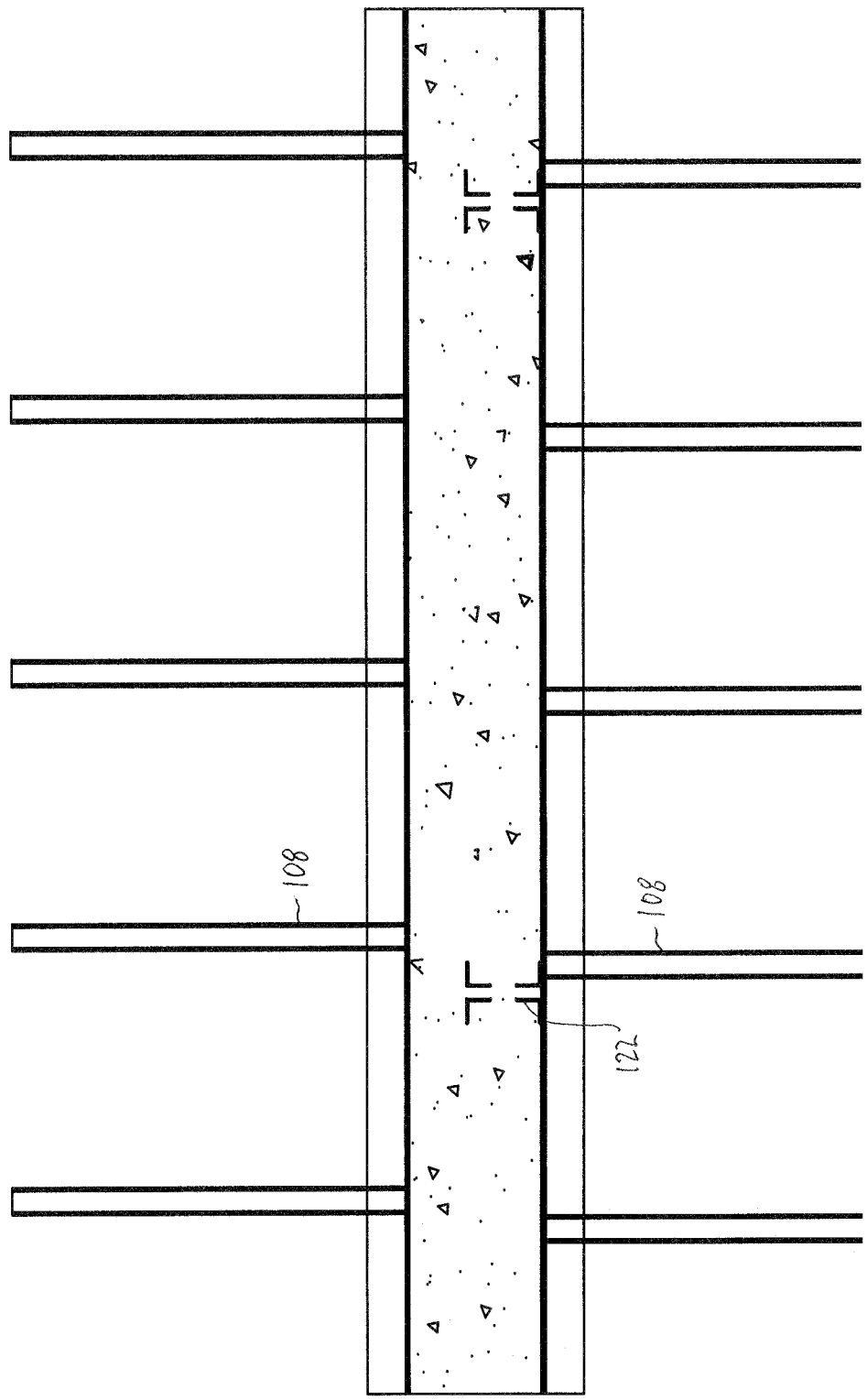
Figure 10A:
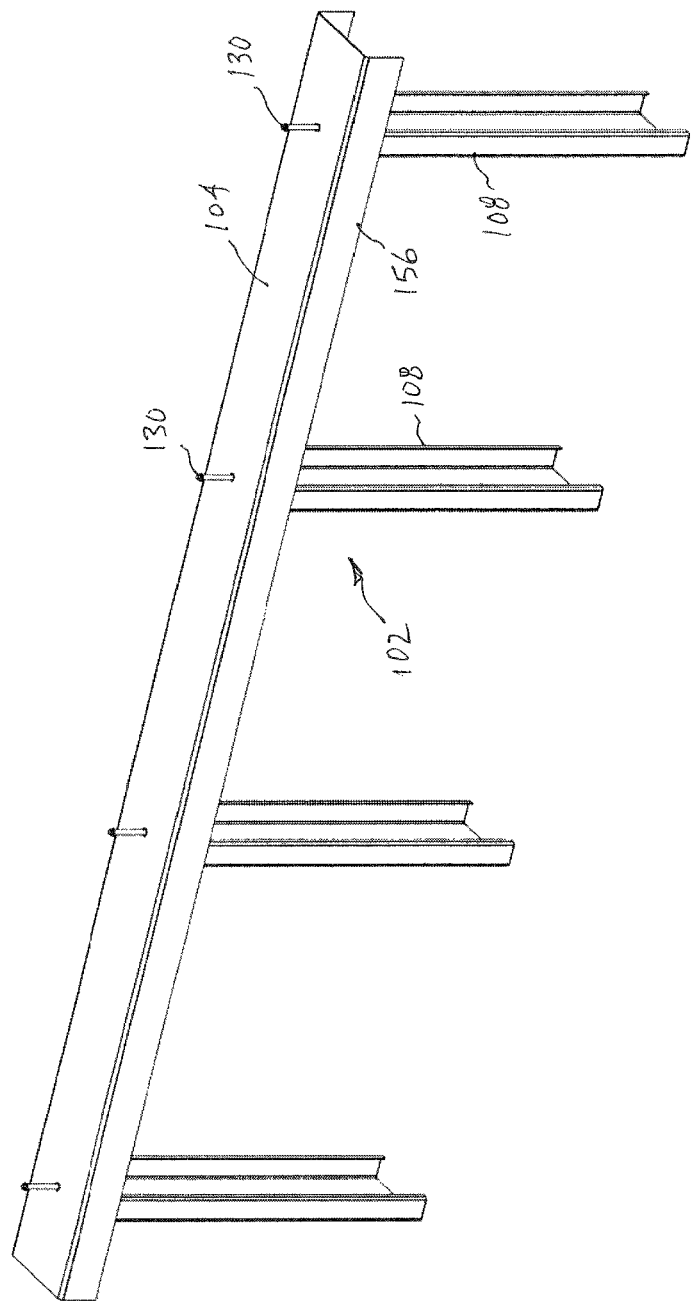
Figure 10B:
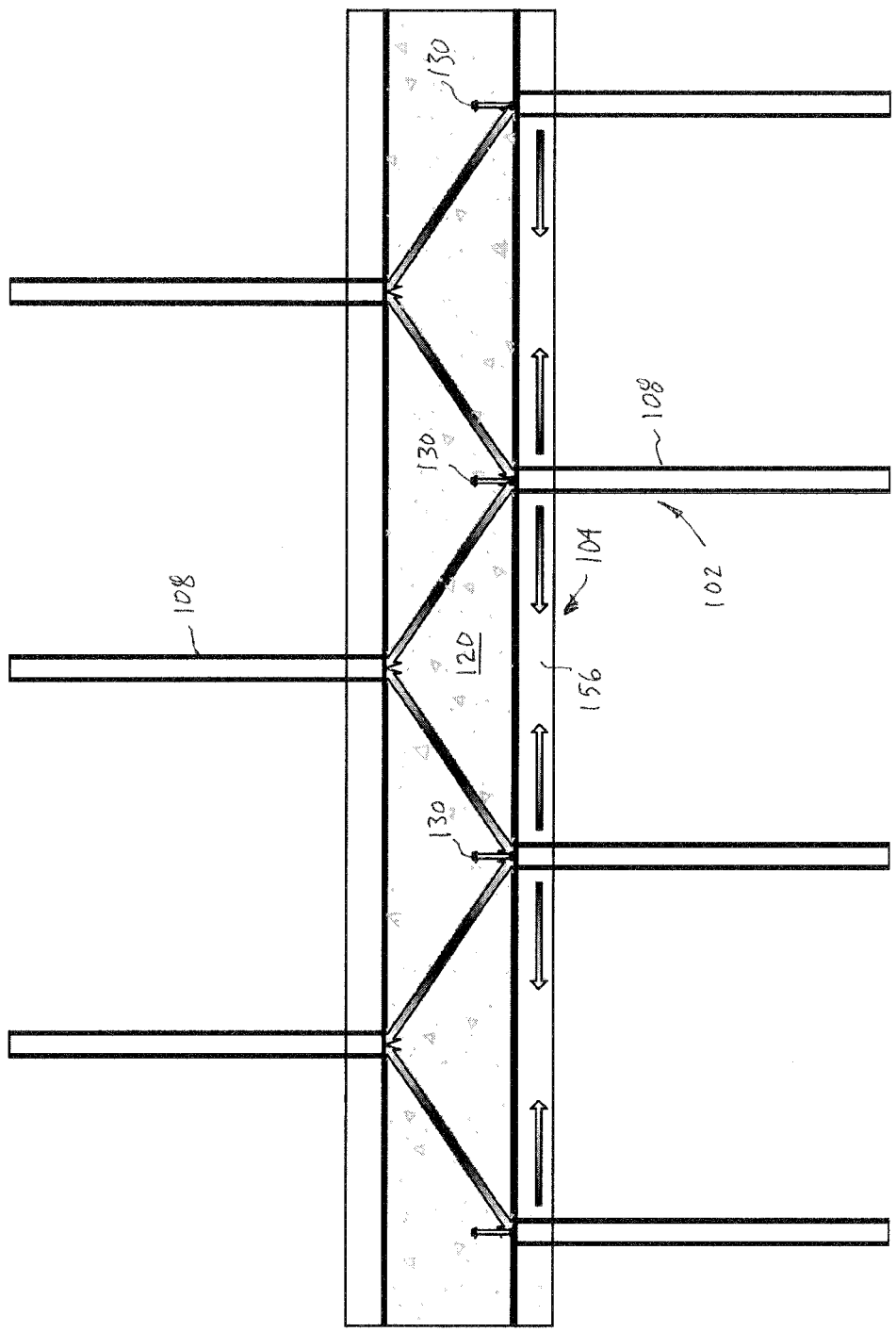
Figure 11A:
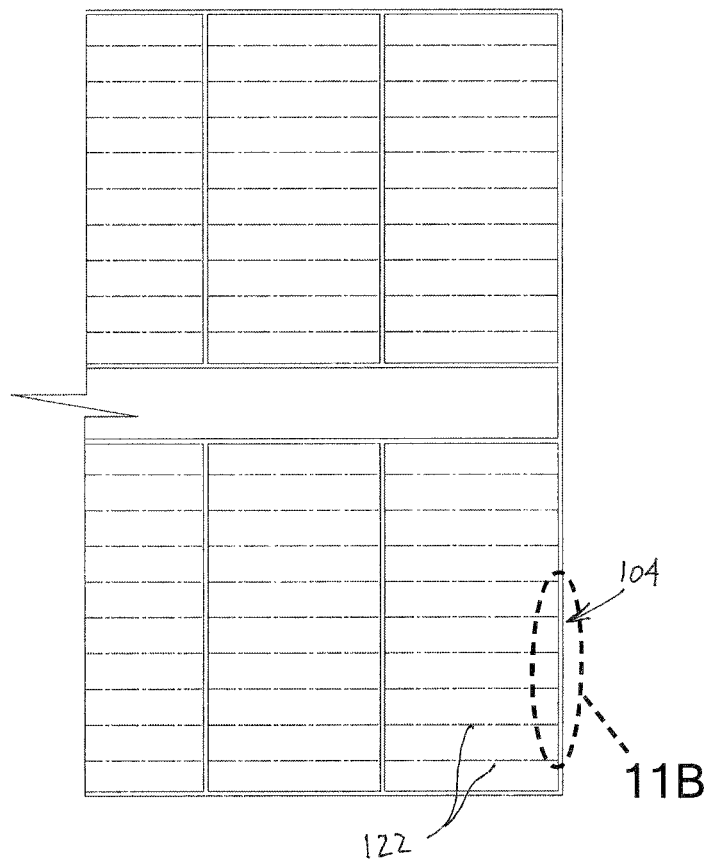
Figure 11B:
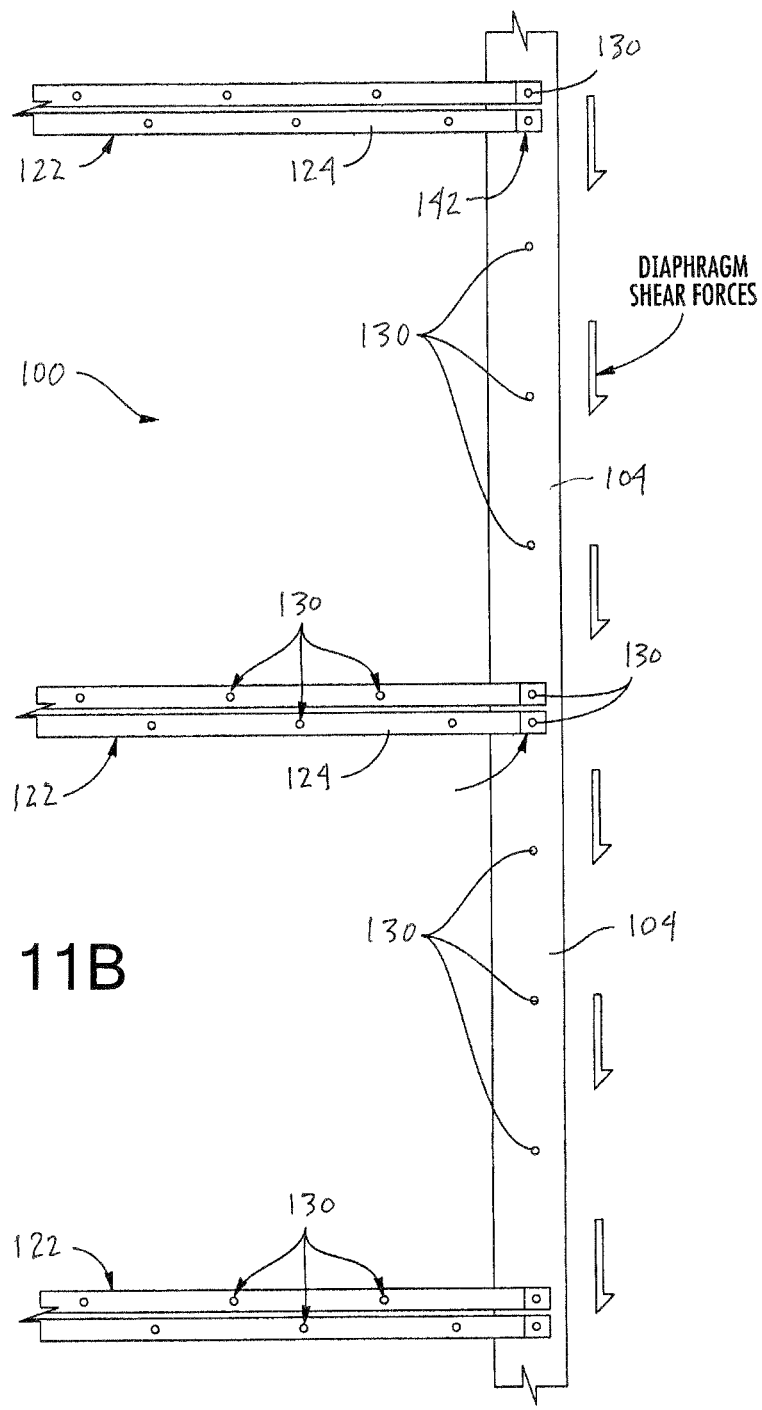
Figure 13:
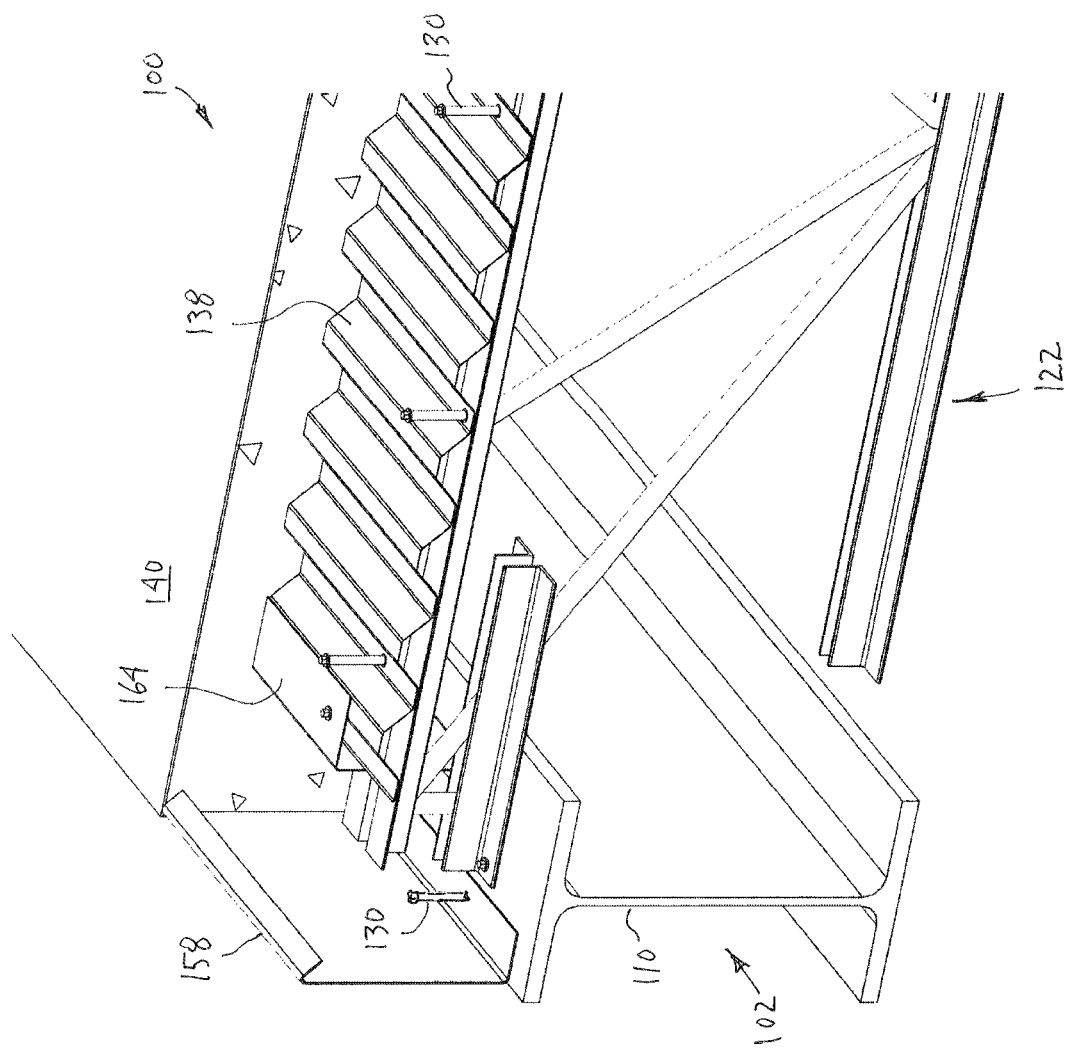
Figure 14:
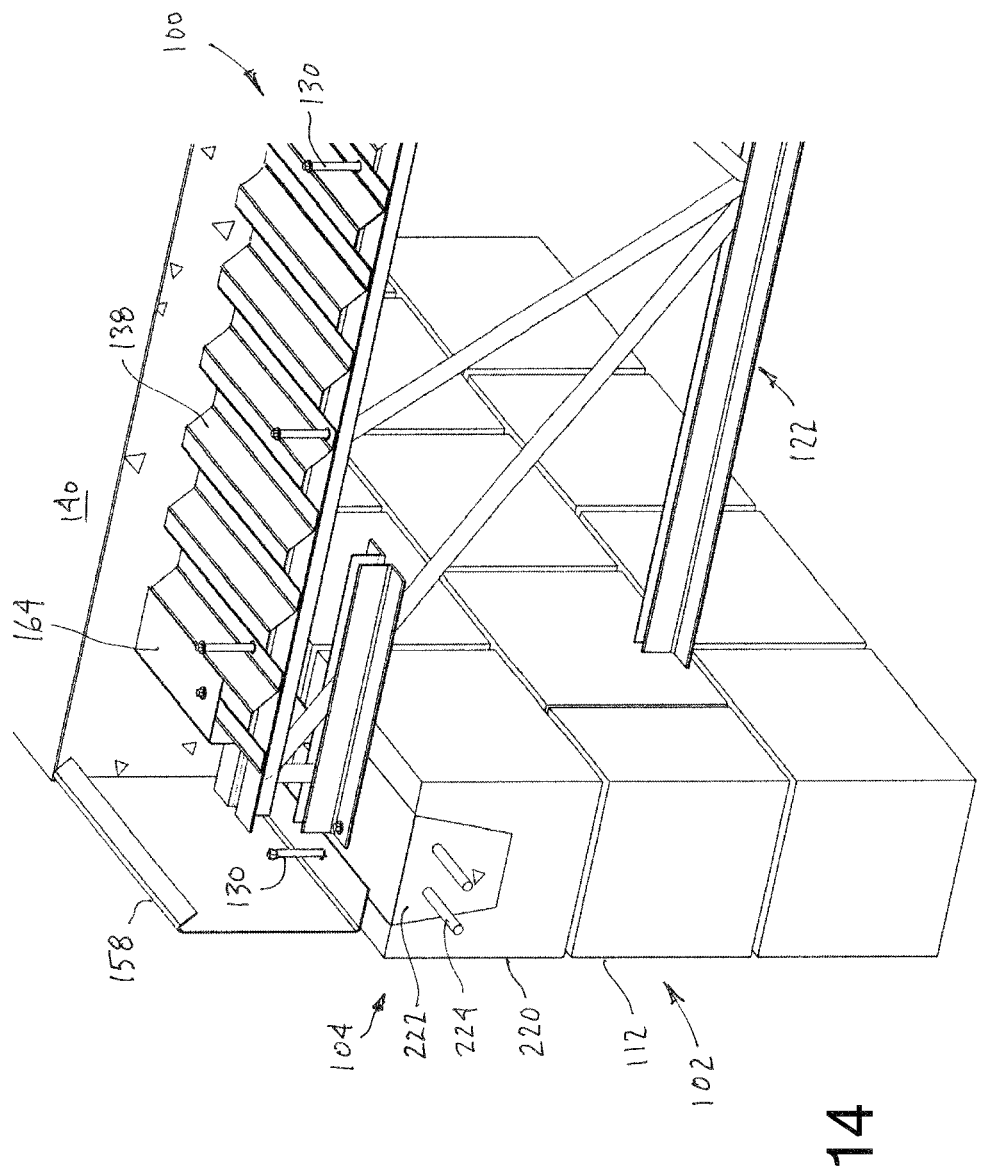
Figure 15:
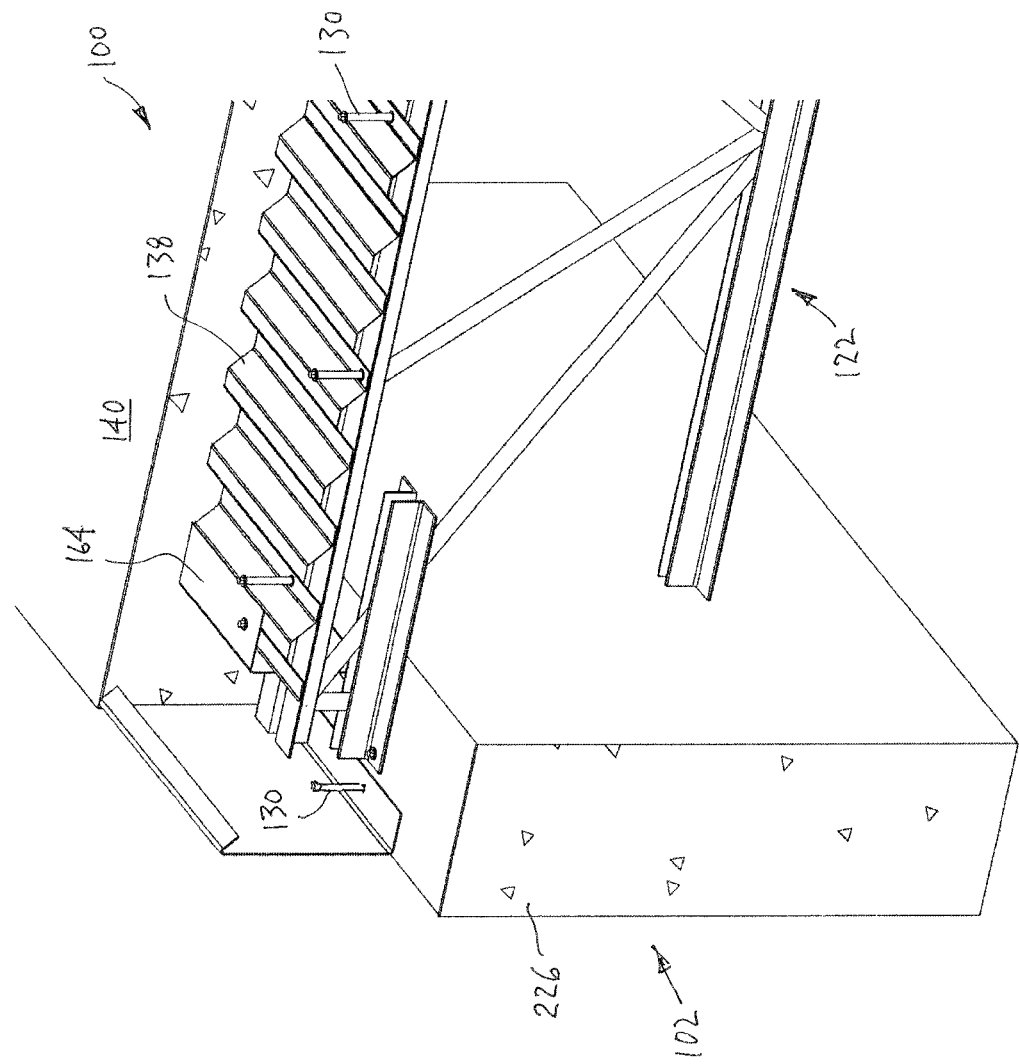
Figure 16:
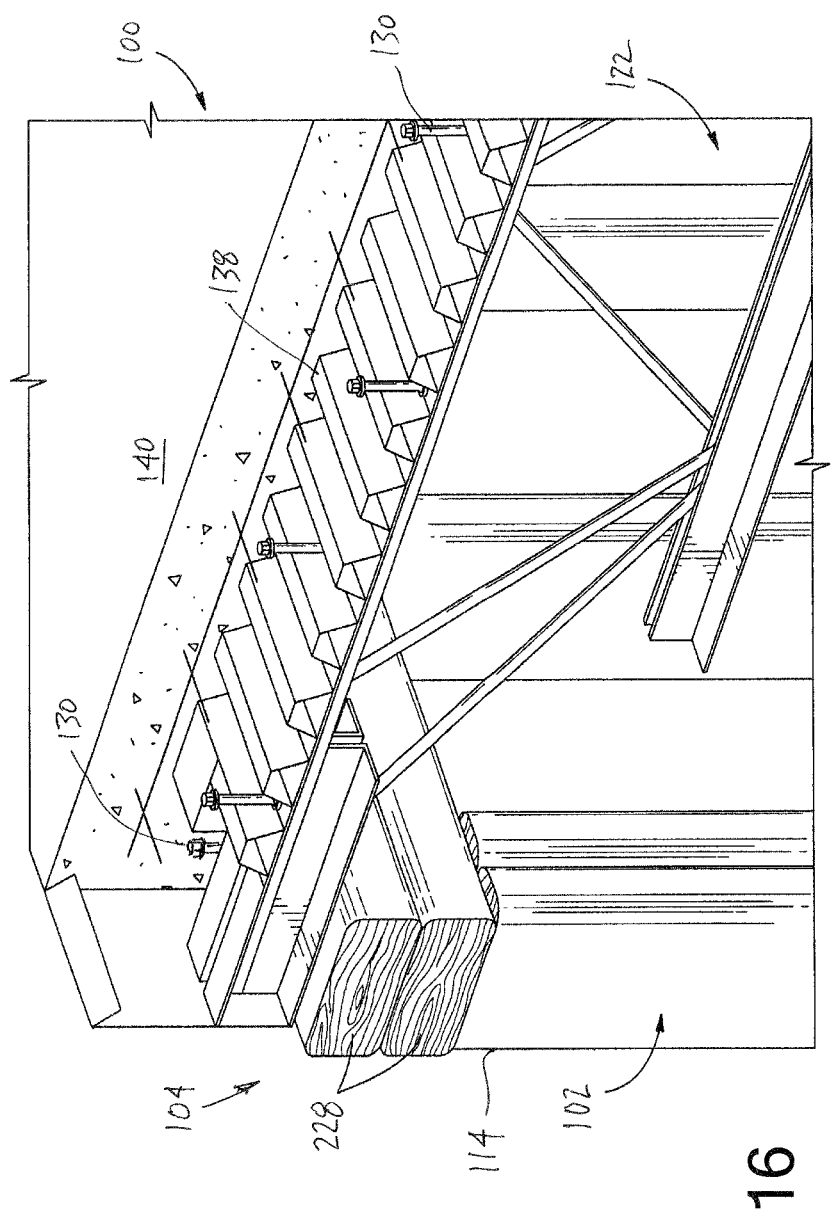
Figure 17A:
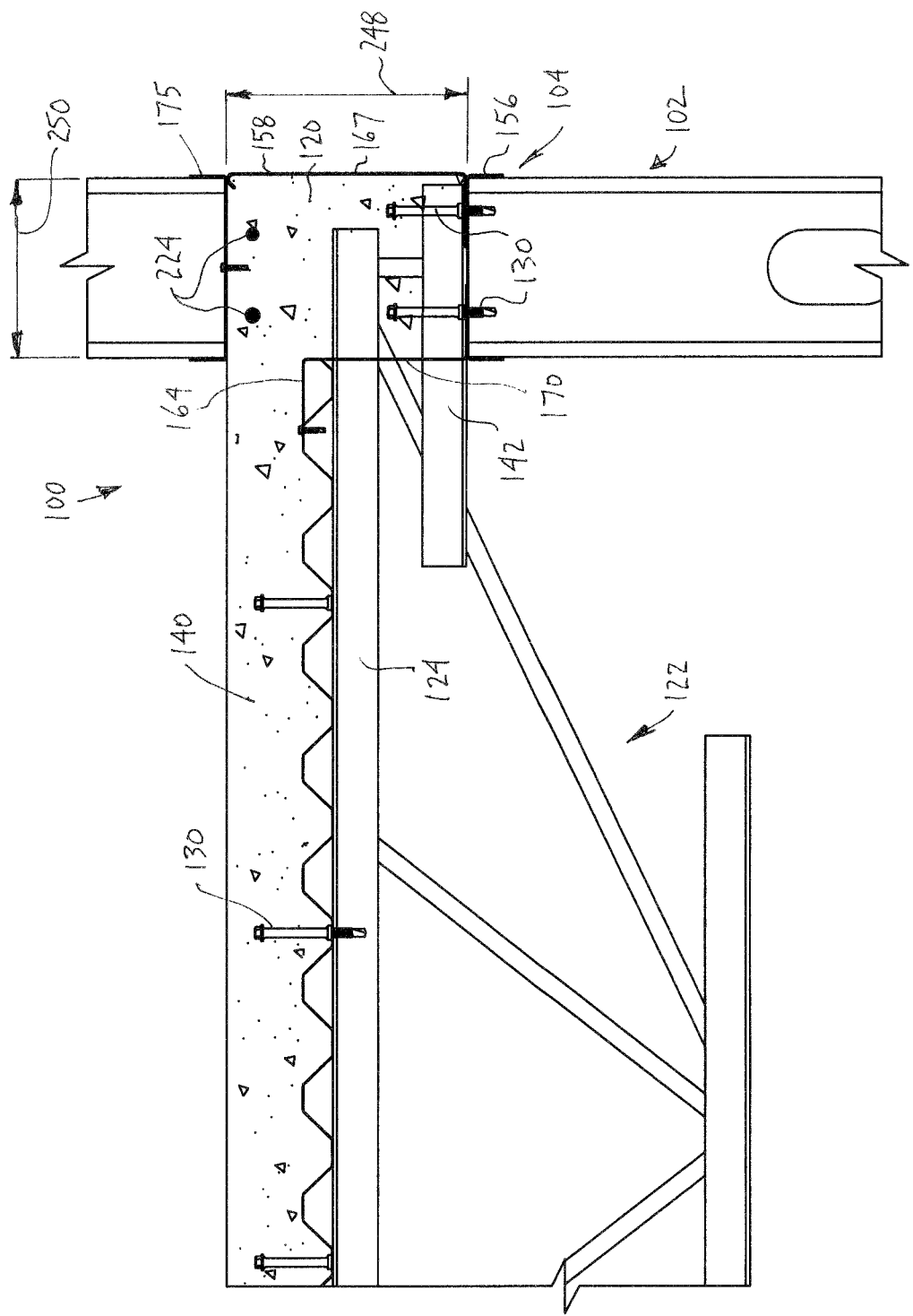
Figure 18:
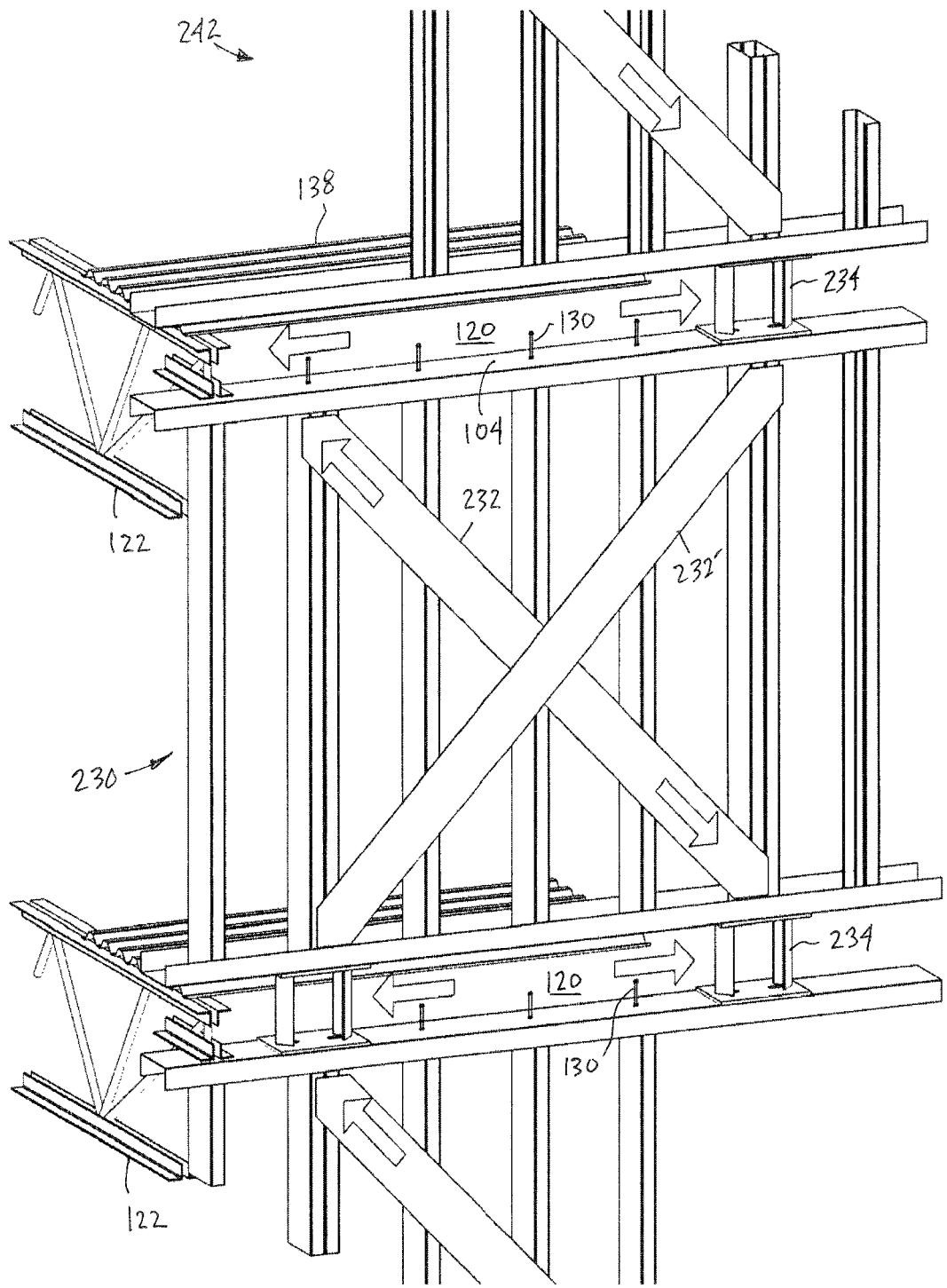
Figure 19A:
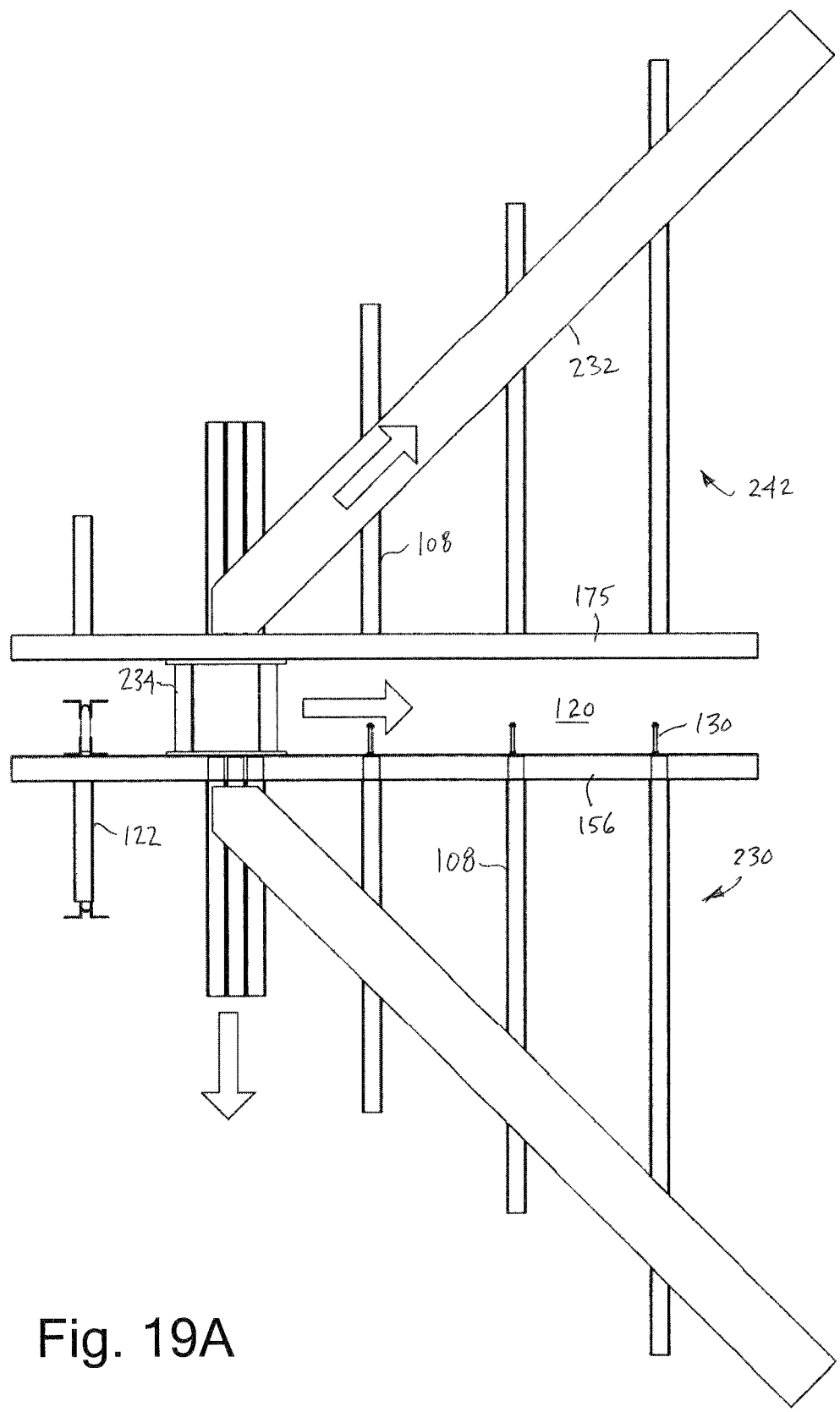
Figure 19B:
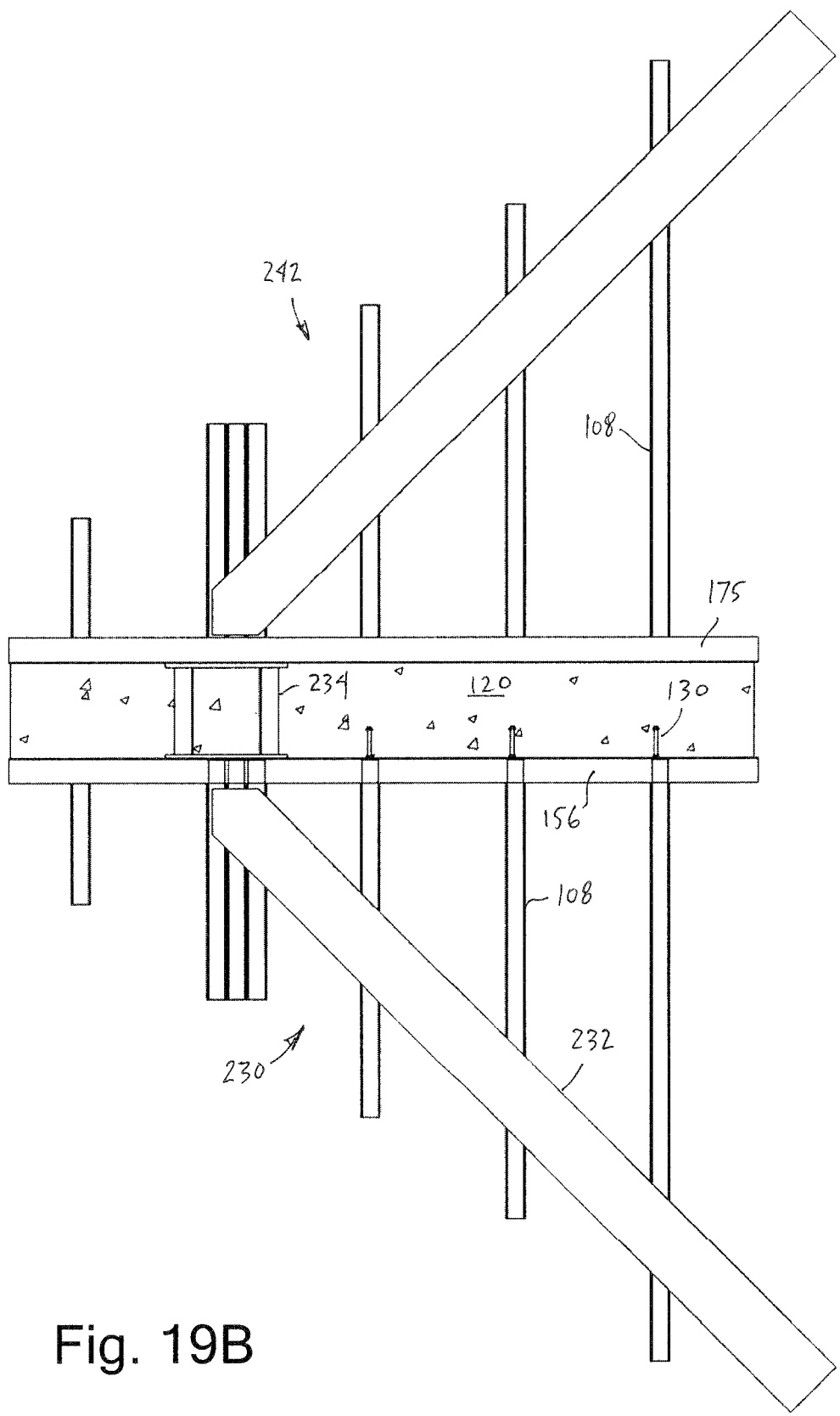
Figure 20:
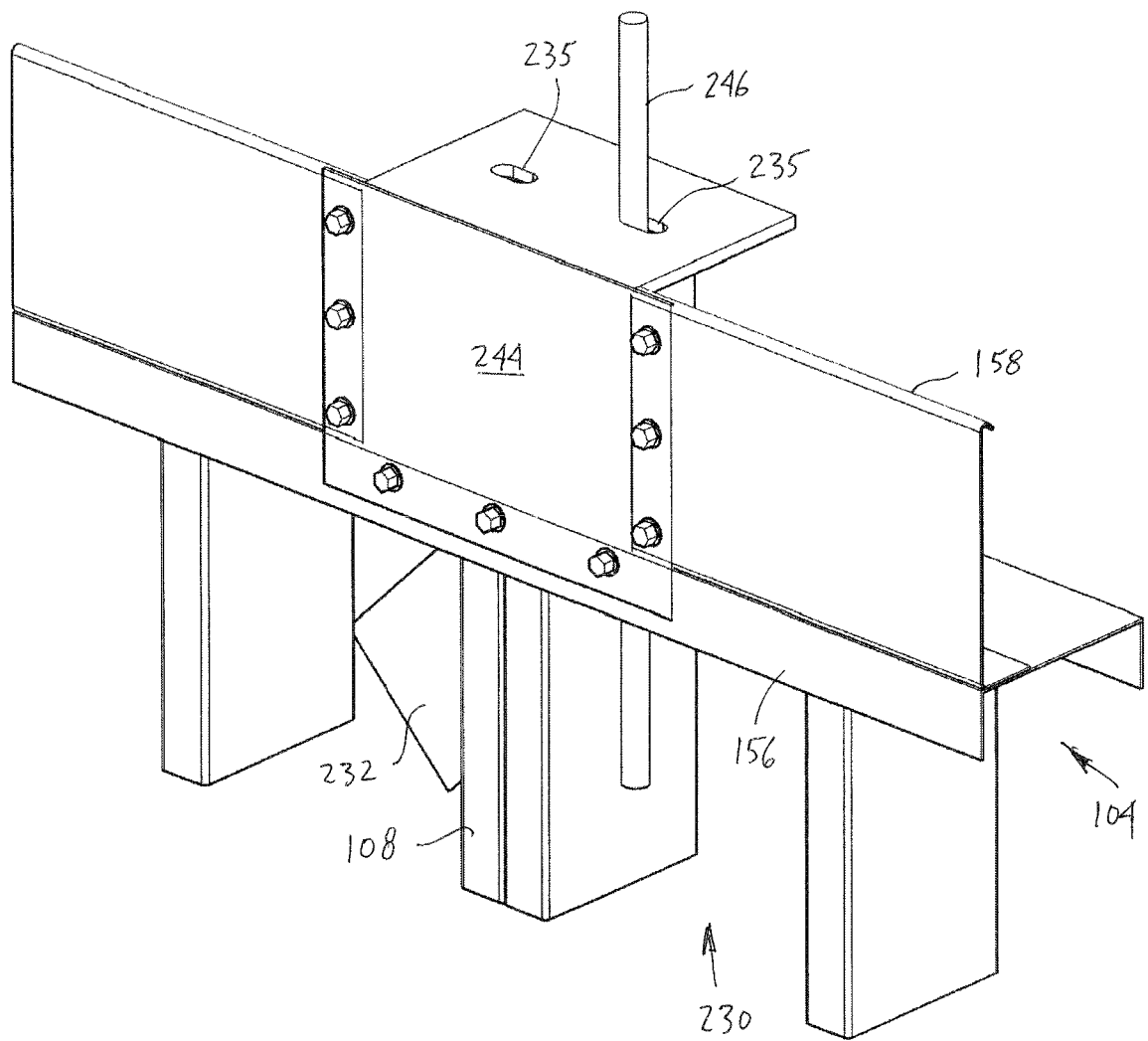
Figure 21:
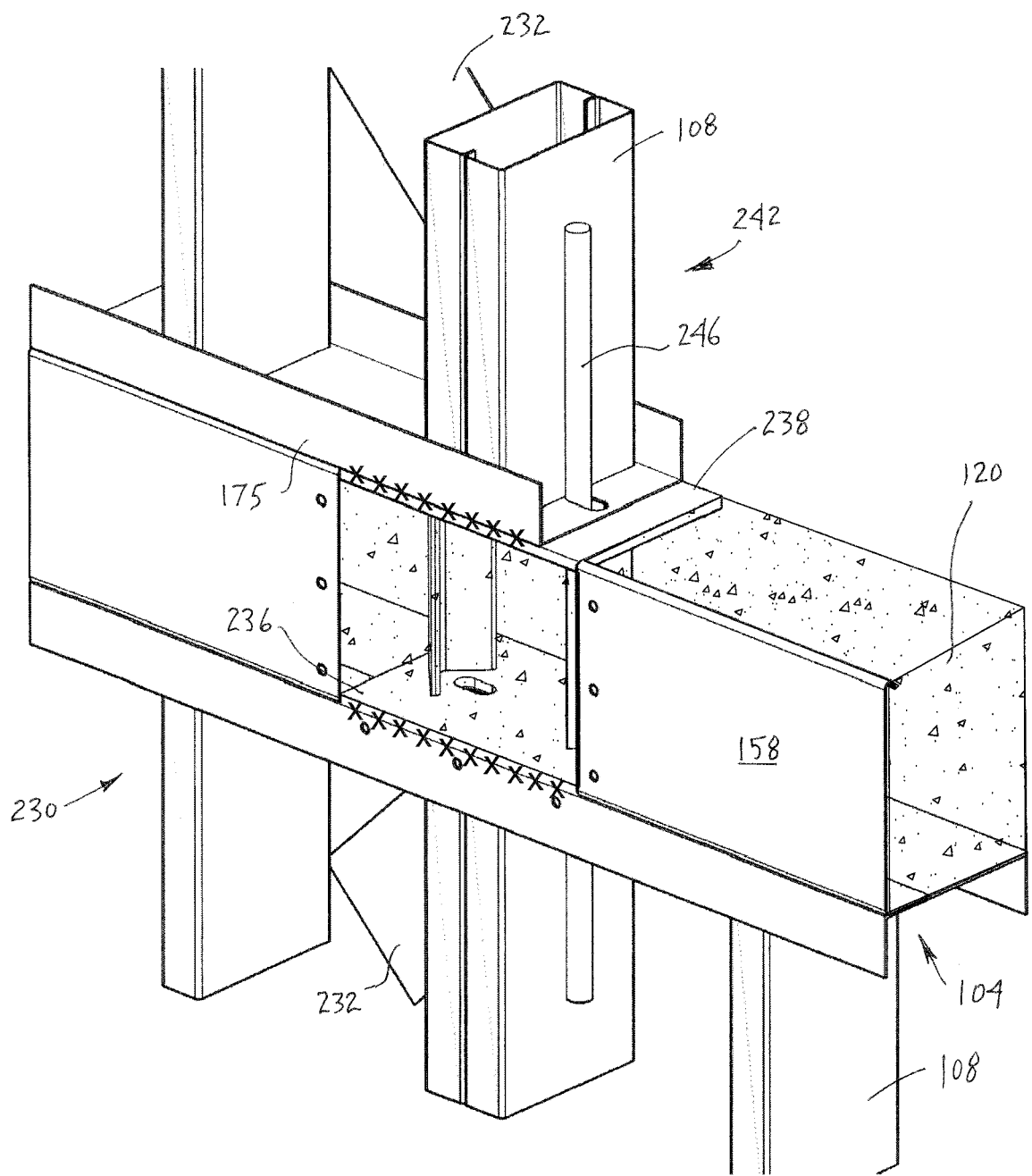
Figure 22:
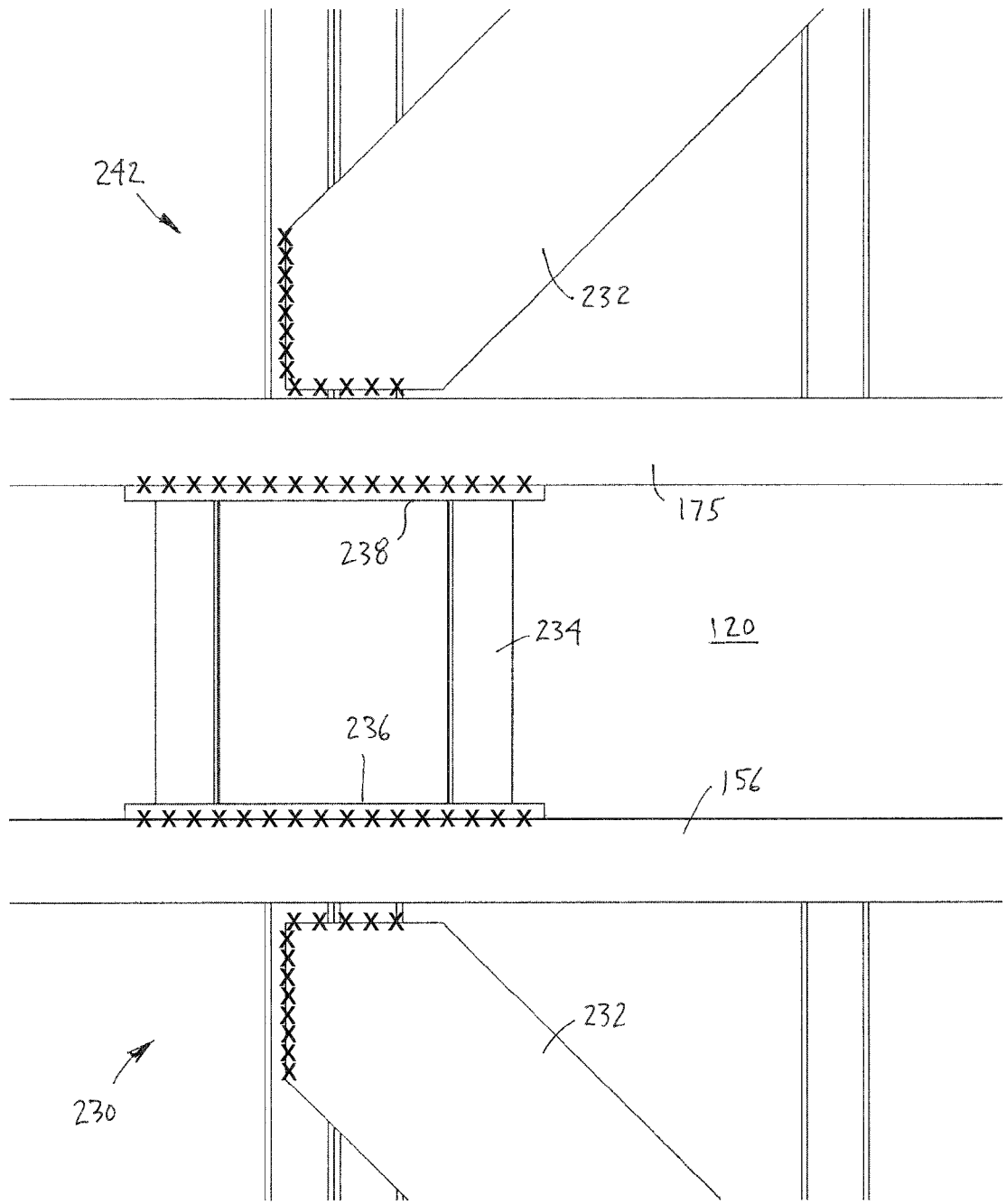
Figure 23A:
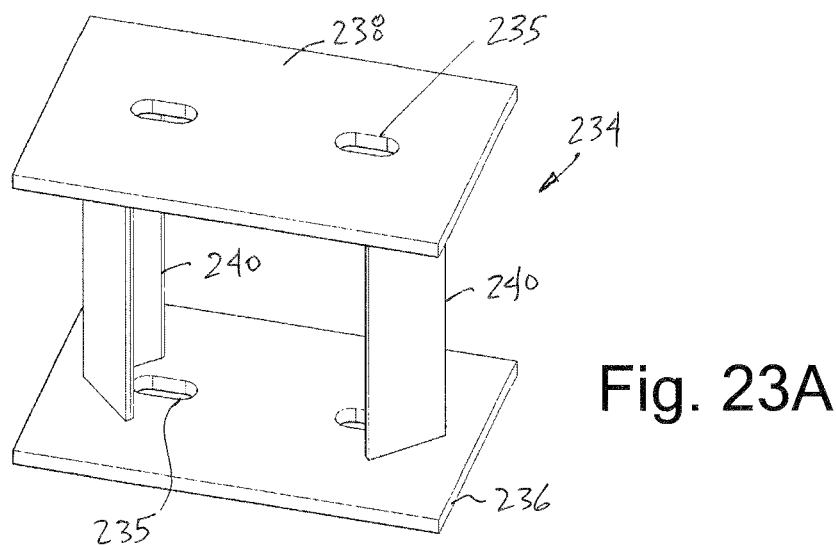
Figure 23B:
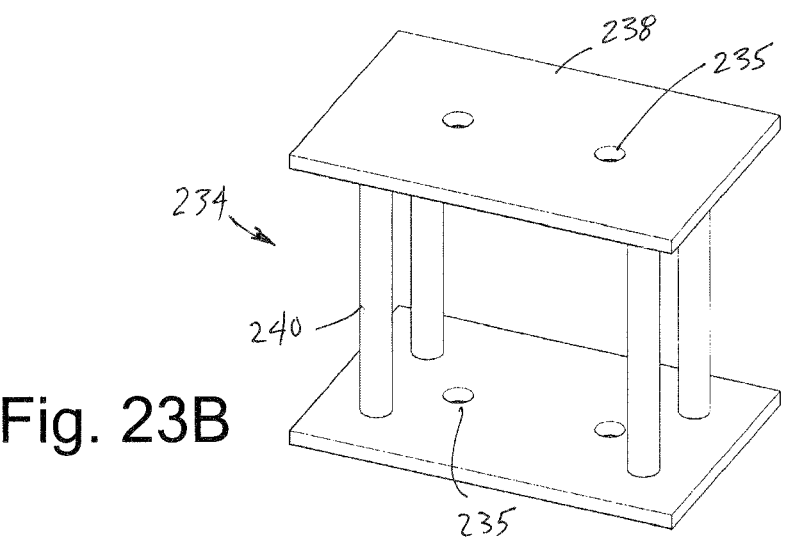
Figure 23C:
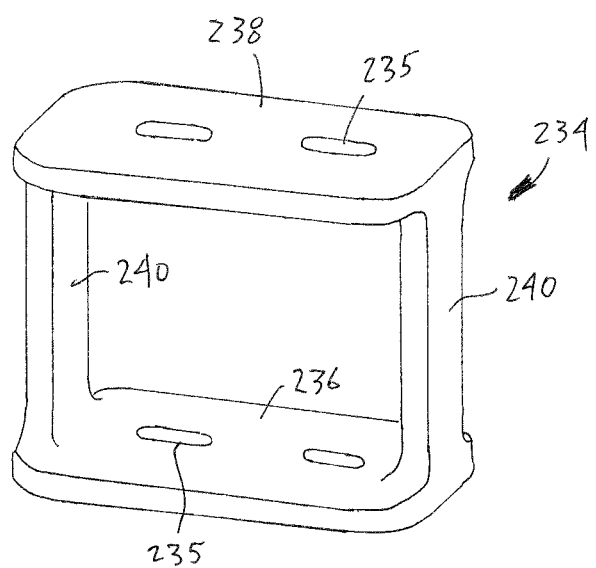
Figure 24:
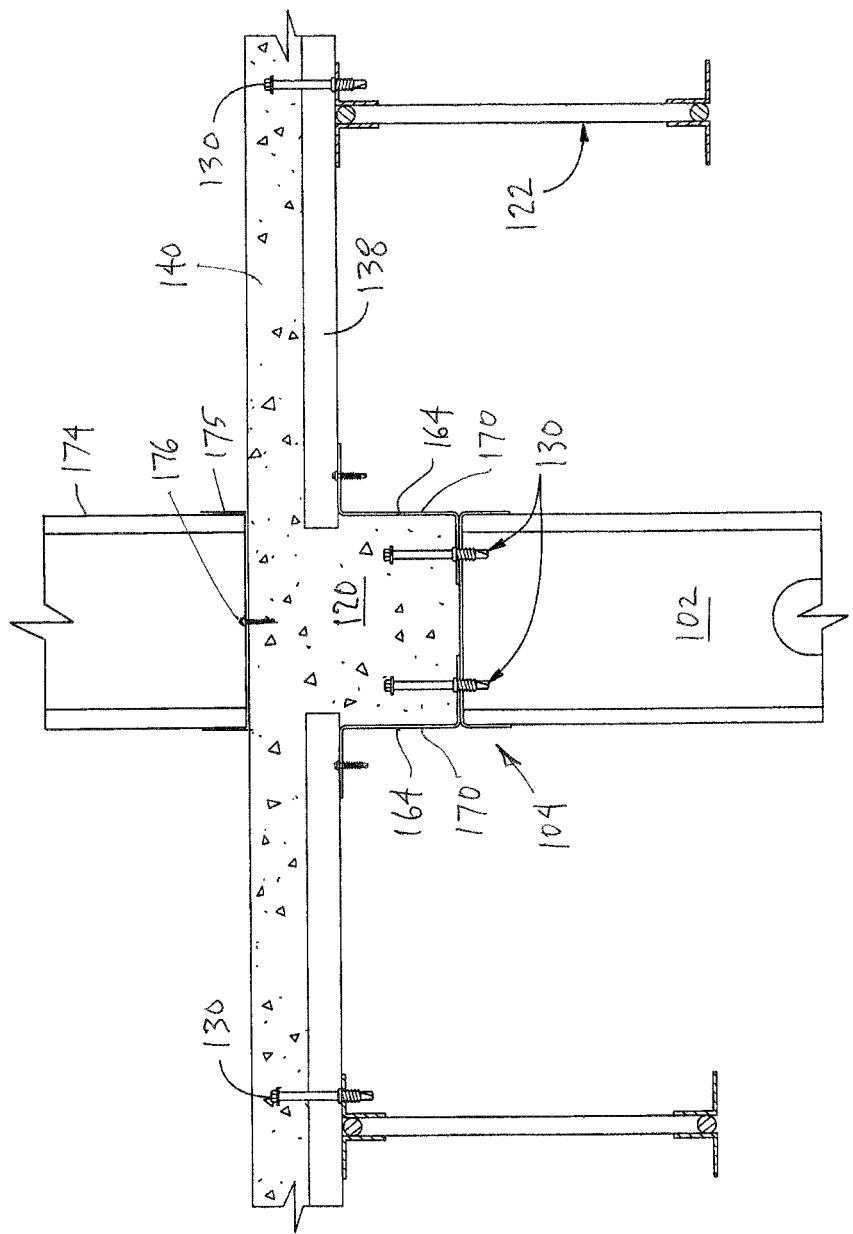
Figure 25:
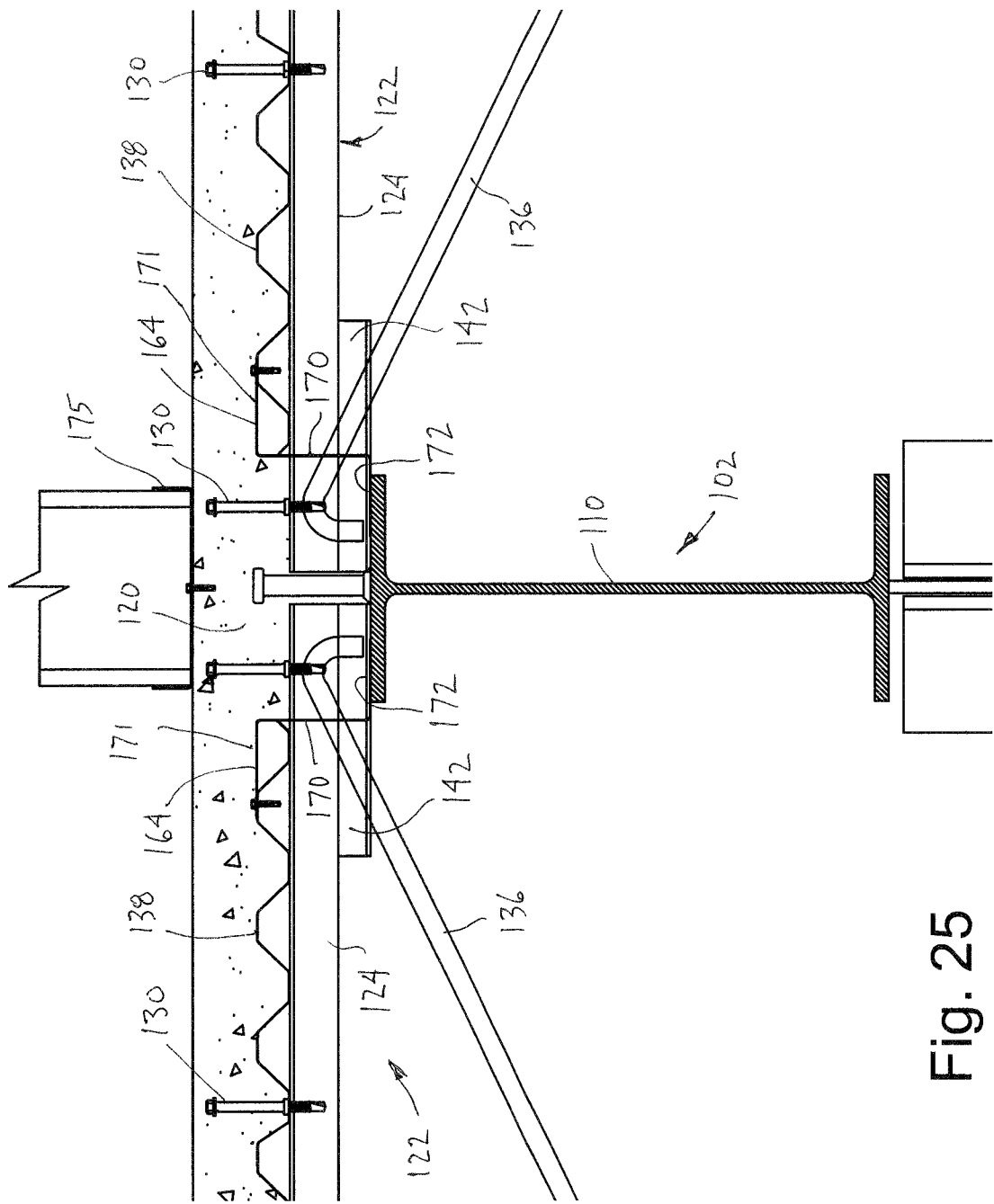
Figure 27A:
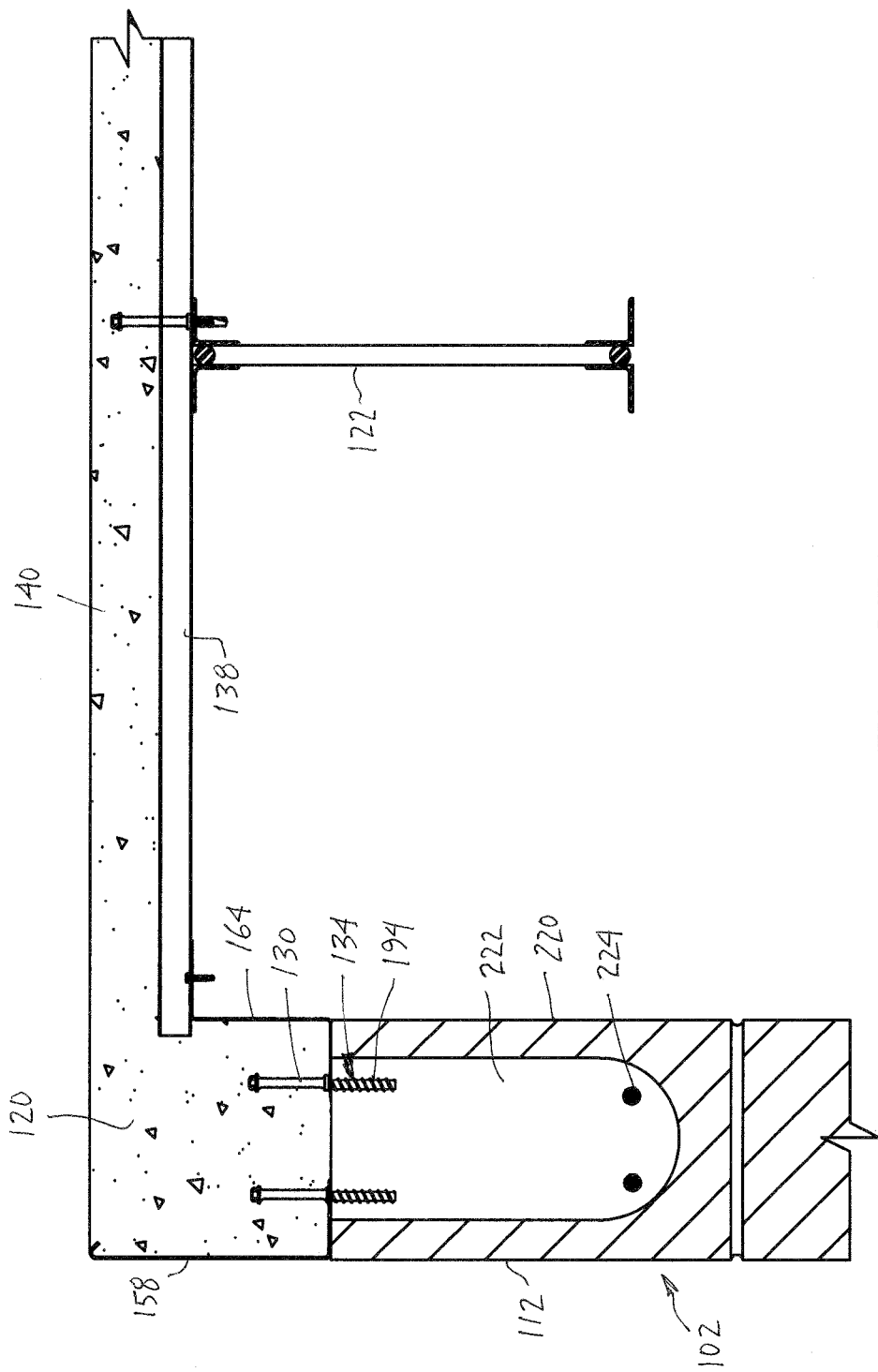
Figure 27B:
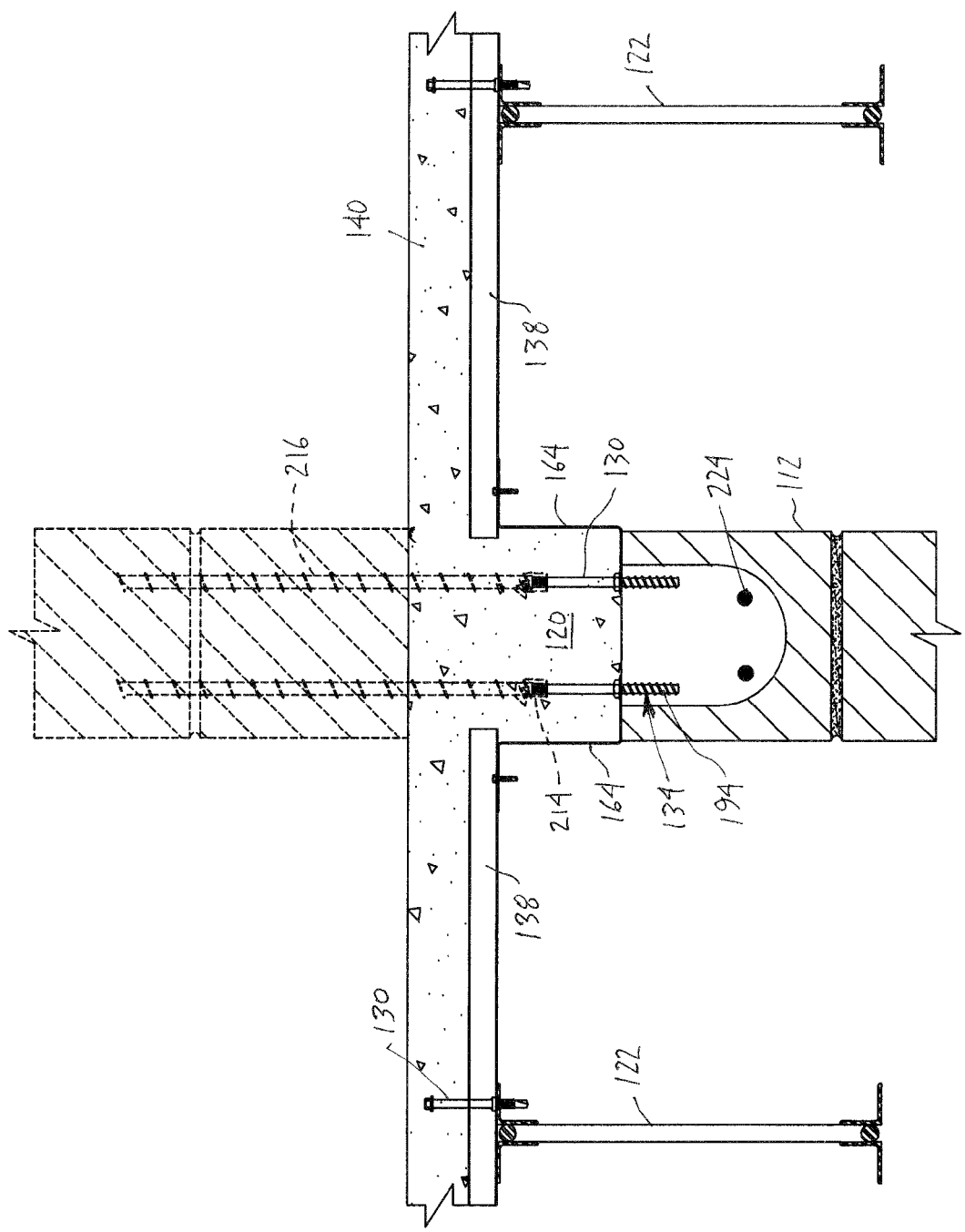
Figure 28:
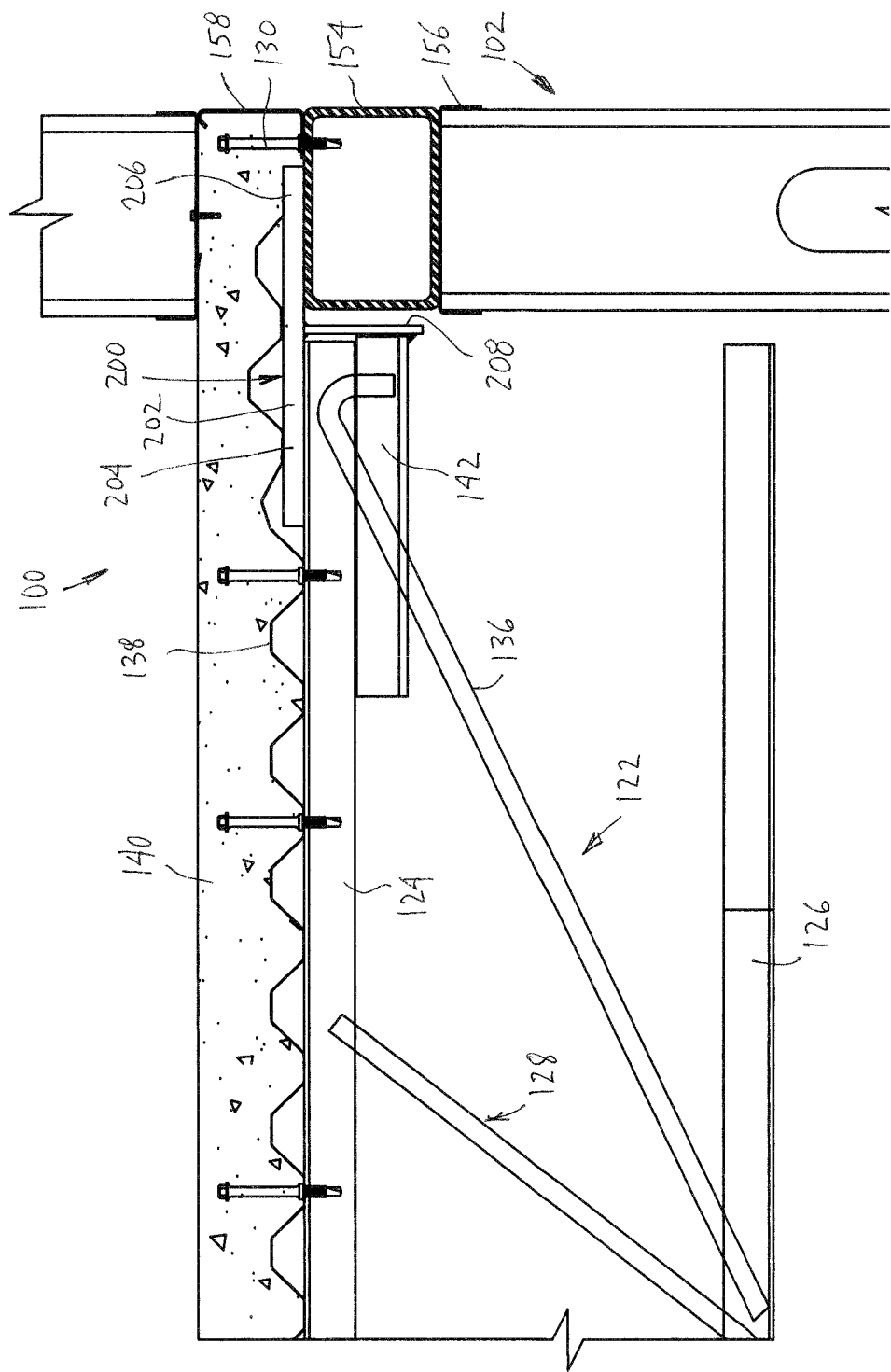
Figure 29:
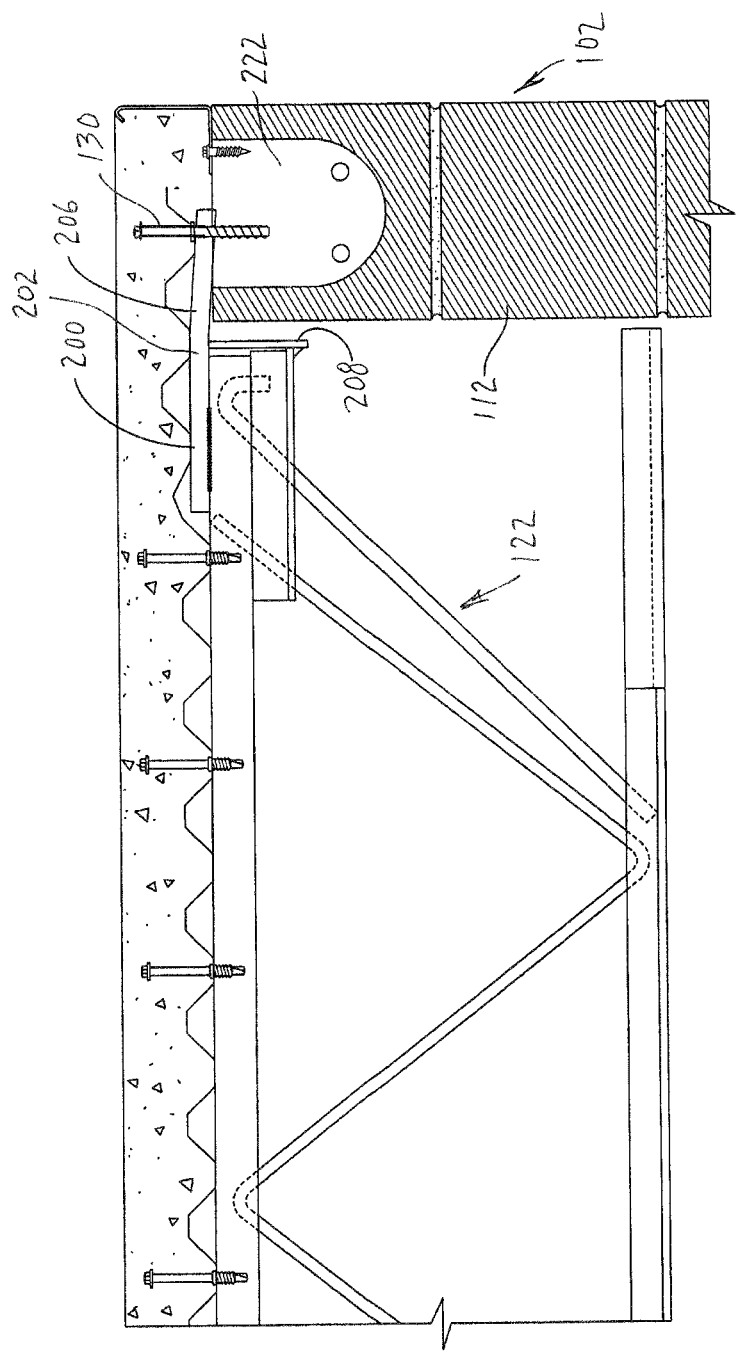
Figure 30:
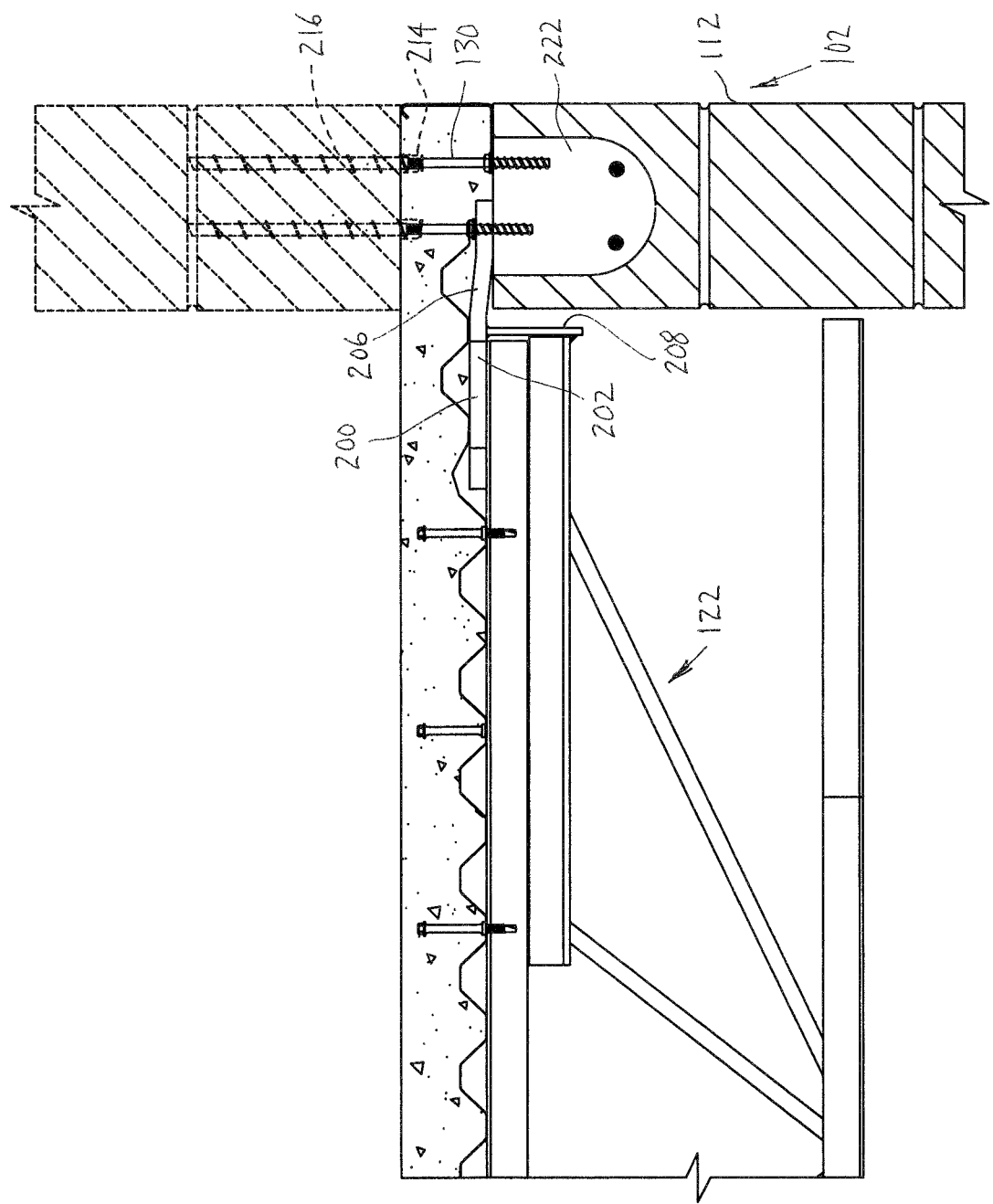
Figure 31:
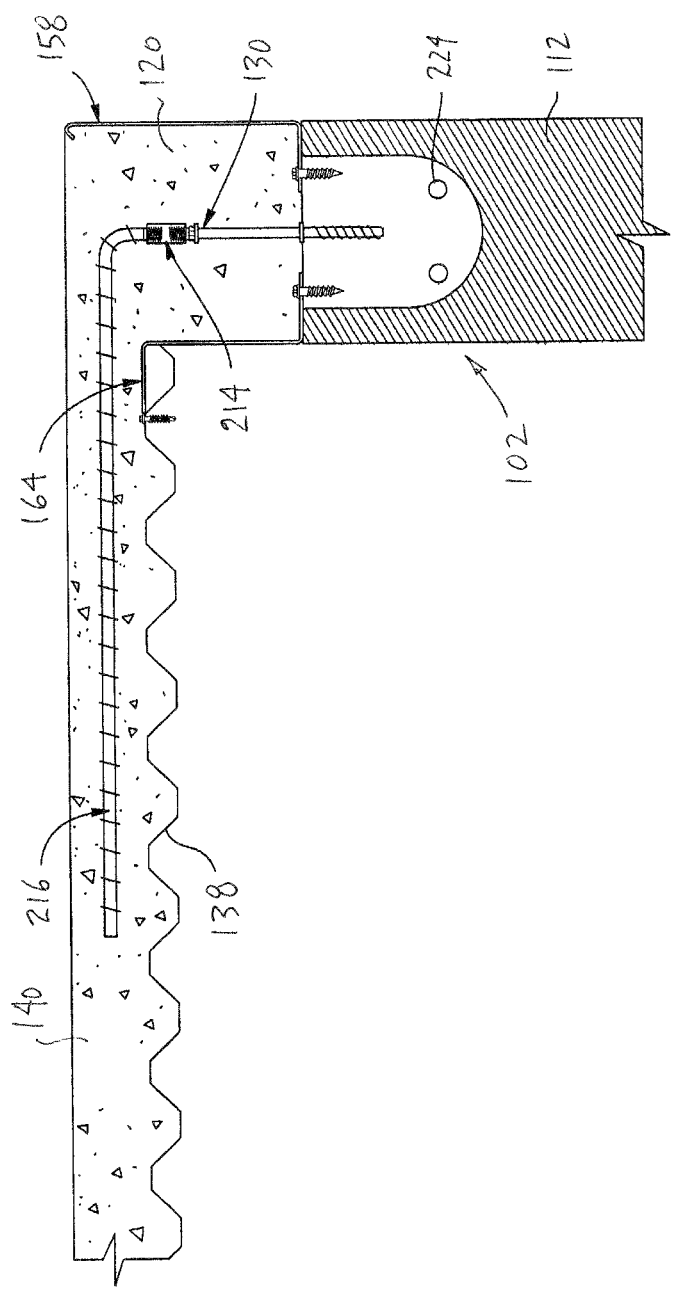
Figure 32:
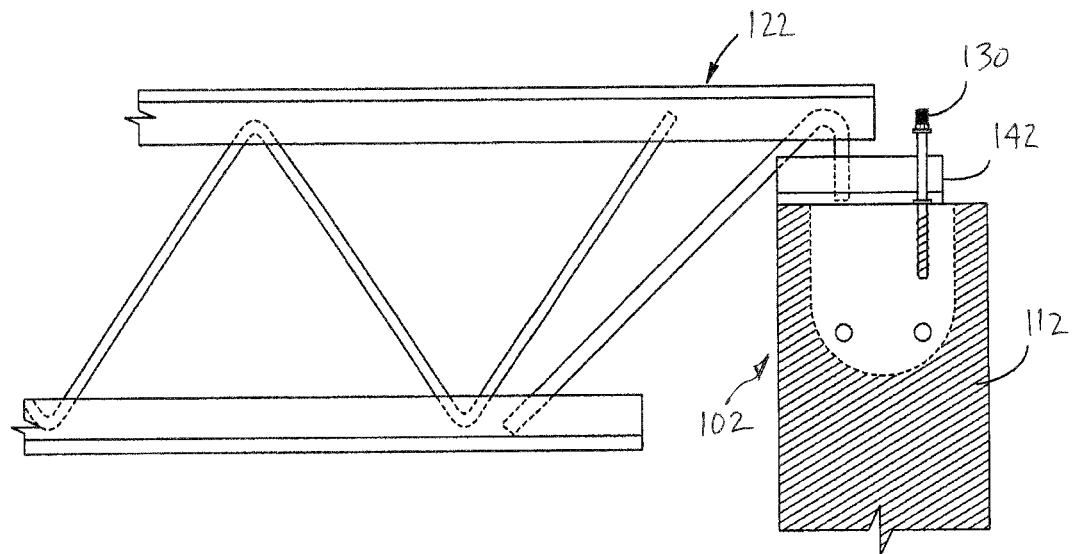
Figure 33:
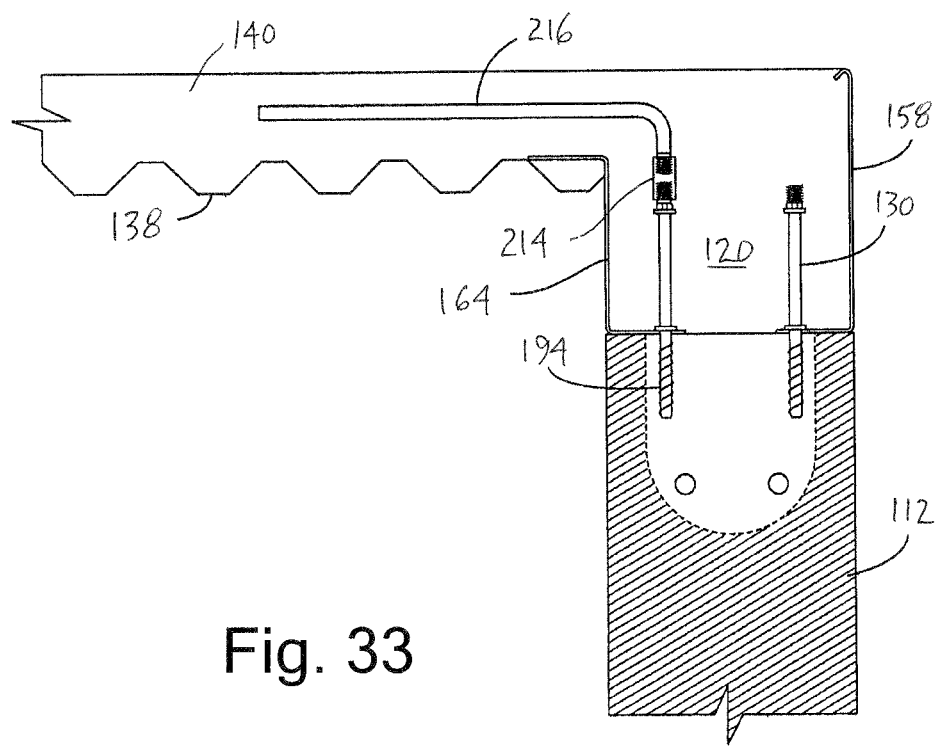
Figure 34A:
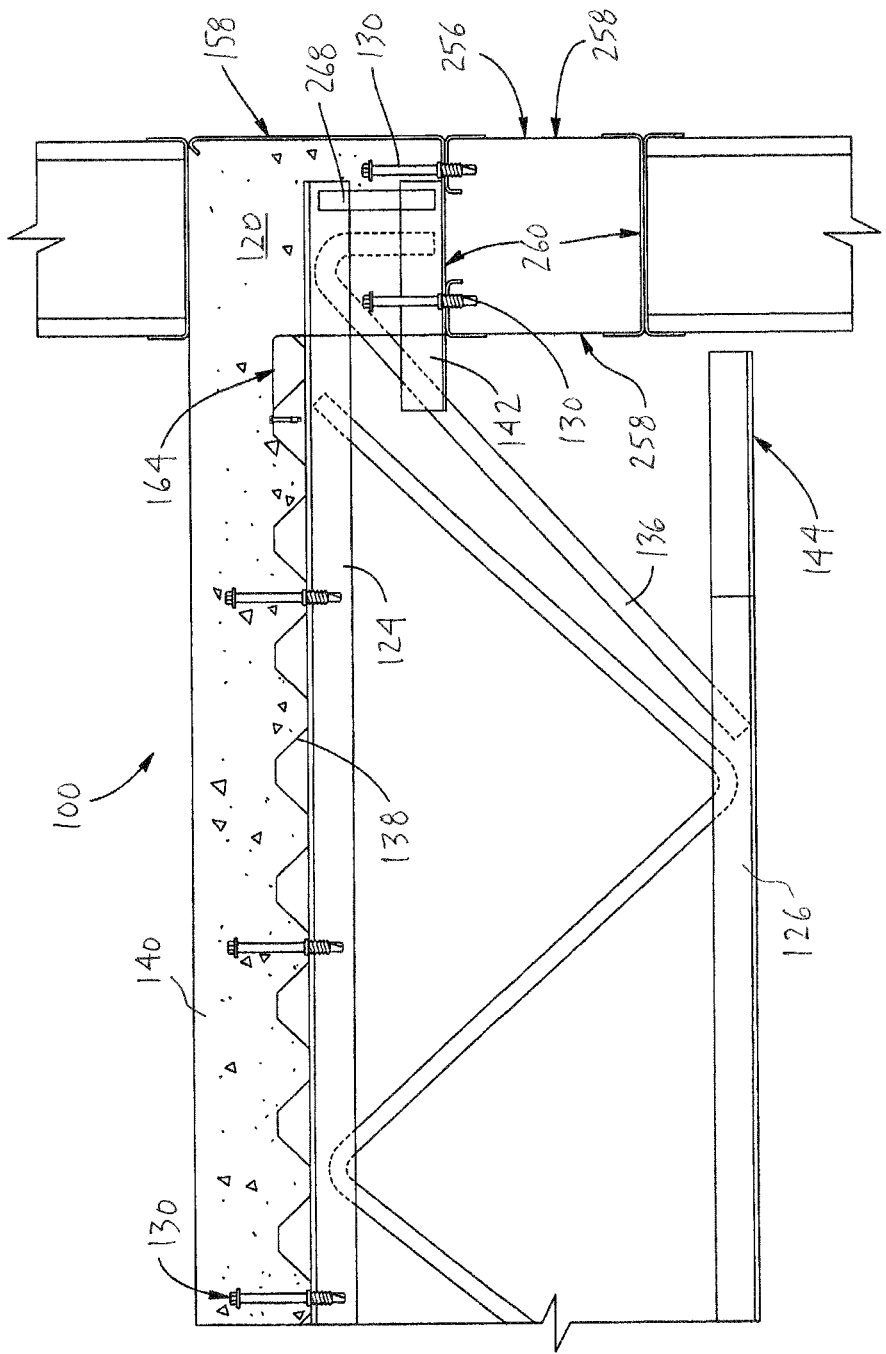
Figure 34B:
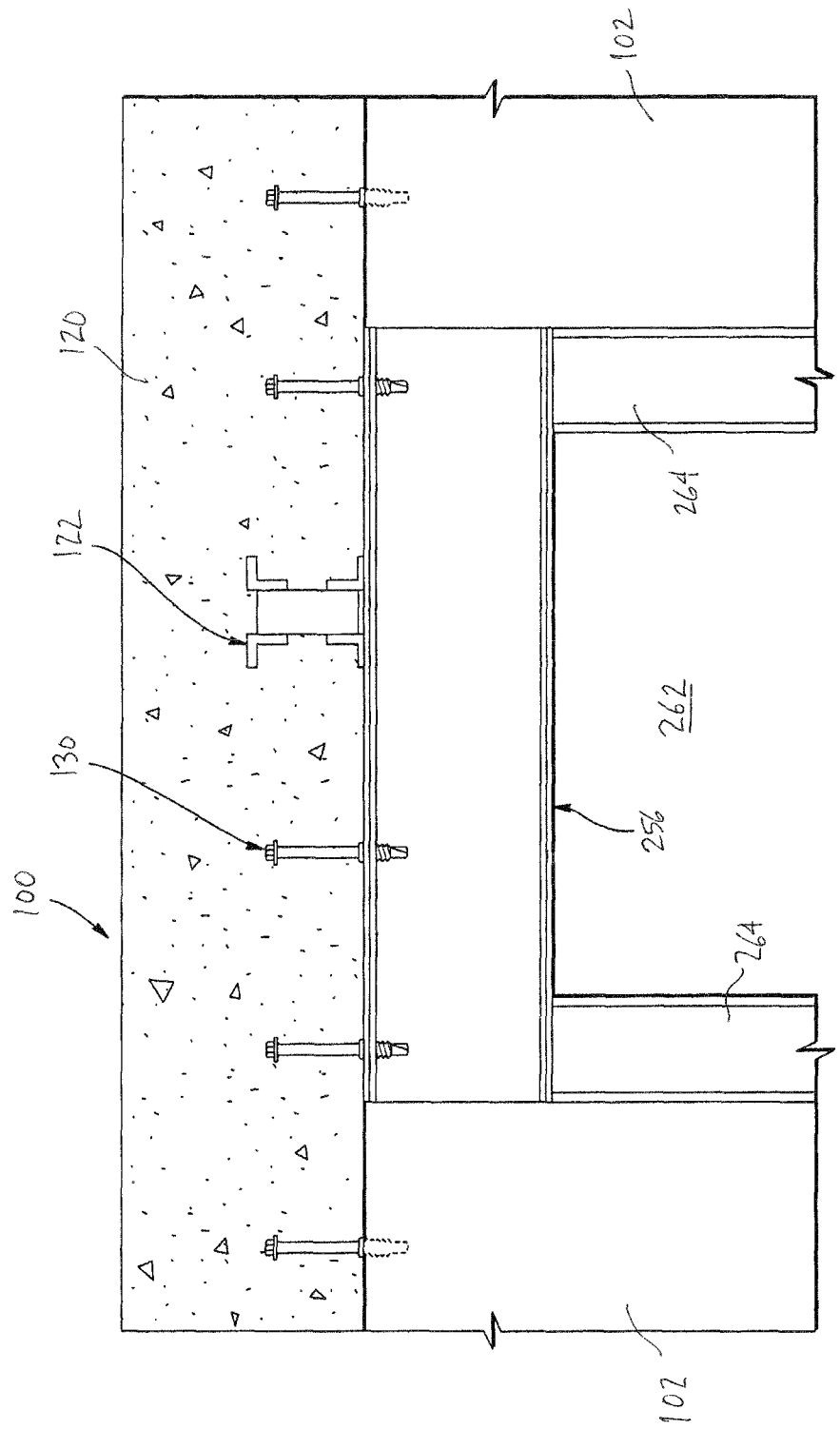
Figure 35A:
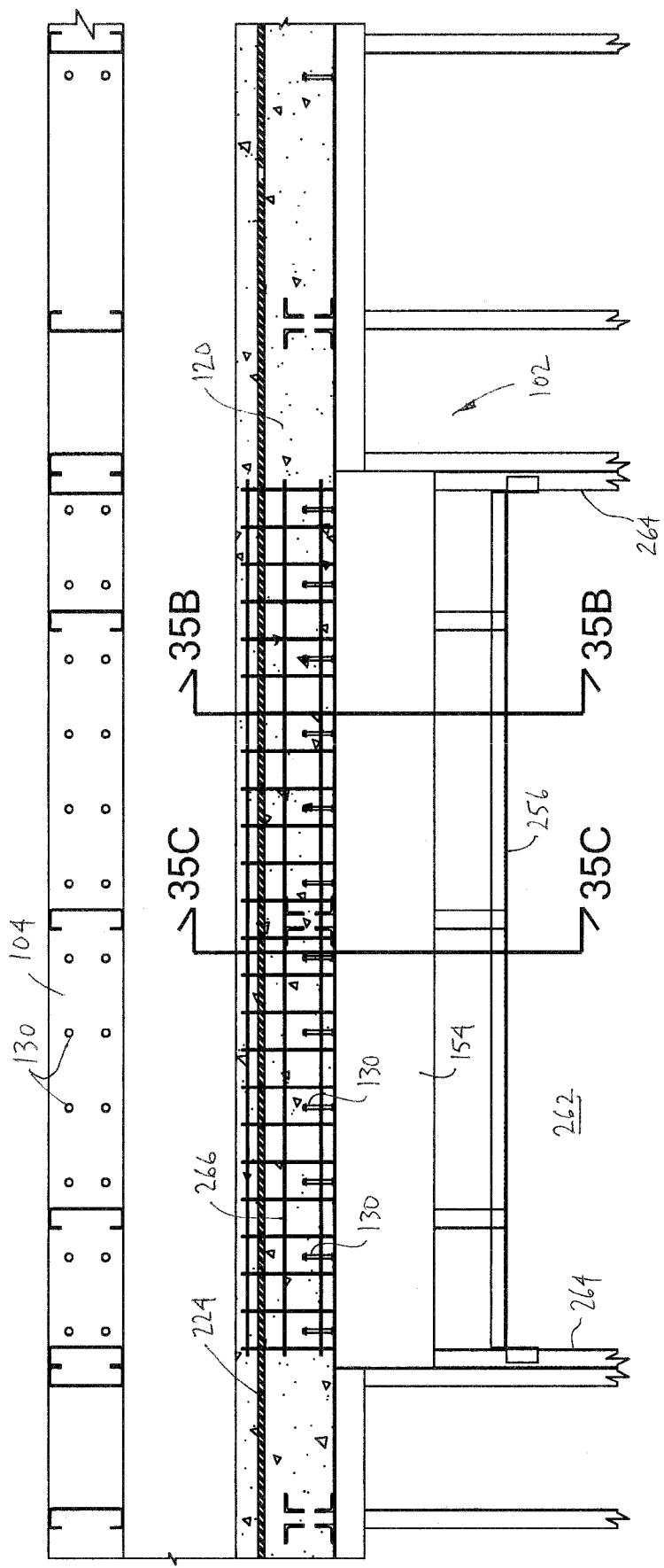
Figure 36:
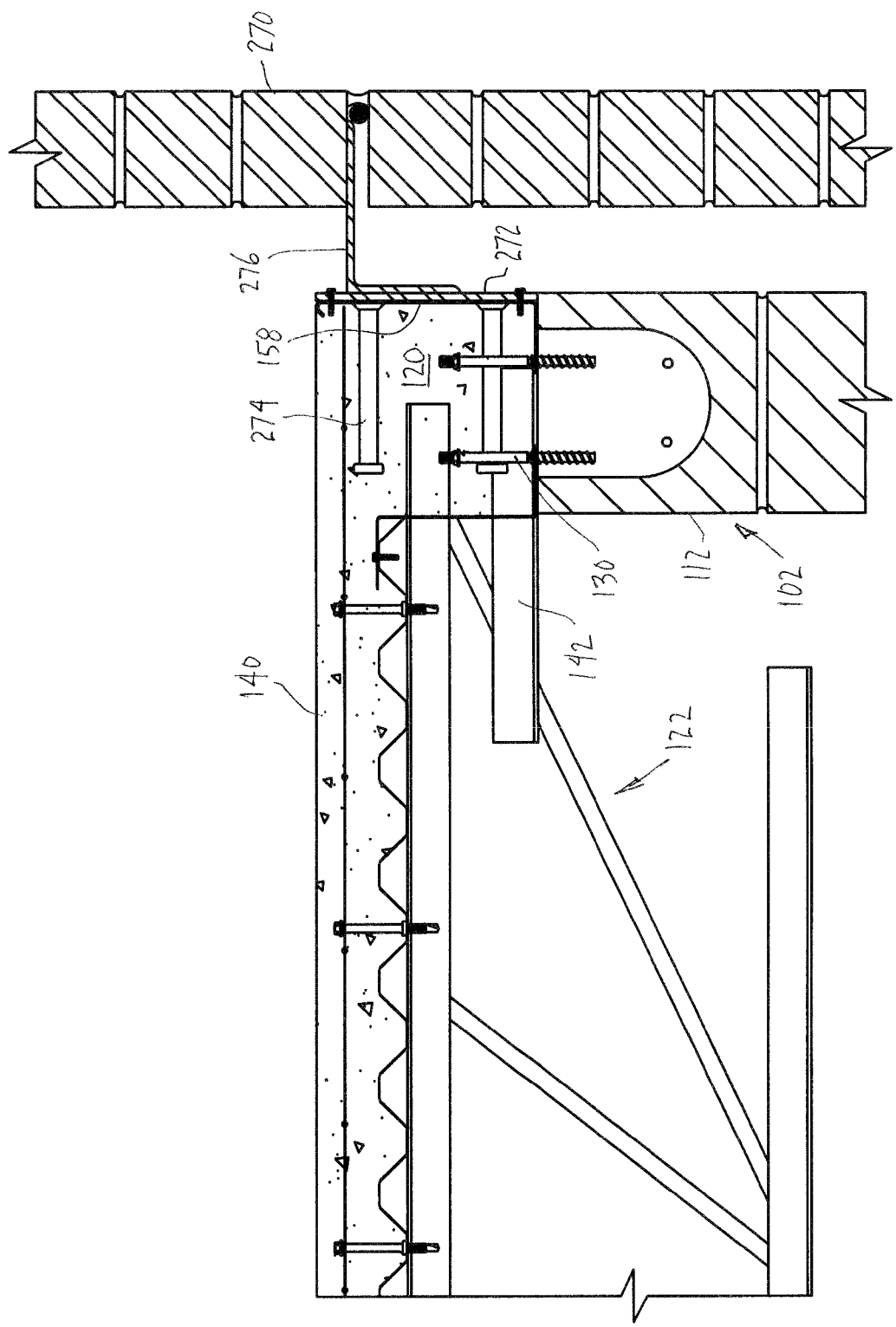
Figure 37A:
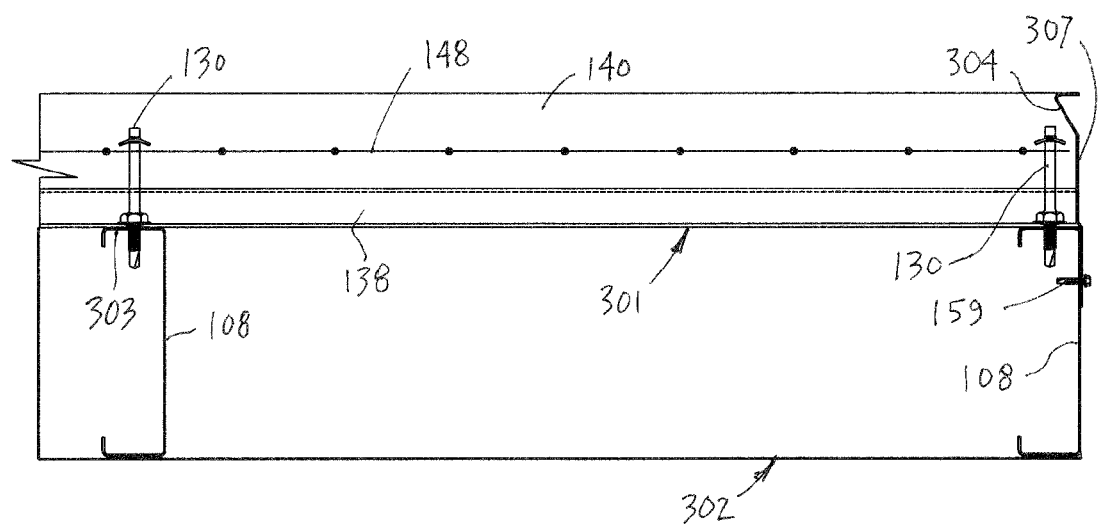
Figure 37B:
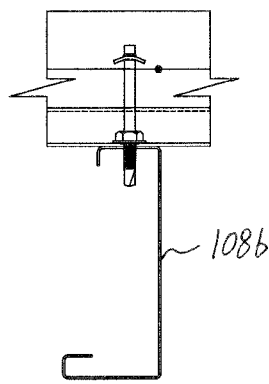
Figure 37C:
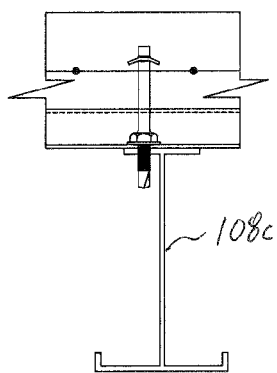
Figure 38:
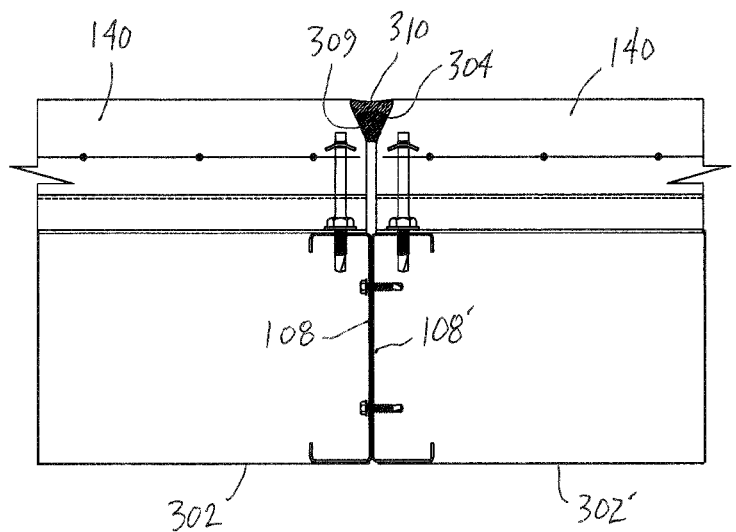
Figure 39:
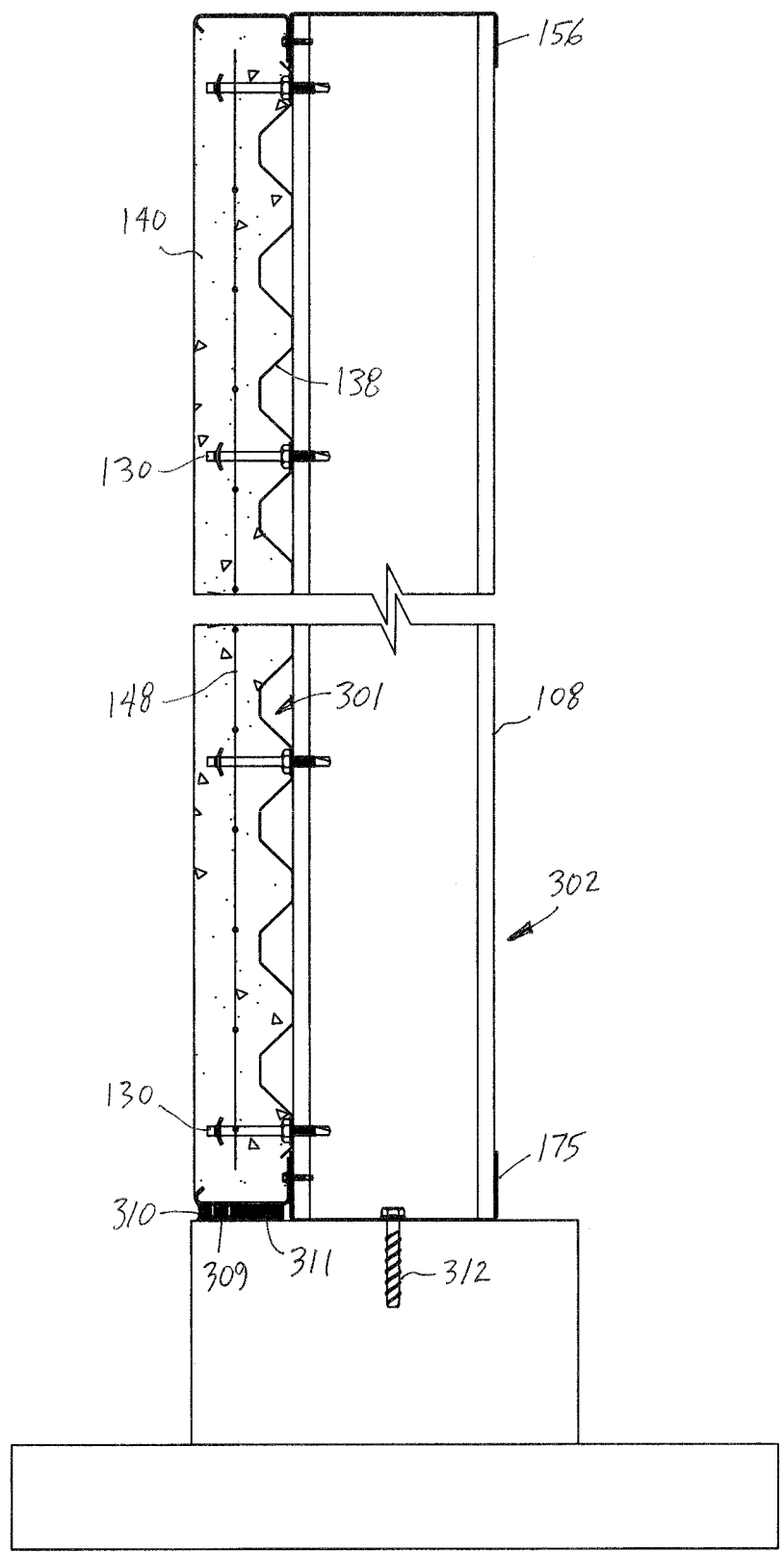
Figure 41A:
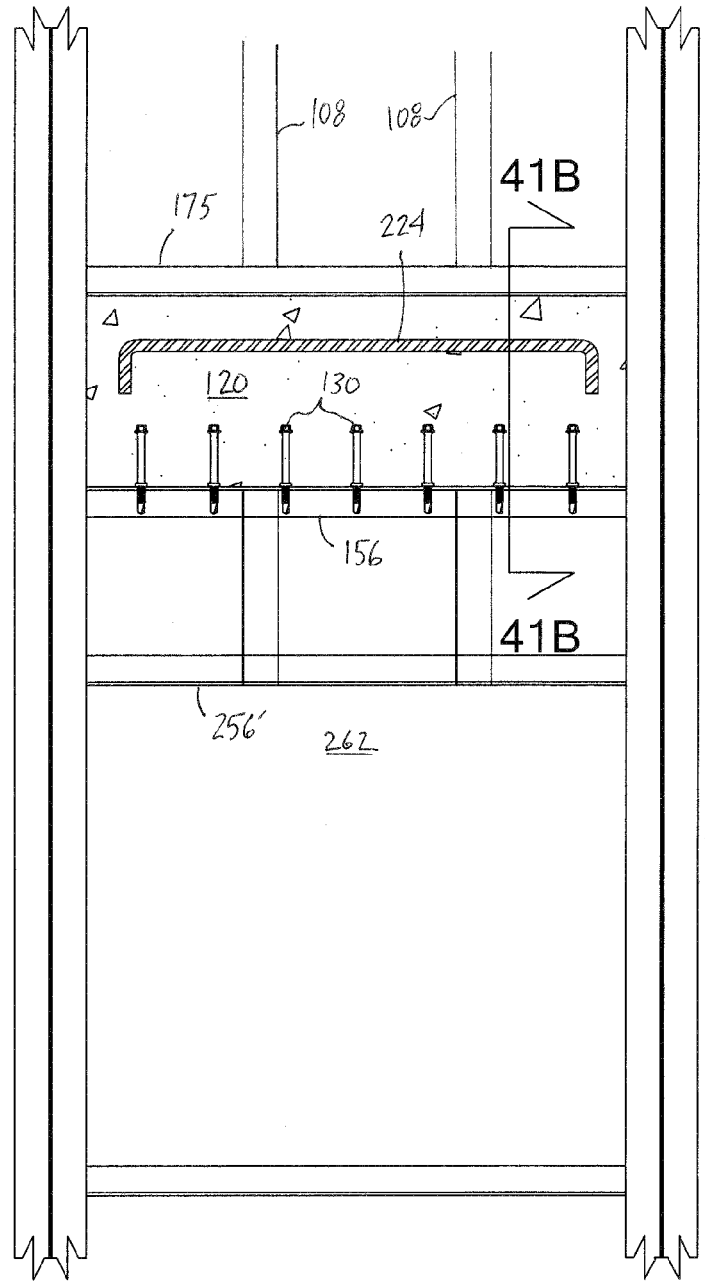
Figure 41B:
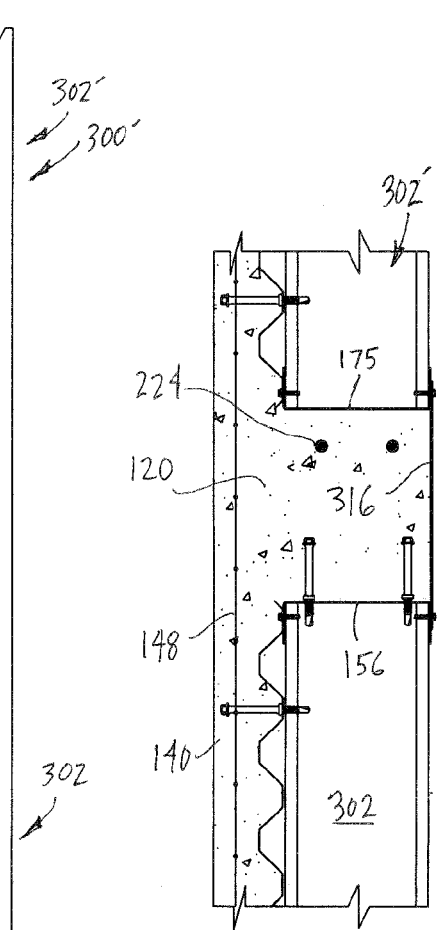
Figure 42A:
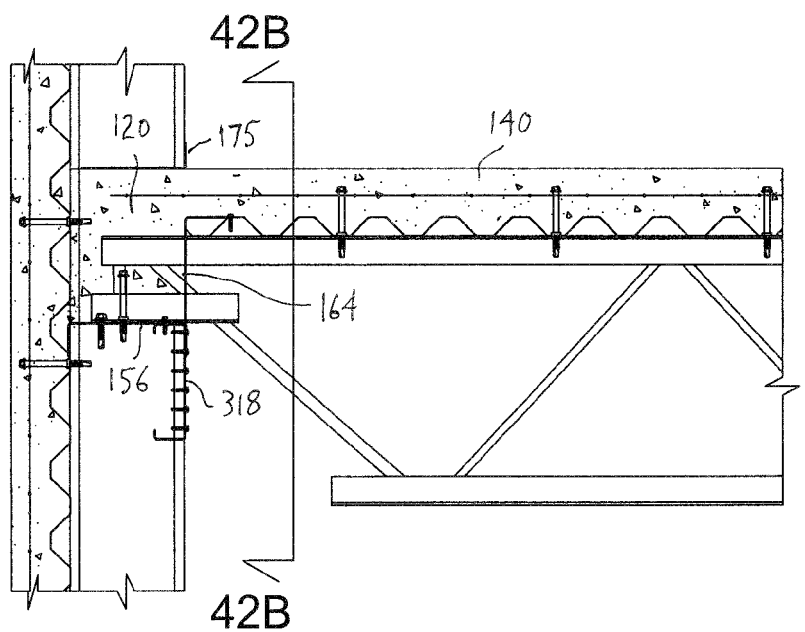
Figure 42B:
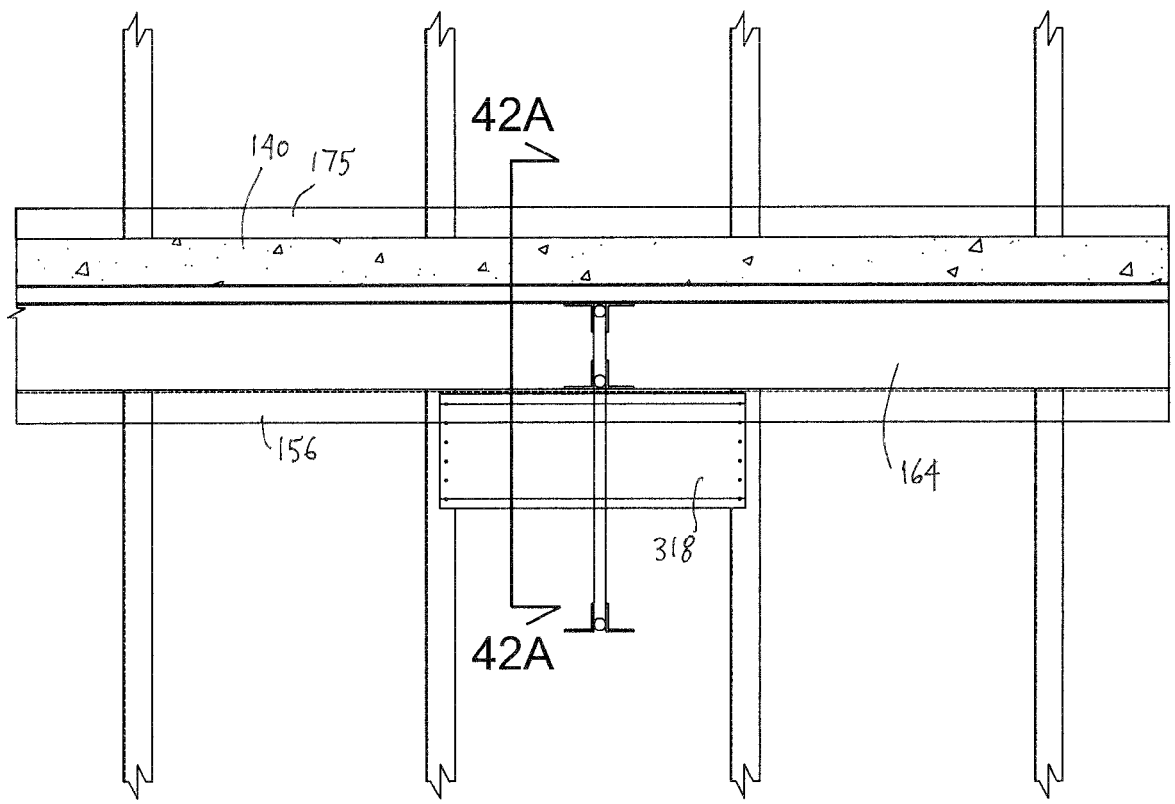

Having thus described embodiments of the invention in general terms, reference will now be made to the accompanying drawings, which are not necessarily drawn to scale, and wherein:

FIG. 1 is a partial side view of a composite wall structure including cold-formed wall studs;

FIG. 2 is a partial side view of a composite building structure including a structural steel beam;

FIG. 3 is a partial side view of a composite wall structure including a masonry wall;

FIG. 4 is a partial side view of a composite wall structure including wood wall studs;

FIG. 5 illustrates a cross-sectional perspective view of a composite wall structure and integral floor structure;

FIGS. 6A and 6B illustrate a cross-sectional side views of two alternative composite wall structures similar to the building structure illustrated in FIG. 5;

FIGS. 7A through 7D illustrates at least a portion of the z-shaped closure illustrated in FIGS. 5 and 6;

FIG. 8A illustrates a side view of one of the stand-off fasteners illustrated in FIGS. 1 and 2;

FIG. 8B illustrates a cross-sectional side view of the stand-off fastener illustrated in FIG. 8A;

FIG. 8C through 8E are side views of alternative stand-off fasteners of the present disclosure having a lower portion configured for installation into a steel member;

FIG. 8F includes partial side views of alternative thread-forming portions of the stand-off fastener of FIGS. 8C through 8E;

FIG. 8G are cross sectional views of alternative pentalobular and quadlobular thread-forming portions taken as shown in 8F;

FIG. 8H is a side view of an alternative stand-off fastener having a lower portion configured for installation into masonry;

FIGS. 8I and 8J are side views of alternative stand-off fasteners with upper portions having a threaded portion to attach to a reinforcing member or some other extension member at the end of the fastener opposite the threaded tip;

FIG. 9 shows a prior art non-composite floor system and in-line framing alignment of wall studs from one floor to the next;

FIG. 10A shows an upper portion of a wall structure prior to a cementitious wall portion is placed;

FIG. 10B is a partial elevational view showing the present composite wall structure showing force transfer;

FIG. 11A is a plan view of a one floor of a building structure of the present disclosure;

FIG. 11B is a detail view from FIG. 11A showing horizontal diaphragm shear forces on the building structure;

FIGS. 12A through 12D illustrates the exemplary standardized patterns of stand-off fastener spacings that may be used in accordance with the present disclosure;

FIG. 13 illustrates a cross-sectional perspective view of a composite wall structure where the member for supporting the end of the joists includes a structural steel beam;

FIG. 14 illustrates a cross-sectional perspective view of a composite wall structure where the member for supporting the end of the joists includes a masonry wall, such as a wall comprising concrete masonry units or brick;

FIG. 15 illustrates a cross-sectional perspective view of a composite wall structure where the supporting member for supporting the end of the joists includes a concrete wall;

FIG. 16 illustrates a cross-sectional perspective view of a composite wall structure where the supporting member for supporting the end of the joists includes a wood stud;

FIG. 17A is a partial side sectional view of the composite wall structure of FIG. 5 supporting the joist and integral floor structure;

FIG. 17B is a partial side sectional view of the composite wall structure adjacent a joist;

FIG. 18 is a partial perspective view of the present composite wall structure in a shear wall configuration with diagonal members;

FIGS. 19A and 19B are partial sectional views showing the present composite wall structure in a shear wall configuration with a lateral transfer frame;

FIG. 20 is a partial perspective view of a the present wall structure with a lateral transfer frame before placing cementitious material;

FIG. 21 is a partial perspective view of a the present wall structure with a lateral transfer frame with cementitious material;

FIG. 22 is a partial side view showing a welded connection of a lateral transfer frame;

FIG. 23A is a lateral transfer frame for use in the present wall structure;

FIG. 23B is an alternative lateral transfer frame for use in the present wall structure;

FIG. 23C is yet another alternative lateral transfer frame for use in the present wall structure;

FIG. 24 illustrates an interior composite wall structure in which stand-off fasteners have been installed into the top of the wall to transfer diaphragm forces from the concrete slab to the wall;

FIG. 25 illustrates a cross-sectional side view of a composite wall structure showing how a beam running substantially perpendicular to the joists may support the ends of two joists on opposite sides of the beam;

FIG. 26 illustrates a cross-sectional side view of a composite wall structure showing how the corrugated steel decking may be supported at its edge by a wall that runs substantially parallel to the joists and generally perpendicular to the corrugations in the decking;

FIG. 27A illustrates a cross-sectional side view of a composite wall structure where an exterior masonry wall that is substantially parallel to the joists supports the edges of a corrugated steel decking sheet using a z-shaped closure;

FIG. 27B illustrates a cross-sectional side view of a composite wall structure where an interior demising wall that is substantially parallel to the joists supports the edges of two corrugated steel decking sheets using z-shaped closures;

FIG. 28 illustrates a cross-sectional view of a composite wall structure where the joist has a flush bearing seat and where the flush bearing seat is supported by a wall running substantially perpendicular to the joist;

FIG. 29 illustrates a flush bearing configuration where the flush bearing seat is configured for a masonry-type support member;

FIG. 30 illustrates an alternative flush bearing configuration where the flush bearing seat is configured for a masonry-type support member;

FIG. 31 illustrates an embodiment of the present disclosure where reinforcing in the concrete slab is coupled to a stand-off fastener installed into the top of the composite wall structure;

FIG. 32 illustrates a stand-off fastener used to attach a joist shoe to the supporting wall;

FIG. 33 illustrates how stand-off fasteners may be used to attach a z-shaped closure and a pour stop to a wall, while also functioning to couple reinforcing to the wall and/or to transfer horizontal diaphragm forces from the slab to the wall;

FIGS. 34A and 34B show a composite wall structure supported by cold-formed wall studs, the floor system having a composite header configuration;

FIGS. 35A through 35C shows a composite wall structure supported by cold-formed wall studs and an alternative composite header configuration;

FIG. 36 is an alternate of the wall structure of FIG. 14 showing an embed plate and a facade support angle;

FIG. 37A is a partial sectional view through a wall panel system of the present disclosure;

FIGS. 37B and 37C are partial sectional views through a wall panel system of the present disclosure showing alternative support members;

FIG. 38 is a partial sectional view through the connection of two wall panels;

FIG. 39 is a partial sectional view through the installed wall panel;

FIG. 40A is a partial sectional view through the installed wall panel supporting a joist;

FIG. 40B is a partial sectional rear view of the wall panel of FIG. 40A;

FIG. 40C is an alternative detail of the wall panel of FIG. 40A;

FIG. 41A is a partial rear view of a multi-level wall panel with a composite wall structure configuration;

FIG. 41B is a sectional view through the wall panel of FIG. 41A;

FIG. 42A is a partial sectional view of an alternative wall panel of FIG. 42B; and FIG. 42B is a partial sectional rear view of the alternative wall panel of FIG. 42A.

DETAILED DESCRIPTION OF THE DRAWINGS

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The composite building systems described herein are generally constructed at the building site and provide structural support for the building. In general, a plurality of joists are provided and each joist is supported at either end by the building's support structures, which may include but are not limited to: beams, joist girders, masonry walls, concrete walls, cold-formed metal wall studs, and/or wood load bearing wall studs. In this way, the joists span the open areas within the building's main structure to provide support for the floors and/or ceilings. A plurality of varying flooring system designs and design methodologies are disclosed in U.S. patent application Ser. No. 12/019,372, to Studebaker et al. and entitled "Composite Wall and Floor System," U.S. patent application Ser. No. 12/019,329 to Studebaker et al. and entitled "Composite Joist Floor System," U.S. patent application Ser. No. 12/019,410 to Studebaker et al. and entitled "Flush Joist Seat," U.S. patent application Ser. No. 12/019,431 to Studebaker et al. and entitled "Mechanical Header," and U.S. patent application Ser. No. 12/019,448 to Studebaker et al. and entitled "Balcony Structure," each of which is incorporated herein by reference. These various designs and design methodologies use a combination of joist depth, chord size, joist spacing, flexible thread-forming stand-off fastener size and spacing, and various corrugated steel deck profiles to create flooring systems that are light in weight, have generally decreased material costs, labor costs, and construction costs, and offer improved strength.

Referring now to FIGS. 1 through 4, a partial side view of a building structure 100 including a composite building structure including showing various support structures 102 and at least one joist 122 supported on its ends by the support structure 102. As shown in FIG. 1, the support structure 102 may be a wall structure comprising cold-formed steel wall studs 108. Alternatively, the support structure 102 may be a structural beam 110 as shown in FIG. 2, a concrete or masonry wall 112 as shown in FIG. 3, or wood load bearing wall studs 114 as shown in FIG. 4. Other support structures 102 may be utilized. The support structure 102 has an upper portion 104 extending to adjacent a floor structure above the support structure 102 and adapted to receive stand-off fasteners there along.

The composite wall structure includes a plurality of stand-off fasteners 130 such as shown in FIGS. 8A through 8G, each having an upper portion 132 and a lower portion 134, where the lower portion 134 of the stand-off fasteners may comprise a self-drilling end portion and an adjacent thread-forming portion, and when installed into the upper portion 104 of the support structure 102 at least a portion of the upper portion 132 of each stand-off fastener 130 extends significantly above the upper portion 104 of the support structure 102. A cementitious wall structure 120 is formed above the upper portion 104 of the support structure 102 with the upper portions 132 of the stand-off fasteners 130 encapsulated in the cementitious wall structure 120. Alternatively, as shown in FIG. 2, the stand-off fasteners 130' may be stand-off studs where the lower portion 134 comprises a weld stud adapted to be welded to a building member, such as headed concrete anchors, and when installed to the upper portion 104 of the support structure 102, at least a portion of the upper portion 132 of each stand-off stud extends significantly above the upper portion of the support structure.

FIG. 5 shows a cross-sectional perspective view of the present building structure where the cementitious wall structure is formed integral with a cementitious slab of a floor structure of the building structure. As shown in FIGS. 5 and 6B, the building structure may include at least one joist 122 supported on its ends by the support structure 102, such as the steel wall studs 108. In one alternative, the lower portion 134 of stand-off fasteners 130 includes a self-drilling end portion and an adjacent thread-forming portion, and a plurality of stand-off fasteners 130 are installed into the upper portion 104 of the support structure 102 between the joists. The upper portion 132 of each stand-off fastener 130 extends above the upper portion 104 such that the upper portions 132 of the stand-off fasteners 130 are encapsulated in the concrete of the cementitious wall structure 120 above the support structure 102 and forming the composite wall structure. The term "concrete" used herein can be any of a number of cementitious materials or materials with properties similar to cementitious materials may be used as accepted by governing building codes and/or desired in the particular embodiment.

The joist 122, in combination with other joists, walls, or beams (not shown), may support a layer of corrugated steel decking 138. The corrugated steel decking 138 is positioned such that the corrugations run generally perpendicular to the joist 122. A plurality of stand-off fasteners 130 may be installed through the corrugated steel decking 138 into the upper chord 124 of the joist 122. Each stand-off fastener 130 not only connects the corrugated decking 138 to the joist 122, but also extends some distance above the corrugated decking 138. In this way, when concrete 140 is placed over the corrugated steel decking 138, the stand-off fasteners 130 are encapsulated within the concrete to form a composite wall and floor structure once the concrete is cured. The concrete forming the cementitious wall structure 120 and the concrete floor 140 may be placed together forming the cementitious wall structure 120 integral with the cementitious slab 140 of the floor structure such as shown in FIG. 5.

As shown, for example, in FIGS. 1 and 6, the joist 122 may comprise an upper chord 124 and a lower chord 126. The upper chord 124 and the lower chord 126 are joined together by a web 128 extending therebetween. In the illustrated embodiment, the web 128 has an open web configuration comprising one or more of rod, angle, or cold-formed "C" shaped members 129 that extend between and are coupled to the upper chord 124 and the lower chord 126. In the illustrated embodiment of the invention, the web 128 is made primarily from a single round solid rod 129 bent into a zigzag or sinusoidal-like pattern having one or more peaks alternating with one more valleys. In such an embodiment, the upper chord 124 is welded (or otherwise coupled) to the peaks in the bent rod 129 and the lower chord 126 is welded (or otherwise coupled) to the valleys in the bent rod 129.

In the illustrated embodiment, the upper and lower chords 124 and 126 are each formed from two metal angles (also sometimes referred to as "angle irons," although the angles described herein need not be iron). FIG. 5 shows the lower chord 126 having two angles 135 and 137 placed on either side of the bent rod 129 and joined to the valleys in the bent rod 129 to form the lower chord 126. Similarly, two angles 131 and 133 are placed on either side of the bent rod 129 and joined to the peaks in the bent rod 129 to form the upper chord 124. The webs 128 are shown herein as bent rod 129, but can be almost any cross-sectional shape. The upper chord 124 and the lower chord 126 have cross sections selected for the design load.

The joist 122 includes a rod-shaped "end diagonal" 136 at each end of the joist for transferring forces between the joist 122 and the wall structure. Alternatively, the "end diagonal" 136 may a consist of angles or cold-formed "C"-shaped sections for heavier floor loadings. One end of the end diagonal 136 is joined to the lower chord 126 proximate to the first web joint and the other end of the end diagonal 136 is joined to the upper chord 124 proximate to a joist seat or joist shoe 142. In some alternatives, the lower chord 126 of the joist 122 may include a ceiling extension 144 that extends the lower chord 126 such that the lower chord 126 ends proximate to the support structure 102. Such an extension may be desired so that a ceiling 146 may be hung from the lower chord 126 of the joist. As used herein, the term joist shoe is not limited to mean the joist shoe of an open-web joist, but includes any bearing seat for supporting a joist, joist girder, or other lateral building member.

As described above, corrugated steel decking 138 is positioned over the joist 122 and generally spans two or more adjacent joists 122. The corrugated steel decking 138 may be painted or galvanized. Standard corrugated steel decking comes in many different profiles and thicknesses, and generally comes in the form of sheets having for example, coverage widths of 32, 33, or 36 inches as desired for the application.

The corrugated steel decking 138 is generally positioned such that the corrugations run at right angles to the joist 122. As described above, stand-off fasteners 130 are drilled through the corrugated decking 138 and the flanges of the upper chord 124. In this way, the stand-off fasteners 130 transfer lateral forces from the concrete slab 140 into the joist top chord of the joist 122.

The concrete may be strengthened by placing welded wire fabric 148 or other types of reinforcing over the corrugated steel decking 138 and/or with the cementitious wall structure 120. When the concrete 140 is then placed over the corrugated steel decking 138, the welded wire fabric 148 and the upper portion of the stand-off fasteners 130 are encapsulated within the concrete 140. The concrete is then smoothed so as to form a floor of the building. In some embodiments, rebar chairs are used to hold the welded wire fabric 148 in the specified location above the corrugated steel decking 138 as the concrete 140 is placed.

As described above, stand-off fasteners 130 are installed into the upper portion 104 of the support structure 102 and encapsulated in the cementitious wall structure. Stand-off fasteners 130 provided such as shown in FIG. 10A enable a composite wall structure to be formed between the support structure 102 and the cementitious wall structure 120 as shown in FIG. 10B. The composite effectively forms a load distributing member above the support structure 102 having increased strength and load capacity over the prior non-composite wall structures. The composite wall structure may form a continuous composite load distributing member around at least a portion of the upper portion 104 of the support structures 102 of the building structure as shown in FIG. 11A.

The present building structure provides many advantages over the traditional non-composite wall structures. The present composite building system provides a continuous composite load distributing member along the upper portion 104 of the support structures 102 for transferring gravity and diaphragm loads providing improved strength and erectabibity over prior systems. In construction using load distribution members of segmented steel in the past, short sections of top plates or steel structural members had to be spliced together to form a load distribution member along the upper length of a wall structure. However, the splices between sections were typically fabricated at the construction site and when poorly constructed reduced the load capacity of the system. In construction using prior non-composite concrete load distribution member design, concrete was poured above the wall structure, but the resulting concrete slab and the wall or support structure acted independently. Specifically, in a non-composite wall structure, the wall structure and the concrete share the loads based on the relative stiffness of each component separately. The concrete has very low bending stiffness relative to the wall structure. As such, in a non-composite wall structure design, the wall or support structure must carry substantially the entire load on the wall. Additionally, in prior non-composite wall structures, the wall studs of one floor had to approximately align with the wall studs of the floor above and below, such as the in-line framing shown in FIG. 9, because downward forces of the non-aligned studs load the non-composite concrete wall structure as a beam in bending. The non-composite concrete wall structure loaded in bending has a lower load capacity, thereby necessitating the stud alignment shown in FIG. 9 or the use of a sufficient steel load distributing member to support the loading. In contrast, in the composite wall structure described above, the cementitious wall structure 120 and the support structure 102 act more like a single unit due to the fact that the cementitious wall structure 120 and the support structure 102 are coupled together by the stand-off fasteners 130 enabling higher load capacities. In certain applications, the strength of the composite wall structure enables the wall studs of an upper wall panel to be offset from the wall studs of a lower wall panel as desired. Additionally, the stand-off fasteners 130 in the composite wall structure develop a strut within the concrete by passing tie forces into the support structure as shown in FIG. 10B. For example, the upper portion 104 may be a coldformed steel member or steel angle member adapted to resist the tension forces transferred from the cementitious wall structure 120 through the stand-off fasteners. In general, the stand-off fastener 130 transfers lateral loads from the cementitious wall structure 120 to the upper portion of the support structure. As such, the design capacity is based on the concrete strength, the steel strength, and the shear transfer between the two. The stand-off fasteners 130 function as a shear transfer mechanism.

The composite action between the between the support structure 102 and the cementitious wall structure 120 increases the loading capacity of the structure enabling the wall studs of one floor to be positioned independent of the wall studs of the floor above and below, providing more flexibility in building design and erection for cost and efficiency. Additionally, the building structure typically resists diaphragm loads, or shear loads as shown in FIG. 11B. The shear loads and lateral loads in the building structure are also transferred from the upper wall structure and floor structure to the upper portion 104 of the support structure 102 as shown in FIG. 11B through the stand-off fasteners 130 and the composite wall structure. The increased strength of the composite wall system allows the cementitious wall structure 120 and/or the support structure 102 to be reduced in size and weight. In this way, the material used in the structure can be reduced to reduce weight and costs. Current embodiments are sized corresponding to standard construction units for ease of construction, design and uniformity. Alternatively, the size and weight of the cementitious wall structure 120 and support structure may be varied to achieve significant increases in load capacity without an increase in material. The corrugated decking 138 and the concrete slab 140 are not shown in FIG. 11B for clarity.

Returning to FIGS. 1 through 4, as described above the end of the joist 122 is supported by a beam, wall, stud, or other structural member. In the example of FIG. 1, the end of the joist 122 is supported by a steel wall stud 108. The end of the upper chord 124 has a shoe 142 for transferring forces from the joist 122 to the wall stud 108. In the illustrated embodiment, the shoe 142 is made up of a pair of metal angles welded to the bottoms of the upper chord angles 131 and 133 as shown in FIG. 5. Configured as such, the angles 131 and 133 that make up the upper chord 124 and the angles 152 and 153 that make up the joist shoe 142 combine to form an I-beam like bearing connection. In some joist configurations, the end of the end diagonal 136 is positioned between the shoe angles 152 and 153 and serves as a spacer between the shoe angles. In this regard, the shoe angles 152 and 153 are welded to the end diagonal 136 in addition to being welded to the upper chord angles 131 and 133.

The bottom surface of the joist shoe 142 rests upon the top surface of the support structure 102. As illustrated in FIG. 6A, a distribution member 154 or header and/or a distribution track 156 or plate may be positioned between the top of the wall studs and the bottom of the joist shoe 142 to distribute force along the length of the support structure 102. Alternatively, such as shown in FIGS. 5 and 6B, only the distribution plate 156 is used.

As shown in FIGS. 1 through 4, pour stops 158 and notched closures 160 are used to contain the concrete while it is placed and cured within the cementitious wall structure 120 over the support structure 102. The notched closure 160 has a generally vertical face 161 and a generally horizontal lower flange 162. The vertical face 161 has a cutout at one end having the shape of approximately one-half of the shape of the end of the joist 122, which may be approximated by the shape of an I-beam. This cutout is configured to fit around at least one side of the upper chord 124 and the joist shoe 142 of the joist 122 forming a pour stop. The horizontal flange 162 rests atop the support structure 102 and may be coupled to the upper portion 104 of the support structure 102 by, for example, a stand-off fasteners 130. The notched closure 160 may have a lip 168 at the top of the vertical face 161 that curves or is otherwise bent inward and downward. The lip 168 may be encapsulated in the concrete in the cementitious wall structure 120 keeping the vertical face 161 of the notched closure 160 from becoming separated from the cementitious wall structure 120 and keeping moisture from entering between the vertical face 161 and the cementitious wall structure 120. Alternatively, the notched closure 160 may not include the lip 168.

As shown in the alternatives of FIGS. 5 and 6A and 6B, the corrugated steel decking 138 does not extend significantly over the support structure 102 such that when the concrete 140 is placed over the steel decking 138, the concrete 140 may flow or be placed into the cementitious wall structure above the support structure 102. The concrete in the cementitious wall structure encapsulates the stand-off fasteners and the ends of the upper chords 124 of each joist 122 and the ends of each joist shoe 142 and functions to help hold the joist shoes 142 in place at the top of the wall structure. The cementitious wall structure 120 also forms a concrete beam as discussed above extending over the support structure 102 perpendicular to the joists 122. This concrete beam helps to collect and distribute forces being transferred between the walls and the floor. As illustrated in FIGS. 5 and 6A and 6B, a z-shaped closure 164 and a pour stop 158 are used to contain the concrete 140 within the region of the cementitious wall structure 120 over the upper end of the support structure 102. In addition to the structural benefits of a floor system having such a concrete beam, floor systems that allow the concrete 140 to contact the upper end of the wall structure typically leading to improved fire-safety ratings and improved acoustic attenuation.

In the embodiment illustrated in FIG. 6A, the pour stop 158 is used to prevent the concrete 140 from flowing beyond the plane of the support structure 102 as the concrete 140 is curing. The pour stop 158 has a lower horizontal flange 166 and a vertical face 167. The horizontal flange 166 rests atop the support structure 102 and may be coupled to the upper portion 104 of the support structure 102 by, for example, stand-off fasteners 130. The pour stop 158 is positioned such that the vertical face 167 is substantially within the same plane of the backside of the support structure 102 so that the vertical face 167 of the pour stop 158 prevents the concrete from flowing beyond this plane as the concrete is placed and cures. The pour stop 158 may include the lip 168 at the top of the vertical face 167 that curves or is otherwise bent inward and downward. The lip 168 may be encapsulated in the concrete preventing the vertical face 167 of the pour stop 158 from becoming separated from the cementitious wall structure 120 and keeping moisture from entering between the vertical face 167 and the cementitious wall structure 120. Alternatively, the pour stop 158 may not include the lip 168. In one exemplary embodiment, the height of the pour stop 158 is sized such that a 2.5 to 3-inch deep 3000 pounds per square inch minimum compressive strength cast-in place concrete slab is created over the top of the corrugated steel decking 138.

As shown in FIG. 6, opposite the pour stop 158, the z-shaped closure 164 is provided. In combination with the joist 122 and the corrugated steel decking 138, the z-shaped closure 164 functions to contain the concrete 140 within the region of the cementitious wall structure 120 above the support structure 102 while the concrete is curing. FIGS. 7A through 7D illustrates a portion of a z-shaped closure 164 in accordance with an embodiment of the present invention. As illustrated in FIGS. 7A through 7D, the z-shaped closure 164 has a generally vertical face 170, a generally horizontal upper flange 171 extending away from the support structure 102, and a generally horizontal lower flange 172 extending in a direction opposite from the generally horizontal upper flange 171. In the illustrated embodiment, the vertical face 170 has a cutout 173 at one end. The cutout 173 has the shape of approximately one-half of the shape of the end of the joist 122, which may be approximated by the shape of an I-beam. This cutout 173 is configured to fit around at least one side of the upper chord 124 and the joist shoe 142 of the joist 122 forming a pour stop as shown in FIGS. 5 and 6. The vertical face 170 of the z-shaped closure extends upwards further than the top of the upper chord 124 so that the generally horizontal upper flange 171 extends above at least one peak in the corrugated steel decking 138. Stand-off fasteners 130, thread-forming screws, welds, pneumatic pins, or a variety of other fasteners, or combinations thereof, may be used to couple the generally horizontal lower flange 172 to the distribution member 154 and the generally horizontal upper flange 171 to a peak in the corrugated steel decking 138, respectively. The stand-off fasteners 130 may be used to fasten the notched closures 160 and z-shaped closures 150 to the wall structure, reducing material and labor costs.

An upper wall 174 may be provided as shown in FIG. 6A positioned above the cementitious wall structure 120. The upper wall 174 may be a wall structure comprising cold-formed steel wall studs 108. The upper wall 174 may include a lower distribution track 175 or plate. The lower track 175 may be connected to the cementitious wall structure 120 using pneumatic pins 176, wedge anchors, or expansion anchors.

As illustrated in FIG. 7C, the generally horizontal lower flange 172 may be configured such that, before the z-shaped closure 164 is installed, it forms an angle with the generally vertical face 170 that is greater than 90 degrees. For example, the z-shaped closure illustrated in FIG. 7C forms a 100-degree angle between the generally vertical face 170 and the generally horizontal lower flange 172. When such a z-shaped closure 164 is installed above the support structure 102, the z-shaped closure 164 may be pressed into position such that the angle between the generally vertical face 170 and the generally horizontal lower flange 172 is reduced to an angle closer to 90 degrees. When the z-shaped closure 164 is installed in this manner, the resilient bias of the z-shaped closure 164 will press the horizontal lower flange 172 against the top of the wall 104 and, thereby, create a better seal between the wall 104 and the z-shaped closure 164 than would have otherwise been formed using a z-shaped closure manufactured to have a 90-degree angle between the generally vertical face 170 and the generally horizontal lower flange 172.

As described above, the present building structure 100 includes a plurality of stand-off fasteners 130 installed along the upper portion 104 of the support structure 102, and may be used to fasten the pour stops 158 and closures 160, 164 to the wall structure. Additionally, the stand-off fasteners 130 may be installed through the corrugated steel decking 138 and through a horizontal flange of the upper chord 124. As discussed above, the upper portion 132 of each stand-off fastener 130 extends upwards and is encapsulated in the concrete of the cementitious wall structure 120 and/or floor system. When the stand-off fasteners 130 are installed through the corrugated steel decking 138 and through a horizontal flange of the upper chord 124 in the floor system, the upper portion 132 of the stand-off fastener 130 extending above the steel decking 138 becomes encapsulated within the concrete 140 connecting the upper chord 124 of the joist to the concrete slab 140. The composite enables the joist 122 and concrete slab 140 to act as a unit, transferring lateral loads and shear between the two joined components. The composite joist system provides a much larger load carrying capacity than the joist 122 alone.

In order for the stand-off fasteners 130 to more uniformly transfer the horizontal shear loads along the length of the support structure 102, the stand-off fasteners 130 are designed so that they are at least somewhat ductile. As the upper portion 132 of the stand-off fasteners bend, shear load is shared with stand-off fasteners located along the support structure 102. However, in addition to being ductile enough to share the shear loads without breaking, the self-drilling end portion 192 of the stand-off fastener 130 must also have sufficient hardness to allow it to drill into the upper portion 104 of the support structure 102, or through the corrugated steel decking 138 and the upper chord 124 of the joist 122. To accommodate both design requirements, the stand-off fastener 130 is specially heat treated so that at least a portion of the lower portion 134 of the stand-off fastener 130 has sufficient hardness for drilling while the upper portion remains sufficiently ductile.

FIG. 8A illustrates a side view of one of the stand-off fasteners 130 illustrated in FIGS. 1 through 6 in accordance with an embodiment of the present invention. The upper portion 132 of each stand-off fastener 130 typically has an elongated portion adapted to be encapsulated in concrete in the building structure. The upper portion 132 of the stand-off fastener 130 may be between about two (2) and twelve (12) inches in length. For certain applications, the upper portion 132 typically ranges from about two (2) inches to about four-and-a-half (4.5) inches in length. In other applications such as certain header and beam applications, the upper portion 132 may range from about four-and-a-half (4.5) inches to about twelve (12) inches in length depending on the application and the thickness of the concrete 140. FIG. 8B illustrates a cross-sectional side view of the stand-off fastener 130 illustrated in FIG. 8A. The cross hatch pattern in FIG. 8B represents an area of the stand-off fastener that is heat treated to a higher degree of hardness relative to the remainder of the stand-off fastener, in accordance with an embodiment of the present invention. As illustrated in FIG. 8B, at least a portion of the lower portion 134 of the stand-off fastener 130, including the self-drilling end portion and at least some of the threaded portion 188 is heat treated to a degree of hardness that enables the stand-off fastener 130 to effectively install into the building structure.

The stand-off fasteners 130 as shown in FIGS. 8A through 8D have the upper portion 132 having a desired length and the lower portion 134, where the lower portion has a clamping part 184 capable of clamping the decking to the joist 122. As shown in FIGS. 8A through 8D, a fastener head 180 may be positioned on the upper portion of each stand-off fastener adapted to be used in installing the stand-off fastener and to engage in the cementitious slab on installing of the fastener and the cementitious slab. The lower portion 134 may include the threaded portion 188 adjacent the clamping part 184 having a hardness between about of Rockwell B-Scale hardness (HRB) 70 and Rockwell C-Scale hardness (HRC) 40 through hardness, and may include a thread-forming portion 190 adjacent the threaded portion 190 of at least HRC 50 hardness adapted to enable the fastener to engage with formed threads in a building member. The lower portion 134 of the stand-off fasteners 130 may include a self-drilling end portion comprising the fluted lead portion 192 adjacent the thread-forming portion 190 of at least HRC 50 hardness with a nominal diameter between about 80 and 98% of the major diameter of the threaded portion 188 adapted to form a fastener opening. The fluted lead portion 192 drills through the upper portion 104 of the support structure 102, the corrugated steel decking 138, or other building member during installation, and the thread-forming portion 190 forms threads in the bore of the drilled fastener opening for the threaded portion 188 to engage the building structure. The stand-off fastener 130 is tightened to clamp, for example, the pour stops 158 and closures 160, 164 between the clamping part 184 and the threads engaging the fastener opening in the support structure 102, or to clamp the corrugated steel decking 138 between the clamping part 184 and the threads engaging the fastener opening in the joists 122 or other building member. Alternatively, the fluted lead portion 192 has a nominal diameter between about 80% and 95% of the major diameter.

The threaded portion 188 has a major diameter, the diameter of the fastener at the tip of the thread, and a minor diameter, the diameter of the fastener at the root of the thread. The threaded portion 188 has a desired thread pitch, the distance from one thread tip to the adjacent thread tip along the length of the threads. The stand-off fastener 130 typically has a major diameter between about 0.18 inch and about ⅜ inch.

The upper portion 132 may have a through hardness between about HRB 70 and HRC 40. In one alternative, the upper portion 132 may have a through hardness between about HRC 25 and HRC 34. Alternatively, at least a portion of the upper portion 132 has a through hardness between about HRB 70 and HRB 100. In one alternative, at least a portion of the upper portion 132 has a through hardness between about HRC 19 and HRC 30. In one alternative, at least a portion of the upper portion 132 has a through hardness between about HRC 26 and HRC 36. In yet another alternative, at least a portion of the upper portion 132 has a through hardness between about HRC 33 and HRC 39.

In one alternative, at least a portion of the threaded portion 188 has a through hardness between about HRC 25 and HRC 34. In one alternative, at least a portion of the threaded portion 188 has a through hardness between about HRB 70 and HRB 100. In one alternative, at least a portion of the threaded portion 188 has a through hardness between about HRC 19 and HRC 30. In one alternative, at least a portion of the threaded portion 188 has a through hardness between about HRC 26 and HRC 36. In yet another alternative, at least a portion of the threaded portion 188 has a through hardness between about HRC 33 and HRC 39. Adjacent the threaded portion 188, thread-forming portion 190 may have a hardness greater than about HRC 50, and may be greater than about HRC 54. Up to five threads of the threaded portion 188 adjacent thread-forming portion 190 may be hardened to at least HRC 50 or at least HRC 54.

The thread-forming portion 190 of the stand-off fastener 130 may have a cross-sectional shape for reduced threading torque selected from a group consisting of bilobular, trilobular, quadlobular, pentalobular, or other cross-sectional shape. Of these the quadlobular shape has been found to date to give the best performance in thread forming. In any event, these lobar shapes of the thread-forming portion of the fastener control the thread-forming torque and drive torque to facilitate assembly of the composite building system, reduce failures in installation of the stand-off fasteners, and improve the load carrying capacity of the assembled composite building system. The thread-forming portion includes a plurality of relief recesses 197 spaced around the thread-forming portion 190 to segment the thread-forming portion into a desired number of lobes 195 forming the bilobular, trilobular, quadlobular, pentalobular, or other cross-sectional shape. For example, five relief recesses 197 may be spaced as desired around the thread-forming portion 190 to segment the thread-forming portion 190 into five lobes 195 forming a pentalobular cross-section as shown in FIG. 8G, and four relief recesses 145 may be spaced as desired around the thread-forming portion 143 to segment the thread-forming portion 143 into four lobes 139 forming the quadlobular cross-section also shown in FIG. 8G. The relief recesses 197 may be longitudinal recesses provided along the axial direction of the fastener. In one alternative, the width of the relief recesses 197 may be wider toward the fluted lead portion forming a triangular shape as shown in FIG. 8F. The relief recesses 197 may extend into the threads of the fastener to about the minor diameter. Alternatively, the relief recesses 197 may extend into the shank of the fastener deeper than the minor diameter, such as to a depth between about 80% and 99% of the minor diameter. In yet another alternative, the relief recesses 197 may extend into the threads of the fastener to a depth between the major diameter and the minor diameter, such as to a depth between about 101% and 120% of the minor diameter. Each relief recess 197 may be about one thread pitch in width. Alternatively, the relief recesses 197 may be between about 0.8 and 4 thread pitches wide. In one alternative, the width of the relief recesses 197 may be between about 30% and 70% of the formula (π×major diameter/number of lobes) as desired to provide desired separation between the lobes 139. In yet another alternative, the width of the relief recesses 197 may be between about 40% and 65% of the formula (π×major diameter/number of lobes). For example, in one application having 4 lobes (quadralobular), the width of the relief recesses may be approximately 60% of the formula (π×major diameter/number of lobes). In another example, in one application having 2 lobes (bilobular), the width of the relief recesses may be approximately 50% of the formula (π×major diameter/number of lobes). The relief recesses 197 of the thread-forming portion 190 may be between about 3 to 7 thread pitches in axial length. Alternatively, the relief recesses 197 of the thread-forming portion 190 may be between 2 and 5 thread pitches in axial length. Depending upon the size of the fastener, the thread-forming portion 190 may be between about 0.06 and 0.5 inches in length, and may have a threading torque of no more than about ⅓ of the failure torque.

The fluted lead portion 192 may have a swaged or pinched point, a milled point, or a combination of both. The milled point alone, or in combination with preformed swedged or pinched point, is generally desired to ensure effectiveness of the fluted lead portion in drilling through the desired building member. The length of the fluted lead portion 192 may be longer than the thickness of the building member through which the fluted lead portion drills. It may be useful to provide the fluted lead portion 192 having an axial length between about 1.1 and 2.0 times the thickness of the drilled building member. The fluted lead portion 192 may be a Type 1, Type 2, Type 3, Type 4, Type 5, or a variation thereof.

The stand-off fastener 130 has a drilling torque to rotate the fluted lead portion 192 into the building members forming the fastener opening. As the thread-forming portion is further driven into the building member, the threading torque is the largest torque used to rotate the thread-forming portion of the stand-off fastener into the fastener opening forming threads in the fastener opening. After the head makes contact with the building member, further rotation advances the threaded portion into the threaded fastener opening with increasing torque as the head clamps the members against the threads formed in the fastener opening. The operator stops tightening the fastener at a seating torque as desired lower than the failure torque. The seating torque is selected as desired between the drive torque and the failure torque. For some applications, the selected seating torque is greater than the thread-forming torque. Alternatively, for some applications the selected seating torque may about 80% of the failure torque. The drive torque is the torque right before the torque rise to a seating torque. Continued rotation of the fastener may further increase the torque needed to turn the fastener until the connection fails at the failure torque. The failure mode typically is determined by the thickness of the building member and the major diameter of the fastener 130. When the building member in which threads are formed are thin materials such as less than 14 gauge, or less than 16 gauge, the building member may deform or fracture adjacent the fastener and the fastener ultimately strips-out at the failure torque. The failure torque 187 generally refers to strip torque in materials of thinner thickness. For certain material thicknesses, the fastener will fracture at the failure torque.

The drive torque is at least 50% less than the thread-forming torque. Alternatively, the drive torque may be between about 5% and 50% of the thread-forming torque. In one alternative, the drive torque is less than 30% of the thread-forming torque. To reduce driving torque, the threaded portion 188 may include back-sloping threads, and may have a thread angle less than 60°. Alternatively, the thread angle may be less than 50°. In yet another alternative, such thread angle may be between 45 and 50°. Reducing the thread angle also reduces the thread pitch and reduces the minor diameter. Back-sloping as used herein means that the major diameter of the threaded portion 188 is larger adjacent the thread-forming portion 190 than the major diameter adjacent the clamping part 184. In certain embodiments, the back-sloping may be between about 0.0005 and 0.005 inch per inch of axial length. Alternatively, the back-sloping may be between about 0.001 and 0.003 inch per inch of length.

The failure torque is substantially more than the seating torque of the fastener 130, which is more than the thread-forming torque. The threaded portion 142 of stand-off fastener 130 may have a seating torque of at least 80 inch-pounds, or between 80 and 450 inch-pounds, or greater, to provide the proper seating torque, depending on the size of the stand-off fastener 130 and type and properties of the decking, joist and other support material into which the stand-off fasteners 130 are threaded.

The threaded portion 188 of the stand-off fastener 130 may provide a strip torque of at least 80 inch-pounds measured using a fastener having a major diameter of about ¼ inch with the fluted lead portion 192 having at least one diameter within nominal diameter between about 80% and 95% of the major diameter and installed in a first and second building member having a combined material thickness about 0.125 inch (about 3.2 millimeter). The threaded portion may have a failure torque between about 80 and 450 inch-pounds. Alternatively, the threaded portion has strip torque between 80 and 300 inch-pounds measured using a ¼ inch fastener with the fluted lead portion 192 having at least one diameter within nominal diameter between about 80% and 95% of the major diameter and installed in a first and second building member having a combined material thickness of about 0.125 inch (about 3.2 mm). Alternatively, the threaded portion has a failure torque between 350 and 900 inch-pounds measured using a ⅜ inch fastener with the fluted lead portion 192 having at least one diameter within nominal diameter between about 80% and 98% of the major diameter and installed in a building member having a material thickness of about 0.25 inch (about 6.4 mm).

The lower portion 134 of the stand-off fastener 130 may be nutable, i.e., adapted to thread a nut on the threaded portion. For a nut to be threaded onto the stand-off fastener 130, the major thread diameter of the thread-forming portion 190 may be about the same diameter or smaller than the major diameter of the threaded portion 188, and the fluted lead portion 192 has a nominal diameter smaller than the minor diameter of the corresponding nut such that the nut will pass over the fluted lead portion.

The threaded portion 188 may comply with fastener standards such as ASTM A307, ASTM A325, ASTM A354, ASTM A490, SAE J429 Grade 2, SAE J429 Grade 5, SAE J429 Grade 8, or other fastener standards. Portions of the lower portion 134 of the stand-off fastener 130 may be selectively hardened, such as the fluted lead portion 192, and the thread-forming portion 190 to a hardness of at least HRC 50. Additionally, between about 1 and 5 threads of the threaded portion 188 adjacent the thread-forming portion 190 may be hardened to at least HRC 50. By hardening only a portion of the lower portion 134, the threaded portion 188 making the bolted connection retains physical properties as desired in compliance with ASTM A307, ASTM A325, ASTM A354, ASTM A490, SAE J429 Grade 2, SAE J429 Grade 5, SAE J429 Grade 8 or other selected fastener standards. Typically, the stand-off fasteners 130 are made with a medium carbon steel, medium carbon alloy steel, or a weathering steel in conformance with the desired fastener standard.

In one alternative shown in FIG. 8D, the clamping part 184 may be a SEMS washer 184' as shown in FIG. 8D. Alternatively, the clamping part 184 may be an integral flange as shown in FIG. 8A. The clamping part 184 may include serrations 196 adjacent the threaded portion 188 to engage the surface of the upper portion 104 of the support structure 102, the corrugated steel decking 138, or other building member during installation.

As shown in FIG. 8E, the clamping part 184 of the lower portion 134 of each stand-off fastener may include the fastener head 180 adapted to be used in installing the stand-off fastener 130, and the upper portion 132 of the stand-off fastener may be sized to permit the stand-off fastener to be installed into the decking. In this configuration, a holding member 198 may be provided at the end of the upper portion 132 for engagement with the concrete. The holding member 198 may be a SEMS washer, or may be a press-fit member.

In yet another alternative shown in FIG. 8H, the stand-off fastener 130 may include the lower portion 134 having a masonry thread 194 adapted for installing into concrete or other masonry materials. As described above with respect to the threaded portion 188, the masonry thread 194 may be heat treated so that the tip and at least a lower portion of the masonry thread 194 is harder than the upper portion of the fastener.

The stand-off fastener 130 may comprise the upper portion 132 having an extension coupling portion 199 located adjacent the end of the stand-off fastener 130 such as shown in FIGS. 8I and 8J. The extension coupling portion 199 may be configured to couple to a reinforcing member such as rebar or some other member that will effectively extend the length of the stand-off fastener 130. In the embodiments illustrated in FIGS. 27B, 30, 31 and 33, the extension coupling portion 199 comprises a threaded portion 201. As illustrated in FIG. 31, a couple nut 214 having two opposing female connectors may be used to join the end of the stand-off fastener 130 to the end of a reinforcing member 216 or other extension. At least one of the female connectors in the couple nut 214 has threads corresponding to the threaded portion 201 of the extension coupling portion 199 so that the couple nut may be screwed on to the end of the stand-off fastener 130. Typically, the end 218 of the rebar member 216 is also threaded and screws into the second female connector of the couple nut 214. In other embodiments, the second female connector of the couple nut 214 is not threaded and is configured to receive and hold the end of the rebar 216 therein by other means. For example, an adhesive, a fastener, and/or a weld may be used to hold the end of the rebar in the end of the couple nut 214 at least until concrete cures around the connection.

Of course, the stand-off fastener 130 illustrated in FIGS. 8I and 8J may also be used without connecting it to a rebar member performing the functions of the stand-off fasteners as described above. For example, FIGS. 32 and 33 illustrate embodiments of the present invention in which the stand-off fastener 130 is being used for functions other than or in addition to coupling the wall to a rebar member in the floor.

Alternatively, the stand-off fasteners 130 may be stand-off studs, such as headed concrete anchors. The stand-off studs have a lower portion and an upper portion, the lower portion of the stand-off studs connecting to the upper portion of the support structure, and at least a portion of the upper portion of each stand-off stud extending significantly above the upper portion of the support structure encapsulated in the cementitious wall structure. The stand-off studs may comprise a lower portion comprising a weld stud, weld flange, crimp bead, quarter-turn, lock tab, or any other feature for welding or mechanically fastening the stand-off stud to the support structure.

The stand-off fasteners are installed in at least some of the valleys of the corrugated steel decking 138 along the length of the joist 122 as desired for the particular composite joist floor system and its application. By providing increased spacing between at least some of the stand-off fasteners 130, such as by installing stand-off fasteners in every other valley of the corrugated steel decking 138, the construction times and costs can be significantly reduced. Furthermore, the attachment patterns may be standardized for particular designs in order to simplify installation of the stand-off fasteners 130. For example, FIGS. 12A through 12D illustrates an exemplary set of screw spacing standards that may be used along a composite floor joist system or along the upper portion of the support structure in a composite wall system in combination with the present building system.

Specifically, FIGS. 12A through 12D illustrate 1.0 C-type steel decking having a width W. FIG. 12A illustrates W/3 spacing where each width of corrugated steel decking 138 contains three stand-off fasteners 130. FIG. 12B illustrates W/4 spacing where each width of corrugated steel decking 138 contains four stand-off fasteners 130. FIG. 12C illustrates W/5 spacing where each width of corrugated steel decking 138 contains five stand-off fasteners 130. FIG. 12D illustrates W/6 spacing where each width of corrugated steel decking 138 contains six stand-off fasteners 130.

FIGS. 13 through 16 illustrate various application of the building structure 100 described above in FIGS. 1-5. More particularly, FIG. 13 illustrates a building structure 100 in accordance with an embodiment of the present invention where the supporting structure 102 for supporting the end of the joist 122 includes the structural beam 110 where the cementitious wall structure is formed integral with a cementitious slab of a floor structure of the building structure.

In FIG. 14, the building structure 100 includes the cementitious wall structure formed integral with the cementitious slab of the floor structure, and the supporting structure 102 for supporting the end of the joist 122 includes the masonry wall 112, such as a concrete block or a brick wall. The upper portion 104 of the masonry wall 112 may include a lintel block 220 providing a concrete-filled channel 222 running through the uppermost blocks or bricks in the wall 112 so that masonry screws may be inserted into the concrete to hold, for example, the pour stop 158 or the joist shoe 142 in place and so that the forces from the concrete floor slab are more evenly distributed throughout the wall 112. As also illustrated in FIG. 14, the concrete-filled channel 222 may have rebar 224 provided therein for reinforcing the concrete in the channel.

FIG. 15 illustrates the composite wall structure where the supporting member for supporting the end of the joist 122 includes a concrete wall 226. FIG. 16 illustrates the composite wall structure where the supporting member 102 for supporting the end of the joist 122 includes wood load bearing wall studs 114. In such an embodiment, the upper portion 104 of the wall structure may include two or more wood supporting members 228 to distribute the force from the concrete slab throughout the wall. As illustrated, all of the floor systems shown in FIGS. 13 through 16 utilize many of the same structures and configurations describe above with reference to FIGS. 1-5.

As shown in FIG. 17A, the height 248 of the cementitious wall structure 120 may be greater than the width 250 of the cementitious wall structure. The ratio of the height 248 to width 250 may be greater than 1. Alternatively, the ratio of the height to width may be between about 0.5 and 4, or greater. In yet another alternative, the ratio of the height to width may be between about 1 and 3. It is contemplated that the ratio of the height 248 to width 250 may be tailored as desired for design requirements. The height of the generally vertical face 170 of the z-shaped closure 164 and the vertical face 167 of the pour stop 158 may be increased or decreased as desired for design requirements to change the height 248 of the cementitious wall structure 120. Additionally, the z-shaped closure and the pour stop 158 may be moved closer together or further apart to change the width 250 of the cementitious wall structure 120.

FIG. 17B shows a side section view of a portion of the floor system 100 at an external wall that is substantially parallel to the floor joists 122, in accordance with an embodiment of the present invention. As illustrated in FIG. 17B, two rows of stand-off fasteners 130 are installed into the upper portion 104 of the wall structure 102 to transfer horizontal diaphragm forces from the cementitious wall structure to the external wall 102. As described above, although two side-by-side rows of stand-off fasteners 130 are illustrated in the FIG. 17B, in other alternatives any number of rows may be used and the rows may be staggered relative to each other.

In one alternative, the wall structure of FIG. 17A may be used in a shear wall panel to transfer lateral loads from one level to the next successive lower level. In this alternative, FIGS. 17A, 17B and 18 illustrate how the composite wall structure may be configured to transfer horizontal diaphragm shear forces from the concrete slab 140 to the primary lateral force resisting system, such as a cold-formed steel shear-wall 230, in accordance with an embodiment of the present invention. In addition to transferring horizontal diaphragm loads from the slab to the wall, the techniques described herein also provide for the transfer of other forces between the two structures. For example, the force exerted by wind blowing against an exterior wall can be transferred from a shear wall 242 of an upper level and the concrete slab of an upper level to the cementitious wall structure 120 and the shear wall 230 of a lower level more efficiently using the systems described herein. The concrete slab 140 and portions of the structure are not shown in FIG. 18 for clarity.

As illustrated in FIGS. 17A and 18, the present composite wall structure may use two or more primary techniques for transferring diaphragm shear forces from the concrete slab 140 to the shear wall 230 below. In some embodiments of the present wall structure both techniques are used together, while in other embodiments of the present wall structure one or none of the techniques may be used. In the first technique, the joist shoes 142 are attached to the top of the wall 104 by, for example, self-drilling screws or other fasteners, such as stand-off fasteners 130. By securing the ends of the joists 122 to the top of the wall 104 and by using the stand-off fasteners 130 to couple the joist to the concrete slab as described in U.S. patent application Ser. No. 12/019,372, filed Jan. 24, 2008, the shear forces are transferred from the slab 140 into the joist seat region through bearing, and then from the joist into the upper portion 104 of the wall structure 102 by the self-drilling screw or other fastener used to attach the joist 122 to the wall.

As shown in FIG. 17A, the joist shoes 142 may extend over the supporting wall 102 beyond the end of the joist's upper chord 124 so that there is sufficient room for the self-drilling screws to be drilled through the joist shoe 142 and into the top of the wall 104 and/or distribution plate 156. The stand-off fasteners 130 may be used to fasten the joist shoes 142 to the wall 102.

In the second technique for transferring horizontal diaphragm forces from the concrete slab 140 to the shear wall 230 below, stand-off fasteners 130, are installed into the top of the wall 104 (or distribution plate 156, member, wall track, or header, as the case may be) at design spacing as discussed above with reference to FIGS. 10A and 11B. These stand-off fasteners 130 then function to transfer the diaphragm shear forces from the concrete 140 to the wall 102. As described above, the stand-off fasteners 130 are heat treated in such a way that the lower portion 134 of the screw has a greater hardness than the upper portion 132 of the screw.

FIGS. 10B and 11B illustrate an exemplary embodiment where a single row of stand-off fasteners 130 are installed into the top of wall 104. Alternatively, more than one row of stand-off fasteners 130 may be installed into the top of the wall 104. Where more than one row of stand-off fasteners 130 are used, the rows may be aligned and have the same screw spacing such that each stand-off fastener 130 is installed next to a corresponding stand-off screw in the other row(s). Alternatively, the rows may be configured such that they are not aligned and/or have different screw spacings such that the stand-off fasteners 130 are staggered relative to the stand-off fasteners 130 in the other row(s).

As shown in FIG. 18, the shear wall 230 may further include diagonal members 232 to transfer the horizontal diaphragm from the cementitious wall structure 120 of one floor to the successive floor below. As wind loads or other lateral loads are transferred from the concrete floor slab 140 of an upper floor, the loads must be transferred from floor to floor downward until the loads are transferred to the foundation of the building. As shown in FIGS. 18 and 19A and 19B, a lateral transfer frame 234 may be provided in the composite wall structure to transfer loads from one floor to the next successive lower level.

Referring now to FIGS. 23A through 23C, the lateral transfer frame 234 has a lower plate 236 adapted to be fastened to the upper portion 104 of the support structure 102 below the frame, and an upper plate 238 adapted to be fastened to the shear wall panel 242 above the cementitious wall structure as shown in FIG. 21. The lateral transfer frame 234 includes rigid transfer spacers 240 adapted to transfer lateral load between the shear wall panel 242 above the cementitious wall structure 120 to the upper portion 104 of the shear wall panel 230 below the lateral transfer frame. An alternative lateral transfer frame 234 for use in the present wall structure is shown in FIG. 23B. FIG. 23C shows yet another alternative lateral transfer frame 234 for use in the present wall structure.

In any case, the lateral transfer frames 234 are encapsulated in the cementitious wall structure 120 adjacent the diagonal members 232 and vertical supports such as steel studs 108 at least at the lower floor level of the building structure. As shown in FIGS. 18 and 19A and 19B, the diagonal members 232 may be bands of sheet steel. The diagonal members 232 as bands of sheet steel typically transfer loads in tension and not compression. As shown in FIG. 18, when the diagonal members 232 are thin bands of sheet metal, typically the diagonal members will be positioned in an "X" on the shear wall panel 230 such that when lateral loads are in one direction the diagonal member 232 is loaded in tension, and when the lateral loads are in the opposite direction the diagonal member 232' is loaded in tension. In FIG. 18, arrows indicate the loading of the diagonal members in tension in one load configuration.

Alternatively, the diagonal member 232 may be a structural member that can be loaded in tension and compression, such as a hollow structural section or angle member. For diagonal members 232 that can be loaded in compression, one diagonal member may be used for each shear wall panel 230. In yet another alternative, the diagonal member 232 may be a panel or plate over the shear wall. Other diagonal members 232 may be utilized as desired.

As shown in FIGS. 19A and 19B, the diagonal members 232 extend from adjacent an upper portion of the shear wall panel 230 to an opposite lower portion of the shear wall panel. The shear wall panel 230 may comprise a plurality of vertical members such as steel wall studs 108, structural members, or other structural members. A lateral transfer frame 234 may be provided in the cementitious wall structure 120 adjacent the upper portion of shear wall panel 230. In FIG. 19A, arrows indicate loads on the lateral transfer frame 234 in one load configuration. As shown in FIG. 21, the lower plate 236 is fastened to the upper portion 104 of the shear wall panel 230 below the frame, such as by welding the lower plate 236 to the distribution plate 156 In FIGS. 21 and 22, welds are indicated as x's for illustration. A removable pour stop 244 may be bolted to the pour stop 158 adjacent the lateral transfer frame 234 as shown in FIG. 20. In FIGS. 18 through 22, the wall studs 108 of the upper wall panels are aligned with the studs 108 of the lower wall panel. Typically in a shear wall, stud alignment is used to resist forces transferred through the shear wall.

After the concrete is placed in the cementitious wall structure 120 and cured, the shear wall panel 242 above the cementitious wall structure 120 may be installed as shown in FIGS. 21 and 22. The lower distribution plate 175 may be fastened to the cementitious wall structure 120 using pneumatic pins or other fasteners adapted to connect the shear wall panel 242 to the cementitious wall structure 120. The removable pour stop 244 may be removed and the lower distribution plate 175 of the shear wall panel 242 may be welded to the upper plate 238 of the lateral transfer frame. Additionally, the lateral transfer frame may be provided with apertures 235. A vertical load transfer rod 246 may be provided through the apertures 235 as shown in FIGS. 20 and 21 and secured to the steel wall studs 108 in the shear wall panel 242 above the lateral transfer frame and the shear wall panel 230 below the lateral transfer frame using welding, vertical wall ties, or other brackets or attachments, not shown.

Although the figures illustrate installation of the stand-off fasteners 130 into cold-formed steel wall studs and steel distribution plates or wall tracks, the stand-off fasteners may be similarly used in support structures made of other materials. For example, stand-off fasteners may be used at the tops of masonry walls 112 or wood-framed walls 114. In such embodiments, the stand-off fasteners are preferably modified such that the stand-off fasteners have threads and hardnesses that are tailored to meet the requirements of the material being driven into.

Although FIGS. 17A and 17B and 18 illustrate external walls, the stand-off fasteners can also be used in a similar manner to transfer diaphragm forces from the concrete slab 140 to interior walls or support beams, as the case may be. In this regard, FIG. 24 illustrates an interior support structure 102 in which stand-off fasteners 130 have been installed into the top of the wall 104. As shown in FIG. 24, the z-shaped closures 164 are provided to form the composite cementitious wall structure to transfer diaphragm forces from the concrete slab 140 to the wall. The length of the vertical faces of the z-shaped closures 164 determine the size of the cementitious wall structure over the wall 102 and the distance that this beam 120 extends below the bottom of the decking 138. As discussed above, the ratio of the height to the width of the cementitious wall structure may be between about 0.5 and 4, or greater, as desired. The z-shaped closures 164 can be varied to change the structural characteristics of the composite building system depending on the design requirements. For example, for a given height wall structure, the height of the cementitious wall structure 120 may be increased and the height of the stud wall 102 decreased, thereby increasing the height to the width ratio of the cementitious wall structure 120. The height of the generally vertical faces 170 of the z-shaped closures 164 may be increased or decreased as desired and thereby the cementitious wall structure 120 can be used to alter the noise attenuating and fire containing properties of the structure.

As shown in FIG. 24, the interior wall 102 is parallel to the floor joists 122. Since the wall 102 supports corrugated decking 138 on each side of the wall 102, two z-shaped closures 164 are used to support the decking 138, respectively, and to create the walls of the channel that forms the cementitious wall structure 120 above the wall 102. When the interior wall is a demising wall, fire caulking is typically required at the top of the demising wall or some other fire stop must be installed in the corrugations of the metal decking 138 between the decking and the demising wall in order to meet the proper fire safety design requirements. However, the z-shaped closures 164 can also be varied to provide the cementitious wall structure 120 over the wall 102 as desired to alter the noise attenuating and fire containing properties of the structure. The z-shaped closures 164 may be used to create a concrete beam that is large enough and creates enough of a fire barrier so that additional fire proofing may not be required at the juncture between the floor and the demising wall. This can save significant time and cost during construction of the structure.

FIG. 25 illustrates a sectional side view of composite wall structure 100 showing how a beam 110 running substantially perpendicular to the joists may support the ends of two joists 122 on opposite sides of the beam 110. Similar to the joist described above with respect to FIGS. 1 through 4, each joist 122 illustrated in FIG. 25 may include upper chord 124 and lower chord 126 separated by an open web formed from one or more rod-like members 129. At the end of each joist 122, the diagonal end member 136 extends from the lower chord 126 proximate the first web connection to the end of the upper chord 124 proximate the joist shoe 142. Joist shoes 142 are attached to the ends of the upper chords 124 to form an I-beam configuration at the end of each joist 122. The bottom surface of each shoe 142 is supported by the top surface of the beam 110.

In the illustrated embodiment, the ends of the joists are configured such that they extend less than halfway across the beam 110, thereby, creating a gap between the ends of the opposing joists. In the illustrated embodiment, the ends of the opposing joists 122 are seated on the beam 110 at approximately the same location along the beams longitudinal axis. In other embodiments, however, the opposing joists 122 may be staggered along the longitudinal axis of the beam 110.

As further illustrated by FIG. 25, each joist 122 supports corrugated steel decking 138. The corrugated steel decking 138 is positioned such that the corrugations run generally perpendicular to the joists 122. The corrugated steel decking 138 is also positioned such that the corrugated steel decking 138 on either side of the beam 110 ends at or before the beam 110. By ending the corrugated steel decking 138 at or before the beam 110, an opening is created above the beam 110 that exposes the top of the beam, the ends of the upper chords, and the ends of the joist shoes. When concrete is placed over the corrugated steel decking to form the concrete slab, concrete is permitted to flow or is placed into the opening above the beam 110 to create the cementitious wall structure 120 that extends above the steel beam 110 and encapsulates the ends of the upper chords and the joist shoes in the concrete 140. Z-shaped closures 164 as discussed with respect to FIG. 7 are positioned on either side of the beam 110 to form the walls of a channel that the concrete is placed into and, thus, form the walls of the cementitious wall structure 120.

As described above, stand-off fasteners 130 are positioned through the corrugated steel decking and the upper chords of the joist in at least some of the valleys of the corrugated steel decking. Additionally, stand-off fasteners 130 are also positioned in the flanges of the upper chords 124 proximate the ends of the upper chords in the region above the steel beam 110.

FIG. 26 illustrates a sectional side view of a composite wall structure 100 showing where the corrugated steel decking 138 is supported at its edge by a wall support structure 102 that runs substantially parallel to the joists 122. The support structure 102 may comprise, for example, a plurality of steel studs. The cold-formed wall track 156 may be positioned over the ends of the studs and may run along the top of the wall to distribute forces from the composite joist floor to the load bearing wall studs. A self-drilling screw may be drilled through a valley in the corrugated decking 138 and into the cold-formed wall track 156 to couple the edge of the concrete floor slab 140 to the wall. In some embodiments, the thread-forming screw may be the stand-off fastener 130 as discussed above.

As further illustrated in FIG. 26, the corrugated steel decking 138 may, in some embodiments, only extend over a portion of the supporting structure 102 so that the un-cured concrete 140 can flow or be placed over the edge of the corrugated steel decking 138 and onto the top of the cold-formed wall track 156. If the floor is to end at the edge of the wall 102, the pour stop 158 may be used to contain the un-cured concrete during concrete placement and curing.

As further illustrated, one or more stand-off fasteners 130 may be drilled through the cold-formed wall track 156 in the region over the support structure 102 beyond the edge of the corrugated steel decking 138 to provide the composite wall structure having advantages as discussed above. For example, in some embodiments, the cold-formed wall track 156 is a cold-formed steel section that rests atop a plurality of the cold-formed steel wall studs. The stand-off fasteners 130 installed along the top of the wall in the cold-formed steel wall track 156 transfer forces between the cold-formed steel wall track 156 and the concrete 140 allowing the two structures to act more like a composite unit as discussed above. As such, the structure may be significantly stronger and/or material may be reduced in the cold-formed wall track 156 used in the wall system. The stand-off fasteners 130 installed at the tops of the wall may enable the wall structure to transfer horizontal diaphragm forces from the floor to the support structure 102.

In FIG. 26, the wall 102 is the proper height to directly support the edge of the corrugated steel decking 138. In other embodiments, however, z-shaped closures 164 may be used at the inside edge of the wall to support the corrugated steel decking 138. In this way, a larger cementitious wall structure can be created over the top of the wall that can provide various structural advantages and improve the structures fire safety rating. For example, FIG. 27A illustrates a cross-sectional view of a composite wall system where an external masonry wall 112 having lintel block 220 that is substantially parallel to the floor joist 122 supports the edge of the corrugated steel decking 138 using a z-shaped closures 164 to support the edge of the corrugated steel decking 138.

When the wall 112 is an external wall, the pour stop 158 is used to form the exterior wall of the cementitious wall structure 120. The generally horizontal lower flange 166 of the pour stop 158 may be coupled to the top of the wall by, for example, stand-off fasteners 130 where the lower portion 134 is a masonry screw 194. It should be appreciated that the length of the vertical faces of the pour stop 158 and the z-shaped closure 164 determine the size of the cementitious wall structure over the wall 112 and the distance that this beam 120 extends below the bottom of the decking 138. As discussed above, the ratio of the height to the width of the cementitious wall structure may be between about 0.5 and 4, or greater, as desired. The pour stops 158 and z-shaped closures 164 can be varied to change the structural characteristics of the floor system depending on the design requirements. The pour stops 158 and z-shaped closures 164 can also be used to alter the noise attenuating and fire containing properties of the structure. Furthermore, when the supporting structure is a masonry wall such as in FIG. 27A, the height of the pour stop 158 and z-shaped closure 164 can be selected so that the height of the resulting cementitious wall structure 120 matches the masonry course height or some desired multiple thereof.

FIG. 27B illustrates an interior demising wall 112 that is parallel to the floor joists 122. Since the demising wall 112 supports corrugated decking 138 on each side of the wall 112, two z-shaped closures 164 are used to support the decking 138, respectively, and to create the walls of the channel that forms the cementitious wall structure 120 above the wall 112. Typically fire caulking is required at the top of a demising wall or some other fire stop must be installed in the corrugations of the metal decking 138 between the decking and demising wall in order to meet the proper fire safety design requirements. However, the z-shaped closures 164 may be used to create a concrete beam that is large enough and creates enough of a fire barrier so that additional fire proofing may not be required at the juncture between the floor and the demising wall. This can save significant time and cost during construction of the structure. Additionally, as shown in FIG. 27B, reinforcing 216 may be coupled to the stand-off screw 130 installed into the top of the supporting structure 112. The stand-off fasteners 130 may be provided in the concrete-filled channel 222 through the lintel block 220, and the reinforcing 216 may be directed vertically out of the slab in preparation for providing a masonry wall above the slab. A couple nut 214 may be used to join the end of the stand-off fastener 130 to the end of the reinforcing 216. Alternatively, the reinforcing 216 may be formed to extend into the slab as shown in FIG. 31.

FIG. 28 illustrates a sectional side view of a composite wall structure where the joist 122 is supported by a support structure 102 running perpendicular to the joist 122. The configuration of the joist 122 and the joist shoe 142 is generally similar to the joists and joist shoes described above, however, the composite wall structure uses a "flush seat" configuration to support the end of the joist 122.

Referring to FIG. 28, in the flush seat configuration the top of the upper chord 124 is secured such that it is approximately flush with the top of the supporting member, such as the supporting structure 102 or, in this case, a distribution member 154 or header positioned at the top of a supporting wall 102. The joist seat 200 includes a generally horizontal plate 202 having a first portion 204 welded to the top surface of the end of the upper chord 124. The horizontal plate 202 extends beyond the end of the upper chord 124 so that a second portion 206 of the plate 202 rests upon the top surface of the distribution member 154. In the illustrated embodiment, a substantially vertical plate 208 extends downward from the horizontal plate 202 at a location on the horizontal plate 202 just beyond the end of the upper chord 124. The vertical plate 208 extends downward just below the lower surface of the joist shoe 142. The joist shoe 142 is welded to the joist such that it extends slightly (e.g., ¼ of an inch) beyond the end of the upper chord 124. This slight extension of the joist shoe 142 allows the vertical plate 208 to be welded the horizontal plate 202 without interfering with the end of the joist's upper chord 124. The welding of the vertical plate 208 to the bottom of the joist shoe 142 applies the vertical load into the bottom of the joist shoe 142 and minimizes eccentricity on the joist end. As shown in FIG. 28, the stand-off fasteners 130 are installed into the distribution member 154 above the support structure 102. The stand-off fasteners 130 are encapsulated in the concrete forming the composite wall structure.

FIG. 29 illustrates a joist seat configuration where the joist seat 200 is configured specifically for a masonry-type support member 102, such as a block wall 112. Specifically, the second portion 206 of the horizontal plate 202 extending beyond the vertical plate 208 is bent downward to concentrate the downward force more toward the center of the concrete channel 222 rather than toward the top inside corner of the top block in the masonry wall 112. Alternatively, the second portion 206 of the horizontal plate 202 extending beyond the vertical plate 208 may be offset such as shown in FIG. 30. The offset portion 206 may be used to distribute the load toward the center of the concrete channel 222. As shown in FIG. 30, the reinforcing 216 in the concrete slab may be coupled to the stand-off screw 130 installed into the top of a supporting structure 112. A couple nut 214 may be used to join the end of the stand-off fastener 130 to the end of the reinforcing 216. The stand-off fasteners 130 may be provided in the concrete-filled channel 222 through the lintel block 220, and the reinforcing 216 may be directed vertically out of the slab in preparation for providing a masonry wall above the slab. Alternatively, the reinforcing 216 may be formed to extend into the slab as shown in FIG. 31.

FIG. 31 illustrates a composite wall structure 100 comprising rebar 216 embedded within the concrete 140 to reinforce the concrete slab. In general, the rebar is spaced both perpendicular and parallel to the walls. The perpendicular and parallel rebar members may be welded or otherwise coupled together at their intersections to form a welded wire fabric. Alternatively, the rebar may be positioned in other formations in the concrete slab based on the particular design requirements.

As shown in FIG. 31, the rebar 216 in the concrete slab may be coupled to the stand-off screw 130 installed into the top of a supporting structure 102. The support structure 102 shown in FIG. 31 is masonry wall 112, and may have lintel block 220 providing the concrete-filled channel 222 running through the uppermost blocks or bricks in the wall 112 so that masonry screws may be inserted into the concrete and so that forces from the floor may be more evenly distributed throughout the wall structure. As also illustrated in FIG. 31, the concrete-filled channel 222 may have rebar 224 provided therein for reinforcing the concrete in the channel 222. In general, when standard masonry screws or stand-off fasteners 130 having masonry threads 194 are installed into the concrete, the concrete is pre-drilled to provide a hole for the masonry screw or stand-off screw to be threaded into.

As described above, a stand-off fastener 130 may be installed into the top of the supporting wall 112 and z-closures 164 and pour stops 158 may be used to create the cementitious wall structure 120 at the top of the wall that encapsulates the stand-off end of the stand-off fastener 130. As also described above, installing the stand-off fasteners 130 into the top of the wall in this manner creates composite action between the cementitious wall structure 120 and the support structure 102. The stand-off fasteners 130 also function to transfer horizontal diaphragm forces from the concrete slab 140 to the wall structure 102 as discussed above. FIG. 32 illustrates a stand-off screw 130 used to attach the joist shoe 142 to the supporting wall 102. In the illustrated embodiment, the supporting structure 102 is a masonry wall 112 and the joist shoe 142 is extended to allow for installation of the stand-off screw 130 there through. When the joist shoe 142 is metal and the wall is masonry, the stand-off fastener 130 used will generally have threads 194 designed for threading into masonry and the joist shoe 142 may be pre-punched or drilled to allow the lower threaded portion of the stand-off fastener 130 to pass there through. Preferably, if the joist is pre-punched or pre-drilled, the pre-punched or pre-drilled hole has a diameter greater than the diameter of the screw's lower threaded portion but less than the diameter of the screw's clamping collar.

FIG. 33 illustrates how the stand-off fastener 130 may also be used to attach the z-shaped closure 164 and pour stop 158 to the wall 102, while also functioning to couple rebar 216 to the wall 102 and/or to transfer horizontal diaphragm forces from the slab 140 to the wall 102. Where the z-shaped closure 164 and the pour stop 158 are metal and the wall 102 is masonry, the z-shaped closure 164 and the pour stop 158 may be pre-punched to have holes at the required design intervals to allow the threaded portions of the stand-off fasteners 130 to pass there through.

As described above, extension members other than rebar may also be coupled to the ends of the stand-off fasteners 130. For example, where the cementitious wall structure 120 that is to be formed over a supporting wall is particularly large, the stand-off fasteners 130 available may be shorter than what would be ideal for coupling the cementitious wall structure to the wall. In such an embodiment, extensions may be added to the end of the stand-off fastener 130, via a couple nut 214 or via other fastening systems, to increase the length of the stand-off fastener 130 and/or to change the shape of the end of the stand-off fastener 130.

The composite wall structure using stand-off fastener 130 permits the efficient transfer of diaphragm loads from the concrete floor slab into the supporting walls. This may be particularly advantageous for structures having masonry supporting walls. The conventional method of joining a masonry wall to a concrete floor would be to embed rebar into the masonry wall during construction of the wall such that portions of the rebar extend out of the top of the masonry wall. In this conventional method, the reinforcing bars present a trip hazard for anyone walking on the top of the wall during construction of the structure. In contrast to the conventional method, the stand-off fasteners 130 can be installed just prior to the placing of the concrete floor slab, thereby reducing the tripping potential. Furthermore, the stand-off fastener 130 installation does not require skilled labor and the installation spacing is easily adjusted to match the design diaphragm shear loads.

In some embodiments of the present disclosure, one or more headers are used at the tops of supporting walls and/or over, doors, windows, or other openings in the walls. In conventional building systems designed for heavy loads, the connections between the header and the jambs at either side of the opening are often some of the most expensive connections within the wall system since the load of the floor above the opening must be properly distributed to wall structures on either side of the opening. Embodiments of the present disclosure provide a composite wall structure that has a composite header design that may reduce the cost of these connections.

FIGS. 34A and 34B illustrate a composite building system having a composite header configuration. As shown in FIGS. 34A and 34B, the header 256 is a cold-formed steel header comprising a plurality of cold-formed steel sections. The header 256 may comprise two opposing C-sections 258 and two opposing tracks 260. As illustrated in FIG. 34B, the header 256 generally spans an opening 262 in the wall 102. The header is generally supported on each end by a jamb 264. As described above, z-shaped closures 164 and pour stops 158 may be used to define a channel over the top of the wall 102 as shown in FIG. 34A. Concrete 140 may be placed in this channel and cured to form the cementitious wall structure 120 on the top of the wall 102 and extending over the header 256. As illustrated in FIGS. 34A and 34B, one or more stand-off fasteners 130 may be installed into the header 256 prior to the concrete placement. These stand-off fasteners 130 may be of the same type and size as the stand-off fasteners installed into the upper chords of the joist 122 or they may be of a different size and/or type as required by the design parameters. As shown in FIG. 35A through 35C, wire mesh 266 may be provided with the stand-off fasteners 130 to provide additional strength in the header 256. The wire mesh 266 may be a 3 inch by 3 inch mesh, or other mesh size as desired. One or more distribution members 154 such as shown in FIGS. 35A through 35C may be provided over the header depending on the design requirements. FIGS. 35A through 35C shows two L-member distribution members 154 positioned one on each side of the wall structure. Optionally, the distribution member 154 may be other configurations such as a hollow structural section beam as shown in FIGS. 6A and 28. In certain configurations, the composite wall structure is sized to carry the design load requirements but the wall structure 102 alone may be insufficient to carry the construction load of wet concrete prior to curing and full composite action. The distribution member 154 may be provided to support non-composite loading due to construction loads prior to curing and full composite action of the cementitious wall structure 120.

When the concrete 140 is placed over the wall 102 and allowed to cure, the upper portions 132 of the stand-off fasteners 130 become encapsulated within the cementitious wall structure 120. In this way, a composite header is formed and loads in the cold-formed steel header 256 may be transferred into the cementitious wall structure 120 and vice versa such that the concrete beam and the cold-formed steel header 256 function as a single unit. By locking the concrete to the header via composite action, the cold-formed steel header 256 may be constructed of a lighter gauge material. Conversely, the composite header can safely support increased vertical loads with reduced deflection compared to a normal non-composite header. The composite header may also reduce costly header-to-jamb connections for heavy loads by distributing much of the shear at the ends of the header into the jambs through the concrete. With the composite header, some of the vertical load will be transferred through the concrete slab into the jambs. This contrasts with a normal header where all of the vertical load must be transferred out of the header via direct connections between the header and the jambs. As further illustrated in FIG. 34A, in some embodiments of the invention the stand-off fasteners 130 also function to attach the z-shaped closure 164 and the pour stop 158 to the cold-formed steel header 256.

FIG. 34A also illustrates how, in some embodiments, the joist seat or shoe 142 may be spaced apart from the joist's upper chord 124 and connected by the end diagonal 136 and/or other connecting members 268. Such a configuration in combination with appropriately sized z-shaped closures 164 and pour stops 158 allow for variations in the height of the cementitious wall structure 120 that is formed above the wall 102.

FIG. 36 shows an alternative wall structure comprising a brick façade 270. The pour stop 158 may be provided with apertures (not shown). An embed plate 272 comprising rods 274 may be provided adjacent the pour stop such that the rods 274 pass through the apertures in the pour stop 158 and extend over the wall structure 102. When the concrete is placed, the rods 274 are encapsulated in the cementitious wall structure 120. An angle 276 may be fastened to the embed plate 272 for securing the brick facade 270.

Referring to FIG. 37, a composite wall panel 300 comprises a metal base 301 adapted to support placement of a cementitious material, and a plurality of stand-off fasteners 130 for fastening at spaced locations along the base 301, each stand-off fastener of carbon steel comprising the lower portion 134 and the upper portion 132 as discussed with reference to FIGS. 8A through 8G. For this application, the lower portion 134 may have the threaded portion 188, thread-forming portion 192 adjacent the threaded portion 188 adapted to enable the fastener 130 to form threads in the base 301, and a fluted lead portion 192 adjacent thread-forming portion 190 with a nominal diameter between 70 and 95% of major diameter of the threaded portion 188 adapted to form a fastener opening in the base 301. When installed, at least a portion of the upper portion 132 of each stand-off fastener 130 extends significantly above the base 301, and a cementitious slab 140 formed on the base 301 and encapsulating the upper portion 132 of each stand-off fastener extending above the base 301 to form a desired wall surface of the panel system 300.

The wall panel system 300 has the metal base 301, cementitious slab 140 and stand-off fasteners 130 as an integral wall system that can provide a desired wall surface where cracking of the cementitious slab is inhibited if not eliminated. The wall panel system 300 may be used either as an inside wall system or and outside wall system as explained in more detail below with reference to the drawings. The cementitious slab 140 may have any surface desired either for inside walls or outside walls. The metal base 301 may be corrugated metal decking 138 as shown in FIG. 37, and the stand-off fasteners 130 may be fastened through the base 301 to a flange 303 of metal wall studs 108 or other support members. Also welded wire fabric 148 or other reinforcing may provide further reinforcing in the cementitious slab 140.

The wall panel system 300 may be formed by providing the metal base 301 and a support structure 302 such as a support structure comprising cold-formed steel wall studs 108 and installing the fasteners 130 through the base 301 and through the flanges 303 of the wall studs 108 while the support structure is lying down. Alternatively, the support structure 302 may comprise non-symmetric C-channel members as shown in FIG. 37B or I-beam members as shown in FIG. 37C. In another alternative, the support structure 302 may comprise purlins, girts, or other structural members. Temporary side pour stops 307 may be placed around the periphery of the base 301 positioned by fasteners 159 to the support structure 302. The temporary side pour stops 307 generally extend above the upper end of the stand-off fasteners 130 installed in the base 301, so that the outer surface of the cementitious slab 140 has a smooth surface or some other desired surface decorative or functional service with the upstanding stand-off fasteners totally embedded in the cementitious slab 140. The temporary side pour stops 307 are then typically removed; however, the side pour stops may be used as part of the finish wall panel system. In any case, once the concrete forming the cementitious slab 140 is cured, the panel is brought upright and assembled in place in the building structure such as shown in FIGS. 39 and 40. The pour stops 307 may be shaped and positioned such that when the wall panels are assembled, a gap is provided between the cementitious slab and the adjacent cementitious slab or other structure as shown in FIG. 38. Additionally, the side pour stops 307 may be formed to provide a chamfer 304 on the edge of the cementitious slab 140 as shown in FIG. 37 such that multiple wall panel systems can be assembled butted together in the building structure with the chamfers 304 forming a groove adapted to be filled with sealing material 310. Optionally, a backer rod 309 may be provided as a backing for the sealing material 310 as shown in FIG. 38.

The stand-off fasteners 130 may be in an embodiment as illustrated in FIGS. 8A through 8G discussed above. The threaded portion 188 may have a through hardness of between HRB 70 and HRC 40 and the lower portion 134 of the fastener 130 may have a failure torque to thread-forming torque ratio of at least 3.0 and a drive torque at least 20% less than a thread-forming torque. The stand-off fastener may have a drive torque no more than 50% of a thread-forming torque. In addition, the thread-forming portion 190 adjacent the threaded portion 188 has at least HRC 50 hardness adapted to enable the fastener to form threads in the base 301, and the fluted lead portion 192 adjacent the thread-forming portion 190 of at least HRC 50 hardness. The upper portion 132 of the stand-off fasteners have a through hardness of between 70 HRB and 30 HRC to provide ductility in the upper portion of the fastener to reduce cracking in the fasteners in operation in a cementitious slab of the wall panel system. The threaded portion 188 of each stand-off fastener 130 may be of at least HRC 33 through hardness and up to five threads adjacent the thread-forming portion 190 may be hardened to at least HRC 50 hardness. The flute lead portion 192 may have at least HRC 54 hardness.

As discussed above, to facilitate assembly and avoid assembly defects, the clamping part 184 of each stand-off fastener 130 may comprise a fastener head 180' as shown in FIG. 8E adapted to be used in installing the stand-off fastener, with the upper portion 132 of the stand-off fastener 130 sized to permit the stand-off fastener 130 to be installed into the base 301. As shown in FIG. 8E, a SEMS anchor or stake anchor may be positioned on the upper portion of the stand-off fastener 130 sized to permit the stand-off fastener 130 to be fastened into the base 301, with the SEMS anchor or stake anchor engaging in the cementitious slab 140 on installing of the fastener 130 and placement of the cementitious slab 140. These embodiments provide for easier and more time consuming installation, while improving the quality and integrity of composite wall panel system assembled.

Alternatively, the fastener head 180 may be positioned on the upper portion 132 of each stand-off fastener 130 adapted to be used in fastening the stand-off fastener 130 to the base 301 and to engage in the cementitious slab 140 on installing of the fastener 130 and placement of the cementitious slab 140. In this embodiment, the clamping part 184 may comprise a SEMS anchor adapted to engage the base 301 and the cementitious slab 140 on placement of the cementitious slab.

To facilitate assembly of the wall panels, the thread-forming portion 190 of each stand-off fastener 130 has a shape selected from the group consisting of bilobular, trilobular, quadlobular and pentalobular.

For the wall panel systems 300, the threaded portion of each stand-off fastener 130 may meet a specification selected from the group consisting of ASTM A307, ASTM, A325, ASTM A354, and ASTM A490 specification or a specification selected from the group consisting of SAE J429 Grade 2, SAE J429 Grade 5, and SAE J429 Grade 8.

As discussed above, the fluted lead portion 121 of the stand-off fastener 130 may have a mill point to reduce the failure rate of the stand-off fastener 130. A pinch point may be provided on the fluted lead portion 122 of the stand-off fastener 130, but we have found the fasteners made with a milled point provide a more reliable and effective drilling tip, reducing assembly time and cost and producing an assembled wall panel with greater load capacity.

As shown in FIG. 38, the wall panel systems may be assembled together in a building structure using abutting wall studs 108 and 108' of adjacent wall panels. The composite wall systems can be assembled together by fasteners 159.

As shown in FIG. 39, the wall panel systems may be assembled in a building structure fastening the support structure 302 to the building structure. The support structure 302 may comprise cold-formed steel wall studs 108 with the wall studs 108 fitted into a lower distribution track 175 and upper distribution track 156. As shown in FIG. 39, the wall panel 300 may be fastened to the building structure through the lower distribution track 175 using a masonry fastener 312. Optionally, a bearing pad or bearing strip 311 may be positioned between the cementitious slab 140 of the wall panel 300 and the building structure, such as a Korolath™ bearing strip. Additionally, the sealing material 310 may be positioned under the wall panel assembly 300.

As shown in FIG. 40A, the composite wall system of the present invention may be an outside wall of a building structure. The composite wall system 300 may be used as the support structure supporting the joist 122 as shown in FIGS. 40A and 40B. The wall system may include a recessed joist support 315 supported by jack studs 108". This is however an example. It is recognized that the composite wall system may be used to assemble outside building walls embodying the present composite building system, as well as any other building structure that may be desired by a designer. In one alternative shown in FIG. 40C, an angle bracket 306 may be provided between the wall panel 300 and the joist 122. The angle bracket 306 may have a clearance hole or slot positioned to be placed over the threaded portion of a stand-off fastener 130. Then, a nut 308 may be provided to fasten the angle bracket 306 to the wall panel 300. The angle 306 may be fastened to the joist 122 using self-drilling screws, welding, or other fastening. In any of these configurations, a roofing deck 313 and roofing material 314 may be provided over the joist 122 for the upper level of the building structure as shown in FIGS. 40A and 40C. A flashing member 305 may be provided along the upper edge of the wall panel as desired.

In one alternative of the wall panel system, a multi-level wall panel system 300' may include a cementitious wall structure 120' between the support structure 302 and an upper support structure 302' portion. The lower support structure 302 may have a distribution track 156, and the upper support structure may have a lower distribution track 175 and spaced apart for the cementitious wall structure 120' therebetween as shown in FIG. 41. One or more stand-off fasteners 130 may be installed into the distribution track 156 of the header 256' prior to the concrete placement. These stand-off fasteners 130 may be of the same type and size as the stand-off fasteners installed into metal base 301 as discussed above or they may be of a different size and/or type as required by the design parameters. As shown in FIG. 41, reinforcement rod 224 and/or wire mesh 266 may be provided with the stand-off fasteners 130 in the cementitious wall structure 120' to provide additional strength in the header 256' as desired. To form the cementitious wall structure 120', an outer pour stop 316 may be provided along the edge of the support structure between the upper support structure 302' and the lower support structure 302. The metal base 301 may be provided over the upper support structure 302' and the lower support structure 302 with a gap positioned adjacent the location of the cementitious wall structure 120'. The cementitious material is placed over the metal base 301 and into the gap between the spaced apart upper and lower support structures 302, 302' and hardened in place forming the cementitious slab 140 and the cementitious wall structure 120' together.

As shown in FIG. 41, the wall panel 300' may include an opening 262, and the cementitious wall structure 120' may form a composite header above the opening. The support structure 302 may include a header 256' generally spanning the opening 262 in the wall panel 300'. As shown in FIG. 41, the header 256' may be a cold-formed steel header comprising a plurality of cold-formed steel studs 108'. In this embodiment, a lower distribution track 175' may be positioned pour stops 158 may be used to define a channel over the top of the wall 102. As discussed above, cementitious material 140 may be placed in this channel and cured to form the cementitious wall structure 120' in the wall panel 300' over the header 256'.

When the concrete 140 is placed over the wall panel 300' and into the cementitious wall structure 120' and allowed to cure, the upper portions 132 of the stand-off fasteners 130 become encapsulated within the cementitious wall structure 120'. In this way, a composite header is formed and loads in the cold-formed steel header 256 may be transferred into the cementitious wall structure 120' and vice versa such that the concrete beam and the cold-formed steel header 256' function as a single unit. As discussed above with reference to FIGS. 34 and 35, by locking the concrete to the header via composite action, the cold-formed steel header 256' may be constructed of a lighter gauge material. Conversely, the composite header can safely support increased vertical loads with reduced deflection compared to a normal non-composite header.

Alternatively, the cementitious wall structure 120' in the multi-level wall panel 300' as discussed above may be provided with a joist support member 318 between two cold-formed steel wall studs adapted to support a joist in a desired location as shown in FIGS. 42A and 42B. The support member 318 may be provided between two studs between two cold-formed steel wall studs 108 to provide support for a joist 122 in a desired location. A z-shaped closure 164 may be provided on each side of the joist 122 to define a channel over the support member 318 and over the distribution track 156. Cementitious material 140 may be placed in this channel and cured to form the cementitious wall structure 120' integral with the cementitious slab 140 as shown in FIG. 42A. Optionally, the cementitious material 140 may be placed above the support member 318 and cured to form the cementitious wall structure 120' separate from the cementitious slab 140 (not shown).

Although embodiments of the present invention described herein are generally described as providing a wall structure adjacent a floor structure for a building, it will be apparent to one of ordinary skill in the art than other embodiments of the present invention can be similarly used to provide a wall structure adjacent a roof or ceiling structure for a building.

In one alternative, a building structure is disclosed comprising:

a support structure having upper portion extending to adjacent a floor structure above the support structure and adapted to receive stand-off fasteners there along, a plurality of stand-off fasteners each having a lower portion and an upper portion, where the lower portion has a self-drilling end portion and adjacent a thread-forming portion with a nominal diameter between 70 and 95% of major diameter of a threaded portion adjacent the thread-forming portion, the self-drilling end portion adapted to form a fastener opening in an upper portion of the support structure, the thread-forming portion adapted to form threads in said fastener opening in an upper portion of the support structure, and the threaded portion having a drive torque less than the thread-forming torque of the thread-forming portion and adapted to thread the fastener and clamp the fastener with a clamping portion against the upper portion of the support structure, a cementitious wall structure formed above the upper portion of the support structure with the upper portions of the stand-off fasteners encapsulated in the cementitious wall structure.

The formed cementitious wall structure may extend between vertical supports of the building structure. Additionally, the cementitious wall structure may be formed integral with a cementitious slab of a floor structure of the building structure.

The floor structure of the building structure may comprise a plurality of laterally extending floor joists and a corrugated metal decking supported by the floor joists on which the cementitious slab of the floor structure is placed.

The lower portion of each fastener may have a threaded portion adjacent the clamping part with a through hardness of between about HRB 70 and HRC 40. Alternatively, the thread-forming portion may have at least HRC 50 hardness adapted to enable the fastener to form threads in upper portions of the support structure, and the self-drilling end portion having at least HRC 50 hardness. The threaded portion may provide the fastener with a drive torque at least 20% less than a thread-forming torque.

The upper portion of the support structure may comprise a metallic structure and the lower portion of the stand-off fasteners comprises a metal thread adapted to install into the metallic structure.

The upper portion of the support structure may comprise a masonry structure and the lower portion of the stand-off fasteners comprises a masonry thread adapted to install into the masonry structure.

The upper portion of the support structure may comprise a wood structure and the lower portion of the stand-off fasteners comprises a wood thread adapted to install into the wood structure.

Alternatively, the building structure may further comprise:

at least one closure positioned above the upper portion of the support structure to provided to form the cementitious wall structure above the support structure, and at least some of the stand-off fasteners fasten at least one of the closures to the upper portion of the support structure.

Alternatively, the building structure may further comprise:

floor joist each comprising a joist shoe positioned at least one end portion, and the upper portion of the support structure supports said end portion of the floor joist at the joist shoe, and stand-off fasteners fasten the joist shoe to the upper portion of the support structure and having upper portions of said stand-off fasteners encapsulated in the cementitious wall structure.

At least one reinforcing bar may be encapsulated within the cementitious wall structure. Additionally, the upper portion of at least one of the stand-off fasteners may be connected to the reinforcing bar.

The building structure may further comprise:

metal decking adapted to support at least portions of the cementitious wall structure and be supported of the upper portion by the support structure, a plurality of joists in spaced apart array adapted to support at least portions of the metal decking and the cementitious wall structure, and a plurality of stand-off fasteners adapted to fasten the metal decking to the joists by installing the lower portions of the stand-off fasteners through the decking and into the joists, and with the upper portions of the stand-off fasteners extending above the decking and encapsulated in a cementitious floor slab integral with the cementitious wall structure.

The support structure may comprise an opening in a wall and the cementitious wall structure forms a header spanning the opening in the wall.

In one alternative, a method is disclosed of forming a building structure with a cementitious wall structure building structure comprising:

assembling a support structure having upper portion extending to adjacent a floor structure above the support structure and adapted to receive stand-off fasteners there along, installing a plurality of stand-off fasteners each having a lower portion and an upper portion, where the lower portion has a self-drilling end portion and adjacent a thread-forming portion with a nominal diameter between 70 and 95% of major diameter of a threaded portion adjacent the thread-forming portion, the self-drilling end portion adapted to form a fastener opening in an upper portion of the support structure, the thread-forming portion adapted to form threads in said fastener opening in an upper portion of the support structure, and the threaded portion having a drive torque less than the thread-forming torque of the thread-forming portion and adapted to thread the fastener and clamp the fastener with a clamping portion against the upper portion of the support structure, placing a cementitious wall structure formed above the upper portion of the support structure with the upper portions of the stand-off fasteners encapsulated in the cementitious wall structure.

The method may include forming a building structure with a cementitious wall structure building structure where the formed cementitious wall structure extends between vertical supports of the building structure.

The method may include forming a building structure with a cementitious wall structure building structure where the cementitious wall structure is placed integral with a cementitious slab of a floor structure of the building structure.

The method may include forming a building structure with a cementitious wall structure building structure where the floor structure of the building structure is assembled by positioning a plurality of spaced apart laterally extending floor joists and a corrugated metal decking supported by the floor joists on which the cementitious slab of the floor structure is placed.

The method may include forming a building structure with a cementitious wall structure building structure where the lower portion of each fastener has a threaded portion adjacent the clamping part with a through hardness of between about HRB 70 and HRC 40.

The method may include forming a building structure with a cementitious wall structure building structure where the threaded portion provides the fastener with a drive torque at least 20% less than a thread-forming torque.

The method may include forming a building structure with a cementitious wall structure building structure where each stand-off fastener has a thread-forming portion at least HRC 50 hardness adapted to enable the fastener to form threads in upper portions of the support structure, and the self-drilling end portion having at least HRC 50 hardness The method may include forming a building structure with a cementitious wall structure building structure where the upper portion of the support structure comprises a metallic structure, and installing the lower portion of the stand-off fasteners comprising a metal thread into the metallic structure.

The method may include forming a building structure with a cementitious wall structure building structure where the upper portion of the support structure comprises a masonry structure, and installing the lower portion of the stand-off fasteners comprising a masonry thread into the masonry structure.

The method may include forming a building structure with a cementitious wall structure building structure where the upper portion of the support structure comprises a wood structure, and installing the lower portion of the stand-off fasteners comprising a wood thread into the wood structure.

The method of forming a building structure with a cementitious wall structure building structure may further comprise:

positioning at least one closure above the upper portion of the wall portion to provided a form for the cementitious wall structure above the wall portion, and installing at least some of the stand-off fasteners in at least one of the closures to the upper portion of the support structure.

The method of forming a building structure with a cementitious wall structure building structure may further comprise:

positioning a plurality of spaced apart floor joists each comprising a joist shoe positioned at least one end portion, and the upper portion of the support structure supports said end portion of the floor joists at the joist shoe, and installing stand-off fasteners into the joist shoe above the upper portion of the support structure with upper portions of said stand-off fasteners encapsulated in the cementitious wall structure.

The method of forming a building structure with a cementitious wall structure building structure may further comprise:

positioning at least one reinforcing bar encapsulated within the cementitious wall structure.

The method of forming a building structure with a cementitious wall structure building structure may further comprise:

the upper portion of at least one of the stand-off fasteners connected to the reinforcing bar.

The method of forming a building structure with a cementitious wall structure building structure may further comprise:

positioning a metal decking adapted to support at least portions of the cementitious wall structure and be supported of the upper portion by the support structure, assembling a plurality of joists in spaced apart array adapted to support at least portions of the metal decking and the cementitious wall structure, and installing a plurality of stand-off fasteners with the lower portions of the stand-off fasteners through the decking and into the joists, and with the upper portions of the stand-off fastener extending above the decking encapsulated in a cementitious floor slab integral with the cementitious wall structure.

The method may include forming a building structure with a cementitious wall structure building structure where the support structure comprises an opening in a wall and the step of placing a cementitious wall structure further comprises placing the cementitious wall structure to form a header spanning the opening in the wall.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A building structure comprising:
   a support structure for at least a portion of the building structure, comprising a lower wall having lower wall studs and an upper portion operatively coupled to the lower wall studs extending to adjacent a floor structure above the support structure and adapted to receive stand-off fasteners there along, wherein the upper portion of the lower wall is a member,
   a plurality of stand-off fasteners each having a lower portion and an upper portion, wherein the lower portion of the stand-off fasteners is installed into the member of the lower wall at locations approximate to the lower wall studs, and wherein at least a portion of the upper portion of each of the stand-off fasteners extends above the member of the lower wall,
   an upper wall with upper wall studs, wherein the upper wall studs out of alignment are with the lower wall studs, and
   a cementitious wall structure formed above the upper portion of the support structure with the upper portions of the stand-off fasteners encapsulated in the cementitious wall structure, wherein the cementitious wall structure operatively couples the upper wall to the lower wall, and wherein the plurality of the stand-off fasteners transfer a load from the upper wall studs of the upper wall and the cementitious wall structure to the member and the lower wall studs of the lower wall.

2. The building structure as claimed in claim 1 where the cementitious wall structure is formed integral with a cementitious slab of a floor structure of the building structure.

3. The building structure as claimed in claim 2 where the floor structure of the building structure comprises a plurality of laterally extending floor joists and a corrugated metal decking supported by the steel joists on which the cementitious slab of the floor structure is placed.

4. The building structure as claimed in claim 1 where the upper portion of the support structure comprises a metallic structure, and the lower portion of the stand-off fasteners comprises a metal thread adapted to install into the metallic structure.

5. The building structure as claimed in claim 1 where the upper portion of the support structure comprises a masonry structure, and the lower portion of the stand-off fasteners comprises a masonry thread adapted to install into the masonry structure.

6. The building structure as claimed in claim 1 where the upper portion of the support structure comprises a wood structure, and the lower portion of the stand-off fasteners comprises a wood thread adapted to install into the wood structure.

7. The building structure as claimed in claim 1 where the lower portion of the stand-off fasteners has a generally greater hardness than that of the upper portion of the stand-off fasteners.

8. The building structure as claimed in claim 1 where at least a portion of the lower portion of each stand-off fastener is heat treated to a higher degree of hardness relative to the remainder of the stand-off fasteners.

9. The building structure as claimed in claim 1 further comprising: at least one closure positioned above the upper portion of the support structure to provide a form for the cementitious wall structure above the support structure, and at least some of the stand-off fasteners fasten at least one of the closures to the upper portion of the support structure.

10. The building structure as claimed in claim 1 further comprising: floor joists each comprising a joist shoe positioned at least at one end portion, and the upper portion of the support structure supports said end portion of the floor joist at the joist shoe, and stand-off fasteners fasten the joist shoe to the upper portion of the support structure and have upper portions of said stand-off fasteners encapsulated in the cementitious wall structure.

11. The building structure as claimed in claim 1 further comprising: at least one reinforcing bar encapsulated within the cementitious wall structure.

12. The building structure as claimed in claim 11 further comprising: the upper portion of at least one of the stand-off fasteners connected to the reinforcing bar.

13. The building structure as claimed in claim 1 further comprising:
metal decking adapted to support at least portions of the cementitious wall structure and be supported by the upper portion of the support structure,
a plurality of joists in spaced apart array adapted to support at least portions of the metal decking and the cementitious wall structure, and
a plurality of second stand-off fasteners adapted to fasten the metal decking to the joists by installing lower portions of the second stand-off fasteners through the decking and into the joists, and with upper portions of the second stand-off fasteners extending above the decking and encapsulated in a cementitious slab of the floor structure integral with the cementitious wall structure.

14. The building structure as claimed in claim 1 where the support structure comprises an opening in a wall and the cementitious wall structure forms a header spanning the opening in the wall.

15. The building structure as claimed in claim 14 further comprising: at least one reinforcing bar encapsulated within the cementitious wall structure.

16. The building structure as claimed in claim 1 wherein the lower portion of the stand-off fasteners comprise a self-drilling end portion that is adjacent a thread-forming portion that is adjacent a threaded portion, and wherein the thread-forming portion has at least HRC 50 hardness adapted to enable the fastener to form threads in the base, and the self-drilling end portion has at least HRC 50 hardness.

17. At least a two story building structure comprising:
support structures on successive floor levels, for at least a portion of the two story building structure, each having an upper portion extending to an adjacent upper floor structure above the support structure and adapted to receive stand-off fasteners there along, wherein the support structures comprise an upper wall having upper wall studs and a lower wall having lower wall studs, wherein the upper wall studs are out of alignment with the lower wall studs, and wherein the upper portion of the upper wall is an upper member operatively coupled to the upper wall studs, and the upper portion of the lower wall is a lower member operatively coupled to the lower wall studs,
a plurality of stand-off fasteners each having a lower portion and an upper portion, wherein the lower portion of each of the stand-off fasteners is installed into the lower member of the lower wall at locations approximate to the lower wall studs, and, when installed, at least a portion of the upper portion of each of the stand-off fasteners extends above the lower member, and
a cementitious wall structure formed above the upper portion of each support structure of the building structure with the upper portions of the stand-off fasteners encapsulated in the cementitious wall structure, wherein the plurality of the stand-off fasteners transfer a load from the upper wall studs of the upper wall and cementitious wall structure between the upper wall and lower wall, to the lower member and the lower wall studs of the lower wall,
diagonal members fastened within the upper wall and the lower wall to further transfer the load from the upper wall to the lower wall.

18. The at least two story building structure as claimed in claim 17 further comprising:
lateral transfer frames encapsulated in the cementitious wall structure adjacent the upper wall and lower wall, each said lateral transfer frames comprising a lower plate adapted to be fastened to the upper portion of the lower wall below the frame, an upper plate adapted to be fastened to the upper wall above the cementitious wall structure, and rigid transfer spacers adapted to transfer lateral load between the upper wall and the lower wall.

19. The at least two story building structure as claimed in claim 18, where the lateral transfer frames are adapted to transfer lateral load from a diagonal member at the lower level to a second diagonal member of a second level.

20. The at least two story building structure as claimed in claim 17 where the diagonal members are selected from a group consisting of straps, hollow structural section members, angle members, C-channel members, studs, sheet material, and I-beams.

21. The at least two story building structure as claimed in claim 17 where each cementitious wall structure is formed integral with a cementitious slab of a floor structure of the building structure.

22. The at least two story building structure as claimed in claim 17 where said successive floor levels of the building structure comprises a plurality of laterally extending floor joists and a corrugated metal decking supported by the floor joists on which the cementitious slab of the floor structure is placed.

23. The at least two story building structure as claimed in claim 17 where each upper portion of the support structure comprises a metallic structure, and the lower portion of the stand-off fasteners comprises a metal thread adapted to install into the metallic structure.

24. The at least two story building structure as claimed in claim 17 where each upper portion of the support structure comprises a masonry structure, and the lower portion of the stand-off fasteners comprises a masonry thread adapted to install into the masonry structure.

25. The at least two story building structure as claimed in claim 17 where each upper portion of the support structure comprises a wood structure, and the lower portion of the stand-off fasteners comprises wood threads adapted to install into the wood structure.

26. The at least two story building structure as claimed in claim 17 where the lower portion of the stand-off fasteners has a generally greater hardness than that of the upper portion of the stand-off fasteners.

27. The at least two story building structure as claimed in claim 17 where at least a portion of the lower portion of each stand-off fastener is heat treated to a higher degree of hardness relative to the remainder of the stand-off fasteners.

28. The at least two story building structure as claimed in claim 17 further comprising: at least one closure positioned above the upper portion of each support structure to provide a form for the cementitious wall structure above the support structure, and at least some of the stand-off fasteners fasten at least one of the closures to the upper portion of the support structure.

29. The at least two story building structure as claimed in claim 17 further comprising: floor joists each comprising a joist shoe positioned at least at one end portion, and the upper portion of the support structure supports said end portion of the floor joist at the joist shoe, and stand-off fasteners fasten the joist shoe to the upper portion of the support structure and have upper portions of said stand-off fastener encapsulated in the cementitious wall structure.

30. The at least two story building structure as claimed in claim 17 further comprising: at least one reinforcing bar encapsulated within the cementitious wall structure.

31. The at least two story building structure as claimed in claim 17 further comprising: the upper portion of at least one of the stand-off fasteners connected to the reinforcing bar.

32. The at least two story building structure as claimed in claim 17 further comprising: metal decking adapted to support at least portions of the cementitious wall structure and be supported by the upper portion of the support structure, a plurality of joists in spaced apart array adapted to support at least portions of the metal decking and the cementitious wall structure, and a plurality of stand-off fasteners adapted to fasten the metal decking to the joists by installing the lower portions of the stand-off fasteners through the decking and into the joists, and with the upper portions of the stand-off fasteners extending above the decking and encapsulated in a cementitious floor slab integral with the cementitious wall structure.

33. A method of forming a building structure with a cementitious wall structure comprising the following steps:
   providing a support structure, for at least a portion of the building structure, comprising a lower wall with lower wall studs and an upper portion operatively coupled to the lower wall studs extending to adjacent a floor structure above the support structure, wherein the upper portion of the lower wall is a member,
   installing a plurality of stand-off fasteners each having a lower portion and an upper portion, wherein the lower portion of the stand-off fasteners is installed into the member of the lower wall at locations approximate to the lower wall studs, and wherein the upper portion of each of the stand-off fasteners extends above the member of the lower wall,
   providing an upper wall with upper wall studs, wherein the upper wall studs are out of alignment with the lower wall studs,
   placing a cementitious wall structure above the upper portion of the support structure with the upper portions of the stand-off fasteners encapsulated in the cementitious wall structure,
   wherein the cementitious wall structure operatively couples the upper wall to the lower wall, and
   wherein the plurality of the stand-off fasteners transfer a load from the upper wall studs of the upper wall and the cementitious wall structure to the member and the lower wall studs of the lower wall.

34. The method of forming a building structure with a cementitious wall structure as claimed in claim 33 comprising the following additional steps:
   positioning a plurality of floor joists in spaced apart array with one end portion of the each of the joists is supported at least in part by the support structure,
   positioning metal decking supported by the floor joist and at least partially by the support structure,
   installing a plurality of stand-off fasteners each having a lower portion and an upper portion, where the lower portion of the stand-off fasteners comprises a self-drilling end portion and an adjacent thread-forming portion, through the metal decking and into the floor joist with the upper portion of each stand-off fastener extends significantly above the upper portion of the metal decking,
   placing a cementitious slab of the floor structure above the upper portion of the metal decking with the upper portions of the stand-off fasteners encapsulated in the cementitious wall structure and with the cementitious slab of the floor structure integral with the cementitious wall structure.

35. The method of forming a building structure with a cementitious wall structure as claimed in claim 34 further comprising the additional steps of:
   positioning a joist shoe at least at one end portion of some of the floor joists, with the upper portion of the support structure supporting said end portion of the floor joist at the joist shoe, and installing stand-off fasteners into the joist shoe with upper portions of said stand-off fastener encapsulated in the cementitious structure of the floor structure.

36. The method of forming a building structure with a cementitious wall structure as claimed in claim 34 where the upper portion of the support structure comprises a metallic structure, and installing the lower portion of the stand-off fasteners comprises driving a metal thread into the metallic structure.

37. The method of forming a building structure with a cementitious wall structure as claimed in claim 34 where the upper portion of the support structure comprises a masonry structure, and installing the lower portion of the stand-off fasteners comprises driving a masonry thread into the masonry structure.

38. The method of forming a building structure with a cementitious wall structure as claimed in claim 34 where the upper portion of the support structure comprises a wood structure, and installing the lower portion of the stand-off fasteners comprising a wood thread into the wood structure.

39. The method of forming a building structure with a cementitious wall structure as claimed in claim 34 where the lower portion of the stand-off fasteners has a generally greater hardness than that of the upper portion of the stand-off fasteners.

40. The method of forming a building structure with a cementitious wall structure as claimed in claim 34 where at least a portion of the lower portion of each stand-off fastener is heat treated to a higher degree of hardness relative to the remainder of the stand-off fasteners.

41. The method of forming a building structure with a cementitious wall structure as claimed in claim 34 comprising the following steps:
    positioning at least one closure above the upper portion of the support structure to provide a form for the cementitious wall structure above the support structure, and installing at least some of the stand-off fasteners through at least one of the closures and into the upper portion of the support structure.

42. The method of forming a building structure with a cementitious wall structure as claimed in claim 34 further comprising:
    at least one reinforcing bar encapsulated within the cementitious wall structure.

43. The method of forming a building structure with a cementitious wall structure as claimed in claim 34 further comprising:
    the upper portion of at least one of the stand-off fasteners connected to the reinforcing bar.

44. The method of forming a building structure with a cementitious wall structure as claimed in claim 34 where the support structure comprises an opening in a wall and the step of placing a cementitious wall structure further comprises placing the cementitious wall structure to form a header spanning the opening in the wall.

45. A method of forming at least a two story building structure with a cementitious wall structure comprising the steps of:
    assembling support structures on successive floor levels for at least a portion of the two story building structure, each having an upper portion extending to an adjacent upper floor structure above the support structure and adapted to receive stand-off fasteners there along, wherein the support structures comprise an upper wall having upper wall studs and a lower wall having lower wall studs, wherein the upper wall studs are out of alignment with the lower wall studs, and wherein the upper portion of the upper wall is an upper member operatively coupled to the upper wall studs, and the upper portion of the lower wall is a lower member operatively coupled to the lower wall studs,
    installing a plurality of stand-off fasteners each having a lower portion and an upper portion, wherein the lower portion of each of the stand-off fasteners is installed into the lower member of the lower wall at locations approximate to the lower wall studs, and when installed, at least a portion of the upper portion of each of the stand-off fasteners extends above the lower member,
    placing a cementitious wall structure formed above the upper portion of each support structure of the building structure with the upper portions of the stand-off fasteners encapsulated in the cementitious wall structure, wherein the plurality of the stand-off fasteners transfer a load from the upper wall studs of the upper wall and cementitious wall structure between the upper wall and lower wall, to the lower member and the lower wall studs of the lower wall, and
    assembling diagonal members fastened within the upper wall and the lower wall to further transfer the lateral load from the upper wall to the lower wall.

46. The method of forming at least a two story building structure with a cementitious wall structure as claimed in claim 45 comprising the further step of:
    positioning lateral transfer frames encapsulated in the cementitious wall structure adjacent the upper wall and lower wall, each said lateral transfer frames comprising a lower plate adapted to be fastened to the upper portion of the lower wall below the frame, an upper plate adapted to be fastened to the upper wall above the cementitious wall structure, and rigid transfer spacers adapted to transfer lateral load between the upper wall and the lower wall.

47. The method of forming at least a two story building structure with a cementitious wall structure as claimed in claim 46 where the step of positioning lateral transfer frames further comprises positioning lateral transfer frames adapted to transfer lateral load from the diagonal members to the diagonal members of the next successive lower level.

48. The method of forming at least a two story building structure with a cementitious wall structure as claimed in claim 45 where the step of selecting diagonal members further comprises selecting diagonal members from a group consisting of straps, hollow structural section members, angle members, C-channel members, studs, sheet material, and I-beams.

49. The method of forming at least a two story building structure with a cementitious wall structure as claimed in claim 45 where each cementitious wall structure is formed integral with a cementitious slab of a floor structure of the building structure.

50. The method of forming at least a two story building structure with a cementitious wall structure as claimed in claim 45 where each floor structure of the building structure comprises a plurality of laterally extending floor joists and a corrugated metal decking supported by the floor joist on which the cementitious slab of the floor structure is placed.

51. The method of forming at least a two story building structure with a cementitious wall structure as claimed in claim 45 where each upper portion of the support structure comprises a metallic structure, and installing the lower portion of the stand-off fasteners comprises driving a metal thread into the metallic structure.

52. The method of forming at least a two story building structure with a cementitious wall structure as claimed in claim 45 where each upper portion of the support structure comprises a masonry structure, and installing the lower portion of the stand-off fasteners comprises driving a masonry thread into the masonry structure.

53. The method of forming at least a two story building structure with a cementitious wall structure as claimed in claim 45 where each upper portion of the support structure comprises a wood structure, and installing the lower portion of the stand-off fasteners comprises driving a wood thread into the wood structure.

54. The method of forming at least a two story building structure with a cementitious wall structure as claimed in claim 45 where the lower portion of the stand-off fasteners has a generally greater hardness than that of the upper portion of the stand-off fasteners.

55. The method of forming at least a two story building structure with a cementitious wall structure as claimed in claim 45 where at least a portion of the lower portion of each stand-off fastener is heat treated to a higher degree of hardness relative to the remainder of the stand-off fasteners.

56. The method of forming at least a two story building structure with a cementitious wall structure as claimed in claim 45 further comprising: positioning at least one closure above the upper portion of each wall portion to provide a form for the cementitious wall structure above the wall portion, and installing at least some of the stand-off fasteners through at least one of the closures into the upper portion of the support structure.

57. The method of forming at least a two story building structure with a cementitious wall structure as claimed in claim 45 further comprising: positioning a plurality of floor joists each having a joist shoe at least at one end portion with the upper portion of the support structure supporting said end portion of the floor joist at the joist shoe, and installing stand-off fasteners to the joist shoe above the upper portion of the support structure with upper portions of said stand-off fasteners encapsulated in the cementitious wall structure.

58. The method of forming at least a two story building structure with a cementitious wall structure as claimed in claim 45 further comprising: positioning at least one reinforcing bar encapsulated within the cementitious wall structure.

59. The method of forming at least a two story building structure with a cementitious wall structure as claimed in claim 58 further comprising: connecting the upper portion of at least one of the stand-off fasteners to the reinforcing bar.

60. The method of forming at least a two story building structure with a cementitious wall structure as claimed in claim 45 further comprising: positioning metal decking to support at least portions of the cementitious wall structure and be supported by the upper portion of the support structure, positioning a plurality of joists in spaced apart array to support at least portions of the metal decking and the cementitious wall structure, and installing a plurality of stand-off fasteners with the lower portions of the stand-off fasteners through the decking and into the joists, with the upper portions of the stand-off fasteners extending above the decking and encapsulated in a cementitious floor slab integral with the cementitious wall structure.

61. A building structure comprising:
 a support structure, for at least a portion of the building structure, comprising a lower wall having lower wall studs and an upper portion operatively coupled to the lower wall studs extending to adjacent a floor structure above the support structure and adapted to receive stand-off studs there along, wherein the upper portion of the lower wall is a member, a plurality of stand-off studs each having a lower portion and an upper portion, wherein the lower portion of the stand-off studs connect to the upper portion of the support structure at locations approximate to the lower wall studs, and wherein at least a portion of the upper portion of each of the stand-off studs extends above the upper portion of the support structure,
 an upper wall with upper wall studs, wherein the upper wall studs are out of alignment with the lower wall studs, and
 a cementitious wall structure formed above the upper portion of the support structure with the upper portions of the stand-off studs encapsulated in the cementitious wall structure, wherein the cementitious wall structure operatively couples the upper wall to the lower wall, and wherein the plurality of the stand-off fasteners transfer a load from the upper wall studs of the upper wall and the cementitious wall structure to the member and the lower wall studs of the lower wall.

62. The building structure of claim 61, wherein the lower portion comprises a self-drilling end portion and an adjacent thread-forming portion and, when installed into the upper portion of the support structure, at least a portion of the upper portion of each stand-off stud extends significantly above the upper portion of the support structure.

63. The building structure as claimed in claim 62 where the upper portion of the support structure comprises a metallic structure, and the lower portion of the stand-off studs comprises a metal thread adapted to install into the metallic structure.

64. The building structure as claimed in claim 62 where the upper portion of the support structure comprises a masonry structure, and the lower portion of the stand-off studs comprises a masonry thread adapted to install into the masonry structure.

65. The building structure as claimed in claim 62 where the upper portion of the support structure comprises a wood structure, and the lower portion of the stand-off studs comprises a wood thread adapted to install into the wood structure.

66. The building structure as claimed in claim 62 where the lower portion of the stand-off studs has a generally greater hardness than that of the upper portion of the stand-off studs.

67. The building structure as claimed in claim 62 where at least a portion of the lower portion of each stand-off stud is heat treated to a higher degree of hardness relative to the remainder of the stand-off studs.

68. The building structure as claimed in claim 62 further comprising: floor joists each comprising a joist shoe positioned at least at one end portion, and the upper portion of the support structure supports said end portion of the floor joist at the joist shoe, and stand-off studs fasten the joist shoe to the upper portion of the support structure and have upper portions of said stand-off studs encapsulated in the cementitious wall structure.

69. The building structure of claim 61, wherein the lower portion comprises a weld stud, and when installed to the upper portion of the support structure, at least a portion of the upper portion of each stand-off stud extends significantly above the upper portion of the support structure.

70. The building structure as claimed in claim 61 where the cementitious wall structure is formed integral with a cementitious slab of a floor structure of the building structure.

71. The building structure as claimed in claim 70 where the floor structure of the building structure comprises a plurality of laterally extending steel joists and a corrugated metal decking supported by the steel joists on which the cementitious slab of the floor structure is placed.

72. The building structure as claimed in claim 61 further comprising: at least one closure positioned above the upper portion of the support structure to provide a form for the cementitious wall structure above the support structure, and at least some of the stand-off studs fasten at least one of the closures to the upper portion of the support structure.

73. The building structure as claimed in claim 61 further comprising: at least one reinforcing bar encapsulated within the cementitious wall structure.

74. The building structure as claimed in claim 73 further comprising: the upper portion of at least one of the stand-off studs connected to the reinforcing bar.

75. The building structure as claimed in claim 61 further comprising: metal decking adapted to support at least portions of the cementitious wall structure and be supported by the upper portion of the support structure, a plurality of joists in spaced apart array adapted to support at least portions of the metal decking and the cementitious wall structure, and a plurality of stand-off studs adapted to fasten the metal decking to the joists by installing the lower portions of the stand-off studs through the decking and into the joists, and with the upper portions of the stand-off studs extending above the decking and encapsulated in a cementitious slab of the floor structure integral with the cementitious wall structure.

76. The building structure as claimed in claim 61 where the support structure comprises an opening in a wall and the cementitious wall structure forms a header spanning the opening in the wall.

77. The building structure as claimed in claim 76 further comprising: at least one reinforcing bar encapsulated within the cementitious wall structure.

78. A method of forming a building structure with a cementitious wall structure comprising the following steps:
providing a support structure, for at least a portion of the building structure, comprising a lower wall with lower wall studs and an upper portion operatively coupled to the lower wall studs extending to adjacent a floor structure above the support structure, wherein the upper portion of the lower wall is a member,
installing a plurality of stand-off studs each having a lower portion and an upper portion, wherein the lower portion of the stand-off studs connect to the upper portion of the support structure at locations approximate to the lower wall studs, and wherein at least a portion of the upper portion of each of the stand-off studs extends above the upper portion of the support structure,
providing an upper wall with upper wall studs, wherein the upper wall studs are out of alignment with the lower wall studs, and placing a cementitious wall structure above the upper portion of the support structure with the upper portions of the stand-off studs encapsulated in the cementitious wall structure, wherein the cementitious wall structure operatively couples the upper wall to the lower wall, and wherein the plurality of the stand-off fasteners transfer a load from the upper wall studs of the upper wall and the cementitious wall structure to the member and the lower wall studs of the lower wall.

79. The method of forming a building structure with a cementitious wall structure as claimed in claim 78 comprising the following additional steps:
positioning a plurality of floor joists in spaced apart array with one end portion of the each of the joists is supported at least in part by the support structure,
positioning metal decking supported by the floor joist and at least partially by the support structure,
installing a second plurality of stand-off studs each having a lower portion and an upper portion, where the lower portion of the second stand-off studs connecting through the metal decking and into the floor joist with the upper portion of each second stand-off stud extends significantly above the metal decking, and
placing a cementitious slab of the floor structure above the metal decking with the upper portions of the second stand-off studs encapsulated in the cementitious wall structure and with the cementitious slab of the floor structure integral with the cementitious wall structure.

80. The method of forming a building structure with a cementitious wall structure as claimed in claim 79 further comprising the additional steps of: positioning a joist shoe at least at one end portion of some of the floor joists, with the upper portion of the support structure supporting said end portion of the floor joist at the joist shoe, and installing stand-off studs into the joist shoe with upper portions of said stand-off studs encapsulated in the cementitious structure of the floor structure.

81. The method of forming a building structure with a cementitious wall structure as claimed in claim 78, wherein the step of installing the plurality of stand-off studs comprises installing stand-off studs comprising the lower portion and the upper portion, where the lower portion comprises a self-drilling end portion and an adjacent thread-forming portion and, when installed into the upper portion of the support structure, at least a portion of the upper portion of each stand-off stud extends significantly above the upper portion of the support structure.

82. The method of forming a building structure with a cementitious wall structure as claimed in claim 81 where the upper portion of the support structure comprises a metallic structure, and installing the lower portion of the stand-off studs comprises driving a metal thread into the metallic structure.

83. The method of forming a building structure with a cementitious wall structure as claimed in claim 81 where the upper portion of the support structure comprises a masonry structure, and installing the lower portion of the stand-off studs comprises driving a masonry thread into the masonry structure.

84. The method of forming a building structure with a cementitious wall structure as claimed in claim 81 where the upper portion of the support structure comprises a wood structure, and installing the lower portion of the stand-off studs comprising a wood thread into the wood structure.

85. The method of forming a building structure with a cementitious wall structure as claimed in claim 78, wherein the step of installing the plurality of stand-off studs comprises installing stand-off studs comprising the lower portion and the upper portion, where the lower portion comprises a weld stud, and when installed to the upper portion of the support structure, at least a portion of the upper portion of each stand-off stud extends significantly above the upper portion of the support structure.

86. The method of forming a building structure with a cementitious wall structure as claimed in claim 78 where the lower portion of the stand-off studs has a generally greater hardness than that of the upper portion of the stand-off studs.

87. The method of forming a building structure with a cementitious wall structure as claimed in claim 78 where at least a portion of the lower portion of each stand-off stud is heat treated to a higher degree of hardness relative to the remainder of the stand-off studs.

88. The method of forming a building structure with a cementitious wall structure as claimed in claim 78 comprising the following steps: positioning at least one closure above the upper portion of the support structure to provide a form for the cementitious wall structure above the support structure, and installing at least some of the stand-off studs through at least one of the closures and into the upper portion of the support structure.

89. The method of forming a building structure with a cementitious wall structure as claimed in claim 78 further comprising: providing at least one reinforcing bar encapsulated within the cementitious wall structure.

90. The method of forming a building structure with a cementitious wall structure as claimed in claim 89 further comprising: the upper portion of at least one of the stand-off studs connected to the reinforcing bar.

91. The method of forming a building structure with a cementitious wall structure as claimed in claim 78 where the support structure comprises an opening in a wall and the step of placing a cementitious wall structure further comprises placing the cementitious wall structure to form a header spanning the opening in the wall.

\* \* \* \* \*